US010880704B2

(12) United States Patent
Kim

(10) Patent No.: US 10,880,704 B2
(45) Date of Patent: Dec. 29, 2020

(54) METHOD OF EXPOSING A RECEIVED MESSAGE, USER TERMINAL PERFORMING THE SAME AND COMPUTER READABLE MEDIUM FOR PERFORMING THE SAME

(71) Applicant: NHN Entertainment Corporation, Seongnam-si (KR)

(72) Inventor: Dong Wook Kim, Seongnam-si (KR)

(73) Assignee: NHN Entertainment Corporation, Seongnam-si (KR)

(*) Notice: Subject to any disclaimer, the term of this patent is extended or adjusted under 35 U.S.C. 154(b) by 191 days.

(21) Appl. No.: 15/963,098

(22) Filed: Apr. 26, 2018

(65) Prior Publication Data

US 2018/0317064 A1   Nov. 1, 2018

(30) Foreign Application Priority Data

Apr. 26, 2017   (KR) .................. 10-2017-0053621
Apr. 27, 2017   (KR) .................. 10-2017-0054151

(51) Int. Cl.
*H04W 4/23*   (2018.01)
*H04W 4/12*   (2009.01)
*H04L 12/58*   (2006.01)
*H04L 29/08*   (2006.01)
*H04M 3/42*   (2006.01)
*H04M 3/487*  (2006.01)
*H04M 3/436*  (2006.01)

(52) U.S. Cl.
CPC ............ *H04W 4/23* (2018.02); *H04L 51/043* (2013.01); *H04L 51/046* (2013.01); *H04L 51/38* (2013.01); *H04L 67/26* (2013.01); *H04M 3/42365* (2013.01); *H04M 3/42382* (2013.01); *H04M 3/436* (2013.01); *H04M 3/4872* (2013.01); *H04M 3/4878* (2013.01); *H04W 4/12* (2013.01); *H04M 2203/205* (2013.01); *H04M 2203/2072* (2013.01); *H04M 2203/551* (2013.01)

(58) Field of Classification Search
CPC ...... H04W 4/23; H04L 51/043; H04L 51/046; H04L 51/038; H04L 67/26; H04M 3/42365
See application file for complete search history.

(56) References Cited

U.S. PATENT DOCUMENTS 9,838,542 B1 * 12/2017 Kirchhoff ............. G06F 16/951
2003/0096625 A1 *  5/2003 Lee ........................ H04L 67/04
                                                                    455/466
2015/0170210 A1 *  6/2015 Rhee .................. G06Q 30/0241
                                                                    705/14.64

* cited by examiner

*Primary Examiner* — Sargon N Nano
*Assistant Examiner* — Christopher B Robinson
(74) *Attorney, Agent, or Firm* — H.C. Park & Associates, PLC

(57) ABSTRACT

A method capable of enhancing a user's acceptance of a received message, a message application program for performing the method, and a user terminal performing the method. The method of exposing received messages is a method performed by a message application program running on a user terminal. The method comprises receiving a message, and displaying the message if the current state of the user terminal satisfies a condition included in an exposure rule. After the message application program receives the message, the message application program displays the message only when the current state of the terminal satisfies the condition included in the exposure rule, thereby increasing the acceptance of the message.

14 Claims, 39 Drawing Sheets

METHOD OF EXPOSING A RECEIVED MESSAGE, USER TERMINAL PERFORMING THE SAME AND COMPUTER READABLE MEDIUM FOR PERFORMING THE SAME

CROSS REFERENCE TO RELATED APPLICATION

This application claims priority from and the benefit of Korean Patent Applications Nos. 10-2017-0053621 and 10-2017-0054151, filed on Apr. 26, 2017 and Apr. 27, 2017, respectively and, which are hereby incorporated by reference for all purposes as if fully set forth herein.

BACKGROUND

Field

Exemplary embodiments/implementations of the invention relate generally to a method of exposing a received message, a user terminal performing the method, and a computer readable medium with a message application program for performing the method, and more specifically, to a method of exposing a message received from the outside to a user, a user terminal performing the method, and a computer readable medium with a message application program for performing the method.

Discussion of the Background

Due to the advancement of wired and wireless internet technology and mobile technology, the advertising market center is shifting from old-fashioned media such as TVs, newspapers, and magazines to media such as computers and user terminals. In particular, since a majority of people have user terminals, that is, smart phones, advertising methods using such user terminals have been increasingly used in recent years.

As a representative advertising method using a user terminal, there is a method of transmitting advertisement texts by a mass-mail transmission system. More specifically, if an advertiser transmits advertisement texts to be transmitted and telephone numbers of a plurality of users to a mass-mail transmission system by using his user terminal, the mass-mail transmission system transmits the advertisement texts to the user terminal corresponding to the telephone number in sequence, so that each of the users can confirm the advertisement texts through their user terminal.

From the viewpoint of the user, when the user terminal of the user receives the advertisement texts, the push alarm indicating that the advertisement texts is received or a part or all of the advertisement texts can be immediately displayed and notified to the user. However, if the user receives the advertisement texts while the user is making a telephone call or playing a game, the user may delay the confirmation of the advertisement texts, erase the advertisement text immediately, or clean up the push alarm, so that it is inevitable that the number of views of the advertisement text is lowered.

Meanwhile, a smartphone which has been popular recently can transmit and receive a voice call, or send and receive a text message through a mobile telephone switching network. A voice call management application that controls the voice call function and manages information about the voice call, such as the time of receiving and sending the voice call, etc., the information of the other party of the voice call, the total call time, whether or not the connection is successful, is installed in the smartphone. The user can execute the voice call management application to inquire the voice call history, to inquire the detailed information of the voice call, and to delete the inquired voice call information. On the other hand, a text message management application that manages a text message function and manages information on a text message such as a time of receiving and sending a text message, the information of the other party who receives the text message or to whom the text message is transmitted, contents of a text message, reception/transmission indication information, etc., is installed in the smartphone. The user can execute the text message management application to inquire the text message history, to inquire the detailed information of the text message, and to delete the inquired text message information.

However, the voice call management application and the text message management application of the conventional smartphone are executed independently, so that the voice call information and the text message information cannot be simultaneously managed, and thus may overwhelm a user.

In addition, the conventional voice call management application and the text message management application do not provide any services other than the function of receiving and transmitting text messages, and the function of managing text message information. Therefore, if another service needs to be used in connection with a voice call and a text message which are received or transmitted, the service could not be executed immediately.

Meanwhile, since a text message such as SMS or MMS exchanged through a conventional mobile phone network is transmitted according to a mobile communication standard, there are many restrictions on the format and contents. Due to such a restriction, there has been a problem that the cost efficiency of the advertisement effects using text messages are remarkably lowered.

The above information disclosed in this Background section is only for understanding of the background of the inventive concepts, and, therefore, it may contain information that does not constitute prior art.

SUMMARY

Exemplary embodiments of the present invention relate to solving the above problems, and to providing a method of exposing a received message, which is able to enhance a user's acceptance of the received message.

Exemplary embodiments of the present invention provide a message application program for performing the method of exposing a received message.

Exemplary embodiments of the present invention provide a user terminal for performing the method of exposing a received message.

Exemplary embodiments of the present invention provide a message information integrated management service system that integrates and manages voice call and text message information exchanged by a mobile telephone switching network and provides various services.

Exemplary embodiments of the present invention provide a message information integrated management service providing method using the message information integrated management service system.

Exemplary embodiments of the present invention provide a system for integrally managing a voice call information and a text message information exchanged through a mobile telephone switching network and for transmitting publicity contents for a business service subscriber and a customized message visualization service, and a service providing method by using the system.

Additional features of the inventive concepts will be set forth in the description which follows, and in part will be apparent from the description, or may be learned by practice of the inventive concepts.

A method of exposing a received message performed by a message application program running on a user terminal according to an exemplary embodiment of the present invention, includes receiving a message, and displaying the message if a current state of the user terminal satisfies a condition included in an exposure rule.

Displaying the message may include detecting the current state of the user terminal, and displaying the message on a screen of a display unit when the detected current state satisfies the condition included in the exposure rule.

The exposure rule may include a status condition that indicates whether the user terminal is in a state capable of displaying the message, and a time condition that indicates whether the user terminal reaches a reference time from a time point when the user terminal receives the message.

Displaying the message on the screen may be performed when the current state satisfies at least one of the status condition and the time condition.

The status condition may include at least one of a first status condition that indicates whether the screen is in an OFF state, a second status condition that indicates whether the user terminal is in a stationary state, which can be determined by a motion sensor of the user terminal, a third state condition that indicates whether the user terminal is not in a call state, a fourth state condition that indicates whether another program in the user terminal, for example, a game program is not in an operation state, and a fifth state condition that indicates whether a Social Network Service (SNS) program has been terminated.

A message application program executed on a user terminal according to an exemplary embodiment of the present invention performs steps including receiving a message and displaying the message if a current state of the user terminal satisfies a condition included in an exposure rule.

A user terminal according to an exemplary embodiment of the present invention includes an interface unit, a display unit and a control unit. The interface unit is configured to receive a message. The display unit is configured to display an image through a screen. The control unit is configured to receive the message from the interface unit and controls the display unit to display the message through the screen if a current state of the user terminal satisfies a condition included in an exposure rule.

The user terminal may further include a memory unit configured to store the exposure rule and to provide the stored exposure rule to the control unit.

A method of exposing a received message according to an exemplary embodiment of the present invention, which is performed by a message application program executed by a user terminal, includes receiving a message, inquiring an exposure rule including a user-oriented optimal exposure time, and displaying the message, if a current time is the user-oriented optimal exposure time.

The method may further include tracking a state change of the user terminal after the message is displayed.

The method may further include calculating a new optimum time by analyzing the tracked state change of the user terminal, and changing the user-oriented optimal exposure time to the new optimal time.

Calculating a new optimal time may be performed by analyzing the tracked state change of the user terminal and extracting a displayed time point at which the message is displayed on the screen after the message is received and a confirmed time point at which at least a part of the message is confirmed by a user to calculate the new optimal time by using the displayed time point and the confirmed time point.

A message application program executed on a user terminal according to an exemplary embodiment of the present invention, is performed by steps including receiving a message, inquiring an exposure rule including a user-oriented optimal exposure time, and displaying the message, if a current time is the user-oriented optimal exposure time.

A user terminal according to an exemplary embodiment of the present invention comprises an interface unit, a display unit, a memory unit and a control unit. The interface unit receives a message. The display unit is configured to display an image through a screen. The memory unit is configured to store an exposure rule including a user-oriented optimal exposure time. The control unit is configured to receive the message from the interface unit, inquires the user-oriented optical exposure time from the memory unit, and to control the display unit to display the message through the screen when a current time is the user-oriented optimal exposure time.

A method of exposing a received message according to an exemplary embodiment of the present invention, which is performed by a message application program running on a user terminal, includes receiving a message, inquiring an exposure rule, and displaying the message if the current state of the user terminal satisfies a condition included in the exposure rule.

Displaying the message may include detecting a current state of the user terminal, and displaying the message on a screen of a display unit when the detected current state satisfies a condition included in the exposure rule.

The exposure rule may include a status condition that indicates whether the user terminal is in a state capable of exposing the message, and a time condition that indicates whether the current time is a user-oriented optimal exposure time to expose the message.

Displaying the message through the screen may be performed when the current state satisfies at least one of the status condition and the time condition.

The status condition may include at least one of a first state condition that indicates whether the screen is in an OFF state, a second state condition that indicates whether the user terminal is stationary, a third state condition that indicates whether the user terminal is not in a call state, a fourth state condition that indicates whether a program is not in an active state at the user terminal, and a fifth state condition that indicates whether a Social Network Service (SNS) program is terminated in the user terminal.

The method may further include tracking a state change of the user terminal after the message is displayed.

The method may further include calculating a new optimal time by analyzing the tracked state change of the user terminal, and changing the user-oriented optimal exposure time to the new optimal time.

Calculating a new optimal time may be performed by analyzing the tracked state change of the user terminal and extracting a displayed time point at which the message is displayed on the screen after the message is received and a confirmed time point at which at least a part of the message is confirmed by a user to calculate the new optimal time by using the displayed time point and the confirmed time point.

A message application program executed on a user terminal according to an exemplary embodiment of the present invention is performed by steps including receiving a message, inquiring an exposure rule, and displaying the message if a current state of the user terminal satisfies a condition included in the exposure rule.

A user terminal according to an exemplary embodiment of the present invention includes an interface, a display unit, a memory unit and a control unit. The interface receives a message. The display unit is configured to display an image through a screen. The memory unit stores an exposure rule. The control unit is configured to receive the message from the interface unit, inquire the exposure rule from the memory unit, and control the display unit to display the message through the screen when a current state satisfies a condition included in the exposure rule.

A user terminal processing a message integrated management platform service that integrally manages messages exchanged over a mobile telephone network according to an exemplary embodiment of the present invention, includes a voice call management unit, a text message management unit, a display unit and a message information integrated management unit. The voice call management unit is configured to manage a voice call. The text message management unit is configured to manage text messages. The message information integrated management unit includes a message monitoring unit configured to inquire information about a voice call (hereinafter referred to as 'voice call information') and information on a text message (hereinafter referred to as 'text message information') received or transmitted by the user terminal, a message information management unit configured to generate integrated message information to be provided to a user based on the voice call information and the text message information, a user interface management unit configured to generate an integrated message management user interface including the integrated message information and to display the integrated message management user interface on the display unit, and a business service management unit configured to process business services provided by business service subscribers and to provide the processed business services to the integrated message management user interface, in association with the voice call management unit and the text message management unit.

The user interface unit in an exemplary embodiment of the invention is configured to receive a user input relating to execution of a first message management user interface, generate a message block including the integrated message information, and generates a first message management user interface in which message blocks are listed in a time series in accordance with the reception and transmission time information included in the voice call information and the text message information corresponding to the integrated message blocks to display the first message management user interface on the display of the user terminal, and identify a counterpart of a voice call or text message corresponding to a selected message block in response to a user input selecting one of the message blocks displayed in the first message management user interface, inquires a voice call information and a text message information of which calling party or receiving party is the identified counterpart, generates conversation information by editing the inquired voice call information and the text message information according to a predetermined conversation information format, and generates a second graphic user interface arranged in a time series and interactively according to a reception time and a transmission time of the voice call and the text message corresponding to the conversation information to display second graphic user interface on a display device of the user terminal.

The business service management unit may be configured to identify a sender information included in a received text message, inquiry a message visualization component associated with the identified sender information, and visualize the received text message using the inquired message visualization component to display the text message that is the visualized on the second message management user interface.

The message visualization component may include a display form for visualizing a received text message, and a rule for extracting an information item included in the received text message and to configure the display form.

The business service management unit may be configured to receive publicity information registered by a business service subscriber from a message information integrated management service server to generate a publicity card including the received information, and display the publicity card in a specific location on the second message management user interface that is a counterpart of the business service subscriber.

The business service management unit may be configured to receive the publicity information registered by the business service subscriber from the message information integrated management service server, and generate a publicity message block including the received information, and display the publicity message block in a specific location on the first message management user interface.

The business service management unit may be configured to store the received publicity information in a memory.

The business service management unit may be configured to identify an access network environment of the user terminal and receive the publicity information only in an allowed network environment.

A method of visualizing and providing publicity information registered by a business service subscriber according to an exemplary embodiment of the present invention is performed by an integrated message management unit installed in a user terminal, and includes receiving a user input for executing a first message management user interface in which message blocks displaying a voice call information and a text message information received or transmitted by the user terminal are listed in a time series, notifying the message information integrated management service server of execution of the first message management user interface, receiving publicity information from the message information integrated management service server, generating a publicity message block using the received publicity information, inserting the publicity message block at a specific location on the first message management user interface, and executing the first message management user interface in which the publicity message block is inserted.

The message information integrated management service server may be configured to store a plurality of publicity information registered by a plurality of business subscribers, and randomly select one of the plurality of publicity information to transmit to the user terminal.

The publicity message block may be inserted between a first message block of today and a last message block of yesterday.

The method may further comprise identifying an access network environment of the user terminal before notifying the message information integrated management service server of execution of the first message management user interface, and receiving publicity information from the message information integrated management service server, wherein the receiving publicity information is performed only in the allowed network environment.

A method of visualizing and providing publicity information registered by a business service subscriber according to an exemplary embodiment of the present invention is performed by an integrated message management unit installed in a user terminal, and includes receiving a user input for executing a second message management user interface in which conversation information formed by editing a voice call information and a text message information according to a conversation format, wherein the voice call information and the text message information are received from or transmitted to a conversation partner selected by a user, and are listed in a time series depending on a reception time and a transmission time and interactively, generating an inquiry request message of a publicity information registered by the conversation partner to transmit the inquiry request message to a message information integrated management service server, receiving publicity information registered by the conversation partner from the message information integrated management service server, generating a publicity card using the received publicity information, inserting the publicity card at a specific location on the second message management user interface, and executing the second message management user interface in which a publicity message block is inserted.

The method may further include identifying an access network environment of the user terminal before generating the inquiry request message of the publicity information, and receiving the publicity information only in an allowed network environment.

A method of visualizing and providing publicity information registered by a business service subscriber in an exemplary embodiment is performed by an integrated message management unit installed in a user terminal, and includes receiving publicity information registered by a business subscriber from the message information integrated management service server, storing the received publicity information in a memory in association with a business subscriber identification information, receiving a user input for executing a second message management user interface in which a conversation information is formed by editing a voice call information and a text message information according to a conversation format, wherein the voice call information and the text message information are received from or transmitted to a conversation partner selected by a user, and are listed in a time series depending on a reception time and a transmission time and interactively, inquiring the memory to search for a publicity information stored in association with the selected conversation partner, generating a publicity card by using the publicity information stored in association with the selected conversation partner, inserting the publicity card at a specific location on the second message management user interface, and executing the second message management user interface in which a publicity message block is inserted.

A method of visualizing a text message to be transmitted to an integrated message management platform service user by a business service subscriber in a customized manner according to an exemplary embodiment of the present invention is performed by an integrated message management unit installed in a user terminal, and includes receiving a message visualization component registered by a business service subscriber from the message information integrated management service server, storing the received message visualization component in a memory in association with a business subscriber identification information, inquiring the memory to determine whether there is a stored message visualization component associated with the sender of a received text message, when a user terminal receives the text message, reading the stored message visualization component to visualize the received text message, when there is the message visualization component stored associated with the sender of the received text message, inserting the visualized received text message into a message management user interface, and executing the message management user interface.

The message visualization component may include a display form for visualizing the received text message, and a rule for extracting an information item included in the received text message to configure the display form.

A method of providing a chatbot for consultation using a contact information of a business subscriber according to an exemplary embodiment of the present invention is performed by an integrated message management unit installed in a user terminal, and includes detecting a user input for selecting a reply method for a text message received at a user terminal, determining whether a contact of a business subscriber included in the received text message is capable of receiving a text message, when the selected reply method is a text message, determining whether there is a chatbot registered by the business subscriber when it is determined that the contact of the business subscriber is unable to receive a text message, generating a chatbot service guide user interface to display the chatbot service guide interface on a display unit of the user terminal when it is determined that there is the chatbot registered by the business subscriber, receiving an inquiry message to be transmitted to the business subscriber from the user terminal, transmitting the inquiry message and an execution request of the chatbot registered by the business subscriber to a message information integrated management service server, receiving a response to the inquiry message, which is generated by the chatbot from the message information integrated management service server, and displaying the response on the user terminal.

The chatbot service guide user interface may include a message to be connected to a chatbot when a text message is transmitted to the contact of the business subscriber, and a graphic user interface for providing basic information about the business subscriber.

As described above, according to the method of exposing a received message, a message application program for performing the method, and a user terminal unit performing the message application program according to the present invention, after a user terminal, which is having a message application program receives a message, the user terminal displays the message only when the current state of the terminal satisfies at least one of the conditions included in the exposure rule, for example, the state condition and the time condition, so that a user can confirm the message when the user can afford to confirm the message.

More specifically, when the user terminal is in a state where the user terminal is unable to confirm the message, such as when the user terminal is making a phone call or playing a game, the message is not displayed, and when the message is predicted to be able to confirm the message, the message is displayed so that the degree of acceptance of the message may be increased.

Also, according to the message information integrated management apparatus and method according to the present invention, by providing a message integrated management user interface capable of integrally managing information on a voice call and a text message exchanged by a mobile telephone switching network, management convenience is increased. Also, according to the message information integrated management apparatus and method according to the present invention, publicity information or advertisement information, which could not be provided by conventional SMS or MMS, can be provided through the message integration management user interface, so that the effect of promoting and advertising of business subscribers is increased. According to the message information integrated management apparatus and method of the present invention, service differentiation of a business subscriber can be emphasized by providing a service that visualizes SMS or MMS transmitted through a mobile phone network in a customized manner according to a demand of a business subscriber.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE ILLUSTRATED EMBODIMENTS

Figure 1:
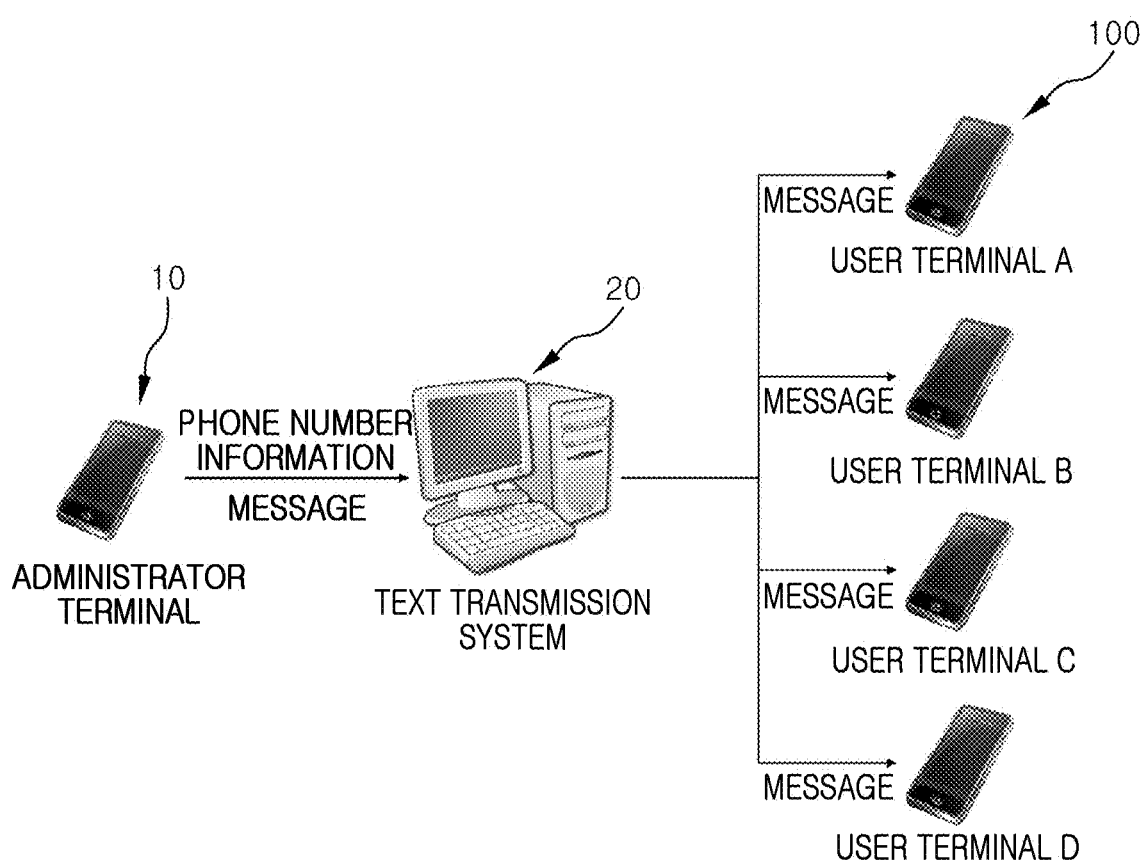
FIG. 1 is a conceptual diagram illustrating a message transmission system including a user terminal according to an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the present invention will be described in detail with reference to the accompanying drawings.

Figure 2:
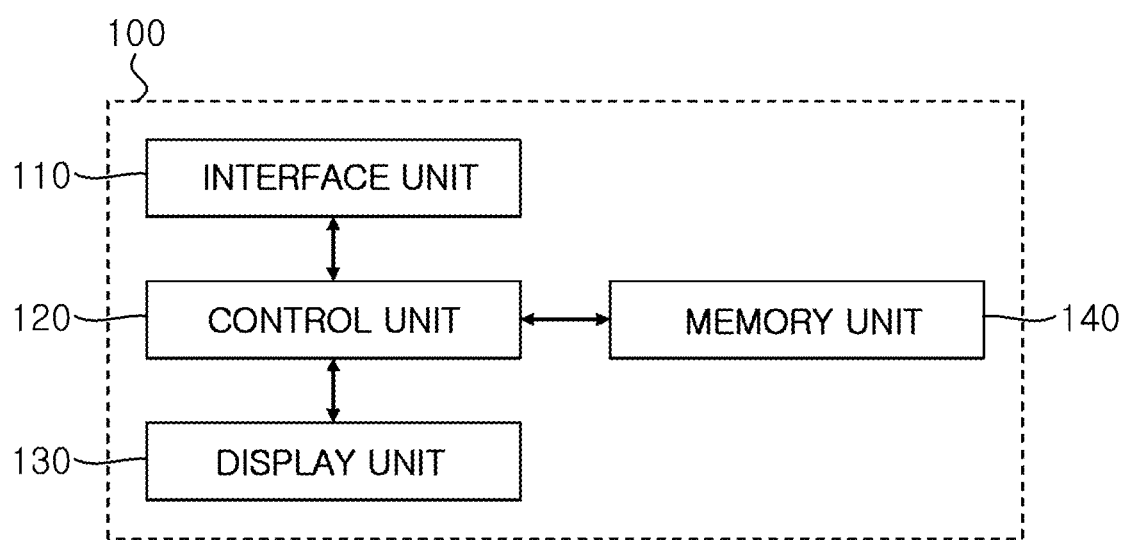
FIG. 2 is a block diagram illustrating a user terminal of the message transmission system of FIG. 1.

FIG. 1 is a conceptual diagram illustrating a message transmission system including a user terminal according to an exemplary embodiment of the present invention, and FIG. 2 is a block diagram illustrating a user terminal of the message transmission system of FIG. 1.

Referring to FIGS. 1 and 2, a message transmission system according to the present exemplary embodiment may include an administrator terminal 10 for transmitting a message, a text transmission system 20 executing work for transmitting the message, and a plurality of user terminals 100. Here, the administrator terminal 10 may be a user terminal or a computer system owned by a user who wants to transmit the message.

More specifically, when the administrator terminal 10 transmits message to be transmitted and telephone numbers of a plurality of users to the text transmission system 20, the text transmission system 20 transmits the message to the user terminals 100 corresponding to the telephone number in sequence, so that each of the users can confirm the advertisement text through the user terminal of the user. Alternatively, the administrator terminal 10 may be directly connected to the user terminals 100 to transmit the message. Here, the message may be advertisement texts or an advertisement image.

Meanwhile, each of the user terminals 100 may be a user terminal, for example, a smart phone or a tablet PC, which can transmit and receive signals wirelessly via the Internet. At this time, the user terminal will be given the same reference numeral as that of the user terminal 100.

Referring to FIG. 2, the user terminal 100 may include an interface unit 110, a control unit 120, a display unit 130 and a memory unit 140. The interface unit 110 may be controlled by the control unit 120 and may exchange signals with an external system and may provide a received information to the control unit 120. The display unit 120 may be controlled by the control unit 120, and may display an image through the screen. The screen may be a touch screen capable of receiving input. The memory unit 140 is controlled by the control unit 120 and stores various kinds of information. Also, the memory unit 140 may store a message application program that can be provided to the control unit 120 to perform a method of exposing a received message, which will be described later.

Figure 3:
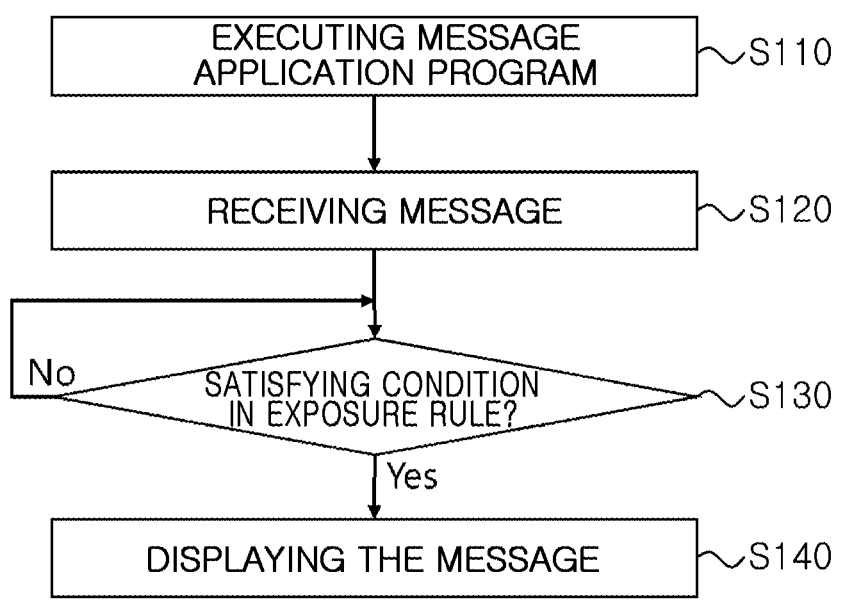
FIG. 3 is a flowchart illustrating a method of exposing a received message, which is performed by the user terminal of FIG. 2 according to a first exemplary embodiment of the present invention.
Figure 4:
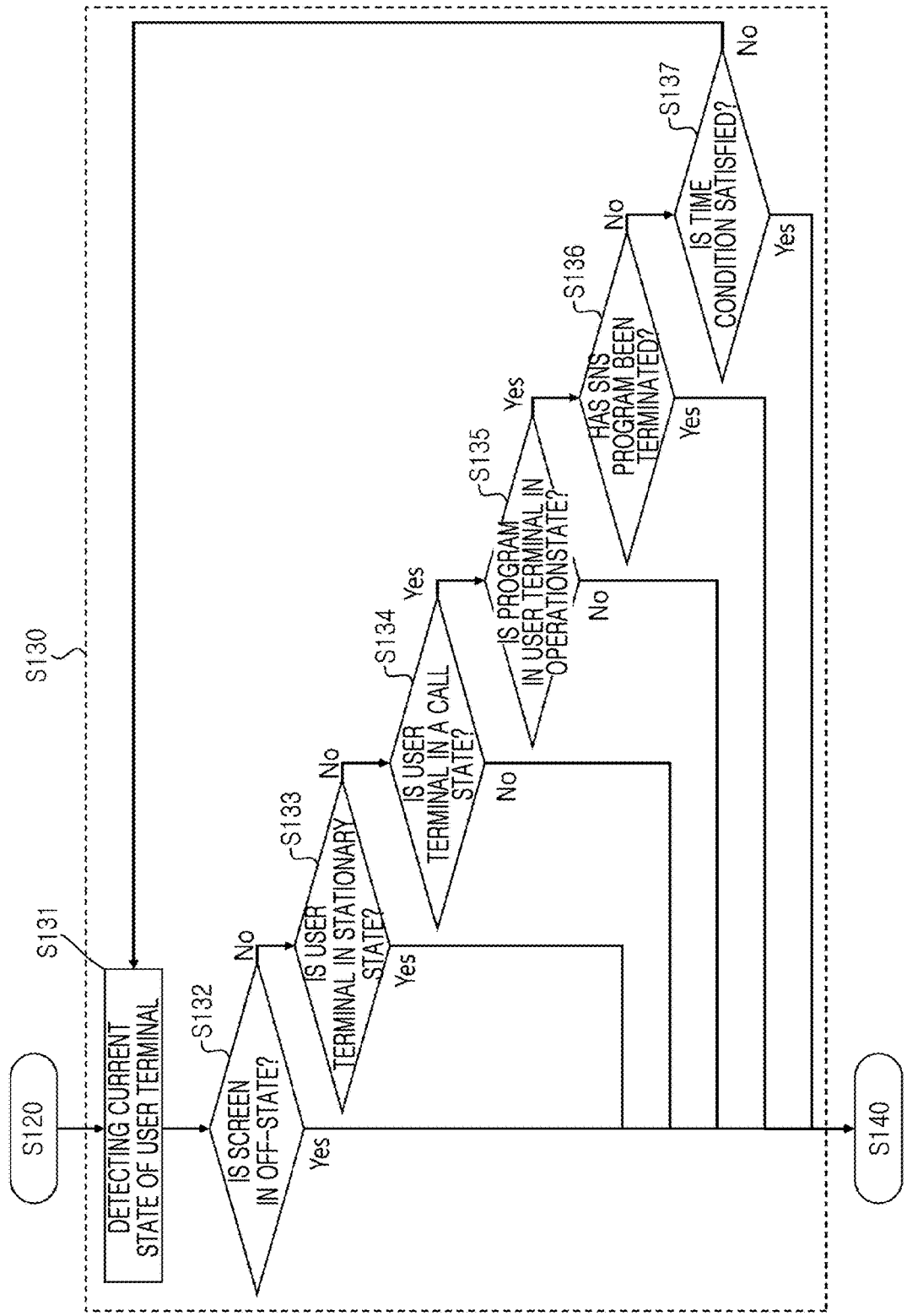
FIG. 4 is a flowchart illustrating a step of determining a terminal status in the method of exposing a received message of FIG. 3.

FIG. 3 is a flowchart illustrating a method of exposing a received message, which is performed by the user terminal of FIG. 2 according to a first exemplary embodiment of the present invention, and FIG. 4 is a flowchart illustrating a step of determining a terminal status in the method of exposing a received message of FIG. 3.

Referring to FIGS. 3 and 4, according to a method for exposing a received message according to a first exemplary embodiment of the present invention, a control unit 120 loads and executes the message application program stored in the memory unit 140 (step S110). At this time, the message application program may be loaded and executed by an input action of a user, for example, clicking on a corresponding program icon. Alternatively, the message application program may be loaded and executed automatically, when the user terminal 100 is turned on to be operated.

In this exemplary embodiment, when the message application program is being executed, the control unit 120 may be driven according to the message application program to perform a subsequent process of exposing the received message.

The message application program may be a program downloaded from an external system (not shown) and installed in the user terminal 100 and stored in the memory unit 140. Alternatively, the message application program may be a program stored in the memory unit 140, provided by a manufacturer of the user terminal 100, and installed in advance.

Then, when the interface unit 110 receives the message from the outside, the control unit 120 receives the received message from the interface unit 110 (step S120).

When the control unit 120 receives the message, the control unit 120 may determine whether the current state of the user terminal 100 satisfies a condition included in the exposure rule (step S130). At this time, the exposure rule may be stored in the memory unit 140.

If the control unit 120 determines that the current state of the user terminal 100 satisfies the condition included in the exposure rule, the control unit 120 provides the message to the display unit 130 to display the message on the display unit 130 (step S140). Here, in step S140, the message may be displayed on the screen in the form of a push message, but some or all of the content may be directly displayed on the screen.

In detail, in order to perform step S130, the control unit 120 may detect the current state of the user terminal 100 (step S131), and may determine if the detected current state satisfies a condition included in the exposure rule (steps S132, S133, S134, S135, S136, and S137 in FIG. 4).

The exposure rule may include at least one of a status condition that indicates whether the user terminal 100 is in a state capable of displaying the message and a time condition that indicates whether the user terminal 100 reaches a reference time from a time point when the user terminal 100 receives the message. For example, if the current state satisfies at least one of the state condition and the time condition in step S130, the control unit 120 may determine that the current state satisfies the condition included in the exposure rule. Thus, if the current state is satisfied within the reference time, or if it is determined that the reference time has been reached, the message may be displayed on the screen.

In the present exemplary embodiment, the status condition may include at least one of a first status condition that indicates whether the screen is in an OFF state, a second status condition that indicates whether the user terminal is in a stationary state, which can be determined by a motion sensor of the user terminal, a third state condition that indicates whether the user terminal is not in a call state, a fourth state condition that indicates whether the program in the user terminal, for example, a game program, is not in an operation state, and a fifth state condition that indicates whether or not a Social Network Service (SNS) program has been terminated.

For example, the control unit 120 may sequentially determine whether the current state satisfies the first to fifth state conditions shown in steps S132, S133, S134, S135, and S136, respectively, and may display the message on the screen, if any one of the conditions is satisfied. On the other hand, if the control unit 120 determines that the first to fifth status conditions are not satisfied, the control unit 120 may determine whether the time condition is satisfied (step S137). If the time condition is satisfied, the message may be displayed on the screen. If the time condition is not satisfied, the current state can be continuously detected, until the first to fifth state conditions or the time conditions are satisfied.

Figure 5:
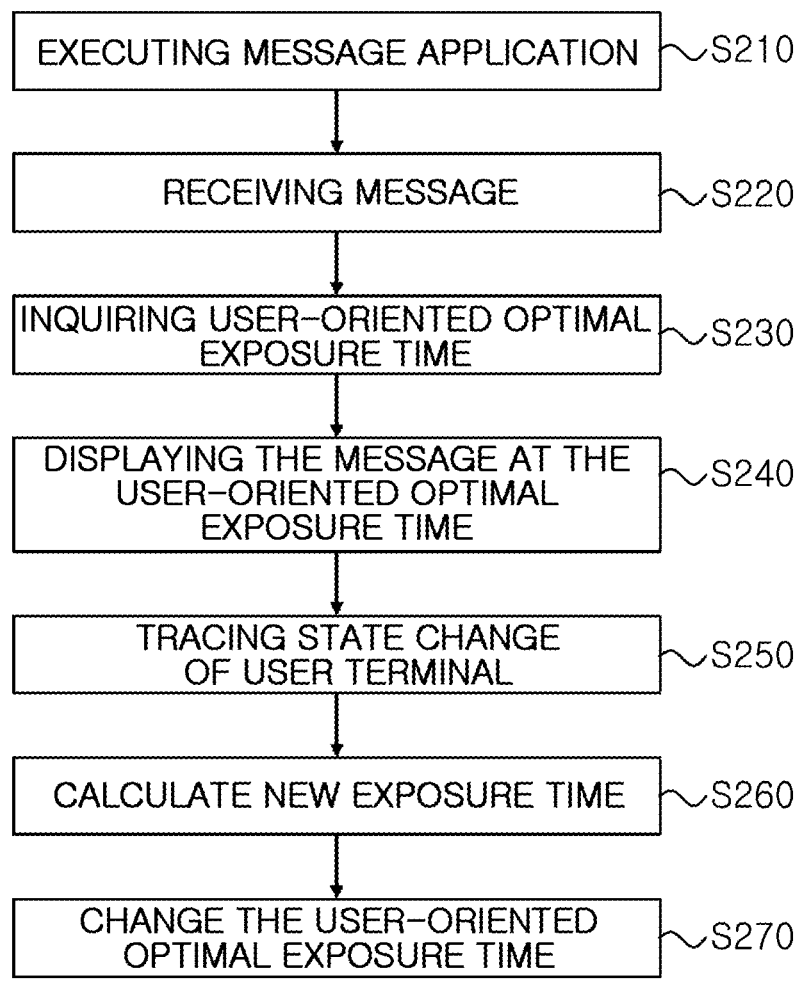
FIG. 5 is a flowchart illustrating a method of exposing a received message performed by the user terminal of FIG. 2 according to a second exemplary embodiment of the present invention.

FIG. 5 is a flowchart illustrating a method of exposing a received message performed by the user terminal of FIG. 2 according to a second exemplary embodiment of the present invention.

Referring to FIG. 5, according to a method for exposing a received message according to a second exemplary embodiment of the present invention, a control unit 120 loads and executes the message application program stored in the memory unit 140 (step S210). At this time, the message application program may be loaded and executed by an input action of a user, for example, clicking on a corresponding program icon. Alternatively, the message application program may be loaded and executed automatically, when the user terminal 100 is turned on to be operated.

In this exemplary embodiment, when the message application program is being executed, the control unit 120 may be driven according to the message application program to perform a subsequent process of exposing the received message.

The message application program may be a program downloaded from an external system (not shown) and installed in the user terminal 100 and stored in the memory unit 140. Alternatively, the message application program may be a program stored in the memory unit 140, provided with a manufacturer of the user terminal 100, and installed in advance.

Then, when the interface unit 110 receives the message from the outside, the control unit 120 receives the received message from the interface unit 110 (step S220).

When the control unit 120 receives the message, the control unit 120 may access the memory unit 140 and inquire the stored exposure rule (step S230). At this time, the exposure rule includes a user-oriented optimal exposure time for exposing the message.

Then, the control unit 120 determines whether the current time in the user terminal 100 corresponds to the user-oriented optimal exposure time. If the current time is the user-oriented optimal exposure time, the message may be provided to the display unit 130 so that the message may be displayed on the screen of the display unit 130 (step S240). In step S240, the message may be displayed on the screen in the form of a push message, but some or all of the content may be directly displayed on the screen.

After the message is displayed, the control unit 120 may trace the state change of the user terminal 100 (step S250). That is, after the message is displayed, the control unit 120 may trace the state change by detecting an action of a user for conforming the message, for example, turning on of the screen, moving the user terminal, etc.

In step S260, the control unit 120 may calculate a new optimal exposure time by analyzing the state change of the user terminal 100 traced. In detail, the control unit 120 analyzes the state change of the user terminal 100 to extract a time point at which the message is displayed on the screen after the message is received and a time point at which at least a part of the message is conformed, so that a new optimal time can be calculated by using the displayed time point and the conformed time point. For example, the new optimal time may be the time between the displayed time point and the confirmed time point.

In step S270, the control unit 120 may provide the memory unit 140 with the new optimal time to update the exposure rule, thereby changing the user-oriented optimal exposure time.

Figure 6:
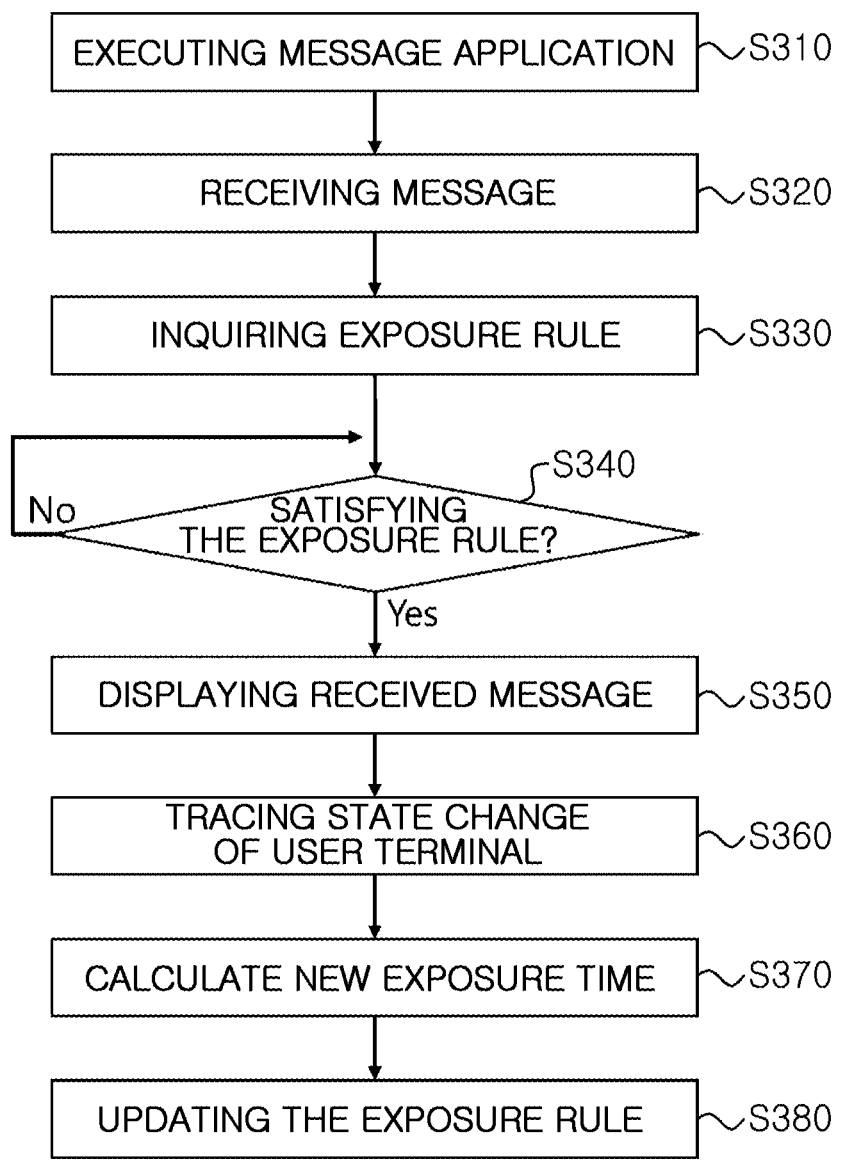
FIG. 6 is a flowchart illustrating a method of exposing a received message, which is performed by the user terminal of FIG. 2 according to a third exemplary embodiment of the present invention.
Figure 7:
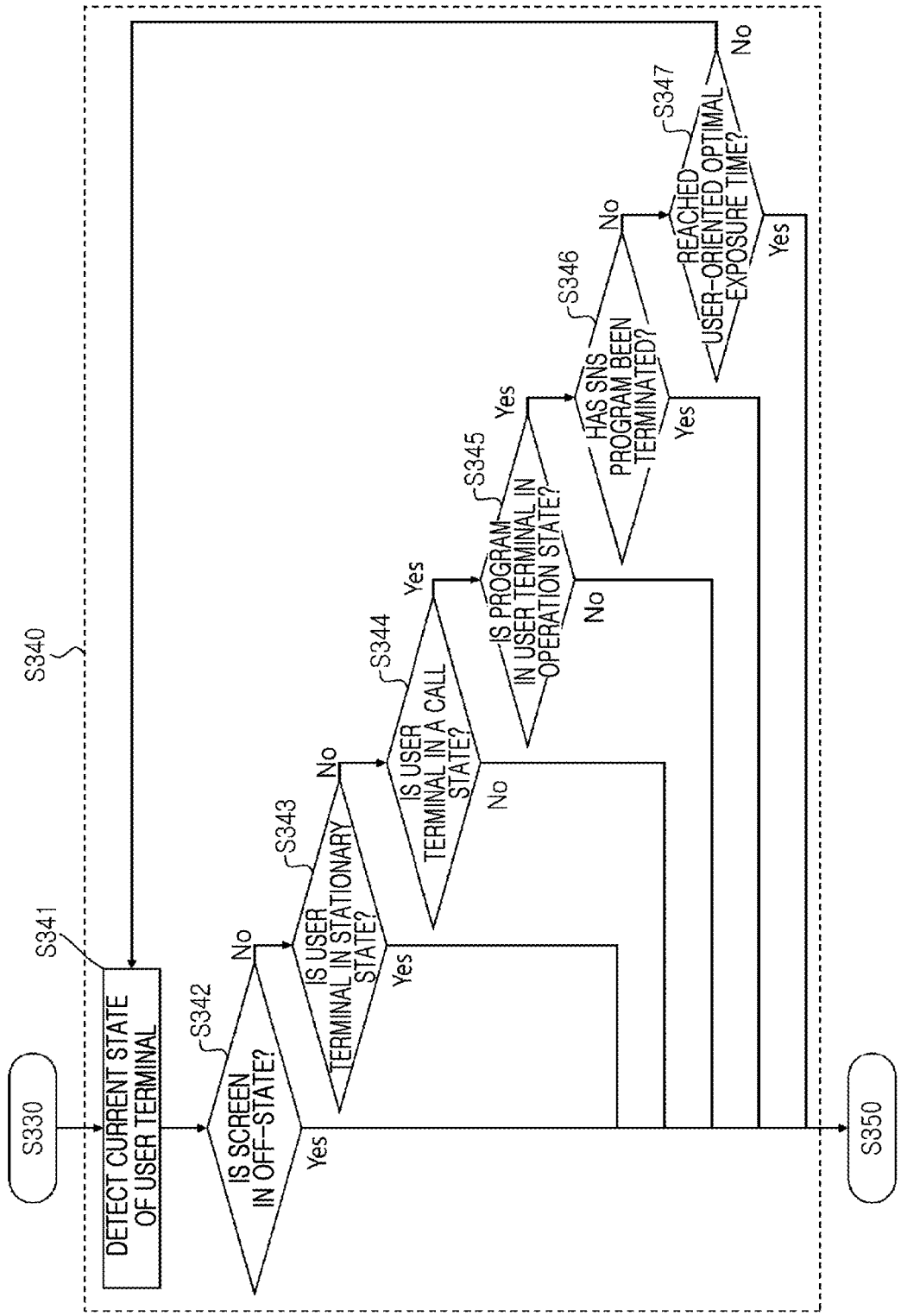
FIG. 7 is a flowchart illustrating a step of determining a terminal status in the method of exposing a received message of FIG. 6.

FIG. 6 is a flowchart illustrating a method of exposing a received message, which is performed by the user terminal of FIG. 2 according to a third exemplary embodiment of the present invention, and FIG. 7 is a flowchart illustrating a step of determining a terminal status in the method of exposing a received message of FIG. 6.

Referring to FIGS. 6 and 7, according to a method for exposing a received message according to a third exemplary embodiment of the present invention, a control unit 120 loads and executes the message application program stored in the memory unit 140 (step S310). At this time, the message application program may be loaded and executed by an input action of a user, for example, clicking on a corresponding program icon. Alternatively, the message application program may be loaded and executed automatically, when the user terminal 100 is turned on to be operated.

In this exemplary embodiment, when the message application program is being executed, the control unit 120 may be driven according to the message application program to perform a subsequent process of exposing the received message.

The message application program may be a program downloaded from an external system (not shown) and installed in the user terminal 100 and stored in the memory unit 140. Alternatively, the message application program may be a program stored in the memory unit 140, provided by a manufacturer of the user terminal 100, and installed in advance.

In step S320, when the interface unit 110 receives the message from the outside, the control unit 120 receives the received message from the interface unit 110.

When the control unit 120 receives the message, the control unit 120 may access the memory unit 140 and inquires the stored exposure rule (step S330). At this time, the exposure rule may include a status condition that indicates whether the user terminal 100 is in a state capable of displaying the message, and a time condition that indicates whether or not the current time is a user-oriented optimal exposure time to expose the message.

In the present exemplary embodiment, the status condition may include at least one of a first status condition that indicates whether the screen is in an OFF state, a second status condition that indicates whether the user terminal is in a stationary state, which can be determined by a motion sensor of the user terminal, a third state condition that indicates whether the user terminal is not in a call state, a fourth state condition that indicates whether the program in the user terminal, for example, a game program, is not in an operation state, and a fifth state condition that indicates whether or not a Social Network Service (SNS) program has been terminated.

Then, the control unit 120 may determine whether the current state of the user terminal 100 satisfies the conditions included in the exposure rule (step S340). For example, when the current state satisfies at least one of the state condition and the time condition, the control unit 120 may determine that the current state satisfies the condition included in the exposure rule.

In detail, in order to perform step S340, the control unit 120 may detect the current state of the user terminal 100 (step S341), and may determine if the detected current state satisfies a condition included in the exposure rule (steps S342, S343, S344, S345, S346, and S347). For example, the control unit 120 sequentially determines whether the current state satisfies the first to fifth state conditions shown in steps S342, S343, S344, S345, and S346, respectively, and whether the current state satisfies the time condition when the current state does not satisfy the first to fifth conditions (step S347). This process can be repeated.

In step S350, if the control unit 120 determines that the current state of the user terminal 100 satisfies the condition included in the exposure rule, the control unit 120 may provide the message to the display unit 130 to display the message on the display unit 130. In step S350, the message may be displayed on the screen in the form of a push message, but a part or all of the content may be directly displayed on the screen.

After the message is displayed, the control unit 120 may trace the state change of the user terminal 100 (step S360). That is, after the message is displayed, the control unit 120 may trace the state change by detecting an action of a user for conforming the message, for example, turning on of the screen, moving the user terminal, etc.

In step S360, the control unit 120 may calculate a new optimal exposure time by analyzing the state change of the user terminal 100 traced. In detail, the control unit 120 analyzes the state change of the user terminal 100 to extract a time point at which the message is displayed on the screen after the message is received and a time point at which at least a part of the message is conformed, so that a new optimal time can be calculated by using the displayed time point and the conformed time point. For example, the new optimal time may be the time between the displayed time point and the confirmed time point.

In step S380, the control unit 120 may provide the memory unit 140 with the new optimal time to update the exposure rule, thereby changing the user-oriented optimal exposure time.

According to the present exemplary embodiment, after the user terminal 100 receives a message from the outside, only when the current state of the terminal satisfies at least one of conditions included in the exposure rule, for example, a state condition and a time condition, the message is displayed so that the user can check the message in a state where the user can view the message.

In detail, when a user using the user terminal 100 is in a state in which the user cannot confirm the message through the user terminal 100, such as when the user is making a telephone call or playing a game the user terminal 100, the message is not displayed, but the message is display when the message is expected to be able to be confirmed, so that the chances of the message being viewed may be increased.

Figure 8:
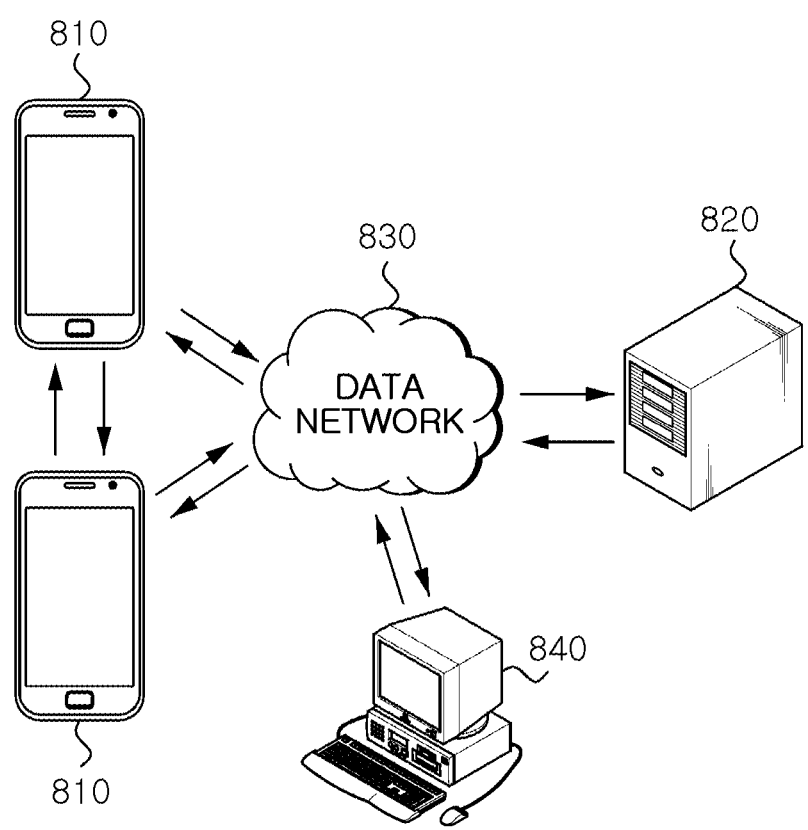
FIG. 8 is a block diagram illustrating a configuration of a message information integrated management service system according to an exemplary embodiment of the present invention.

FIG. 8 is a block diagram illustrating a configuration of a message information integrated management service system according to an exemplary embodiment of the present invention.

Referring to FIG. 8, a message information integrated management service system includes a plurality of user terminals 810, a message information integrated management service server 820, a business service subscriber terminal 840, and a data network 830. The user terminal 810 and the message information integrated management service server 820 exchange signals and data necessary for message information integrated management service through a data network 830. The user terminal 810 is a communication device capable of transmitting and receiving a voice call and a text message through a mobile phone network and exchanging data through a wireless data communication network. Meanwhile, the business service subscriber terminal 840 and the message information integrated management service server 820 exchange signals and data necessary for business services such as promotion, advertisement, and customized message visualization through the data network 830. The business service subscriber terminal 840 is a computing device capable of data communication, and may be a computer terminal device such as a personal computer (PC), a notebook computer, a laptop computer, or the like, or a mobile computing device such as a smart phone or a tablet PC. In addition, the business service subscriber terminal 840 can transmit a text message (SMS or MMS) to the user terminal 10 via the mobile telephone network.

The message information integrated management service system according to the present invention may have various detailed configurations. Hereinafter, a message information integrated management service system constructed in accordance with an exemplary embodiment of the present invention and a message information integrated management service provided thereby will be described.

Figure 9:
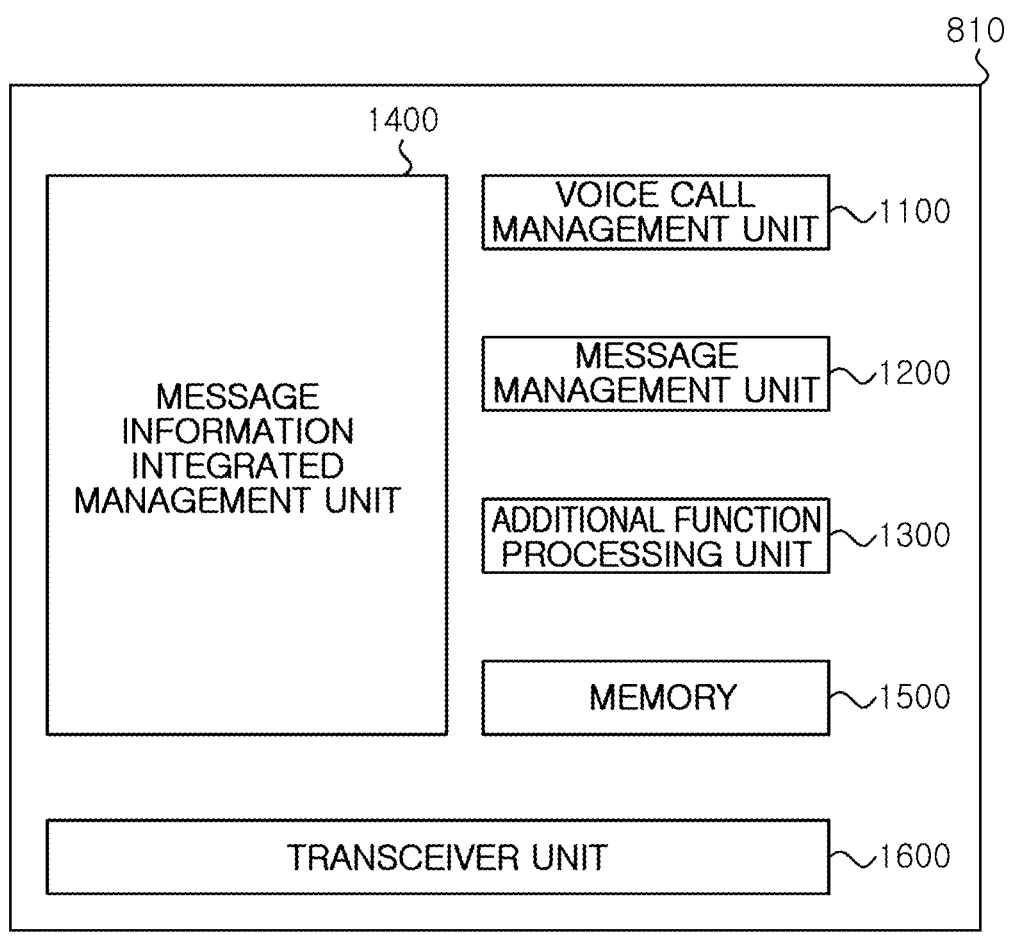
FIG. 9 is a block diagram illustrating a configuration of a user terminal according to an exemplary embodiment of the present invention.

FIG. 9 is a block diagram illustrating a configuration of a user terminal with a message information integrated management function according to an exemplary embodiment of the present invention.

Referring to FIG. 9, the user terminal 810 according to an exemplary embodiment of the present invention includes a message information integrated management unit 1400, a voice call management unit 1100, a text message management unit 1200, an additional function processing unit 1300 and a transceiver unit 1600.

The voice call management unit 1100 is a hardware, a software or a combination thereof configured to process a voice call that is exchanged through the mobile phone switching network and to manage the information of the voice call, for example, the time of receiving and sending the voice call, information about the other party of the voice call, and the like (Hereinafter, referred to as "voice call information"). The information of the voice call is transmitted through the mobile telephone switching network together with the voice call, and the voice call management unit 1100 collects and stores the information of all voice calls received or transmitted by the user terminal 810.

The text message management unit 1200 is a hardware, a software or a combination thereof configured to transmit and receive a text based message such as an asynchronous text type message exchanged through a mobile telephone switching network, that is, a Short Message Service (SMS) and a Multimedia Messaging Service (MMS), and configured to manage the information of the text massage (hereinafter, referred to as "text message information"). The text message information managed by the text message management unit 1200 includes the reception and transmission time of the text message, the reception and transmission destination of the text message, and the content of the text message. Management of the voice call information and the text message information may be performed in conjunction with an address book management unit installed in the user terminal 810. For example, if there is a caller ID (CID) information included in a received voice call and a text message, the received CID information is collated with the number stored in the address book. If the same number is stored, it is possible to search for the name of the other party and to record and to store the voice call and the text message as the receiving and sending parties.

The transceiver unit 1600 receives and transmits a voice call and a text message by the mobile telephone switching network. The transceiver unit 1600 also receives and transmits signals related to packet data communication other than voice communication and the text messages through a wireless communication network.

The additional function processing unit 1300 may be hardware, software, or a combination thereof configured to provide various additional functions. For example, the additional function processing unit 1300 may be constituted by a processor in the user terminal 810 that performs processing according to software and a command including commands necessary for processing the additional function. At this time, the software constituting the additional function processing unit 1300 may be installed in the user terminal 10 in the form of an application. The additional function processing unit 1300 may be configured to perform one function or to perform a plurality of functions. At this time, the software constituting the additional function processing unit 1300 may be installed in the user terminal 10 in the form of an application. The additional function processing unit 1300 may be configured to perform one function or to perform a plurality of functions. FIG. 9 shows an example in which the additional function processing unit 1300 is provided separately from the message information integrated management unit 1400. However, some additional functions may be provided by other elements included in the message information integrated management unit 1400.

When the additional function processing unit 1300 is provided separately from the message information integrated management unit 1400, it is necessary to interact between the additional function processing unit 1300 and the message information integrated management unit 1400. The additional function interface interacts between the hardware and/or software constituting the message information integrated management unit 1400 and the hardware and/or software constituting the additional function processing part 1300.

The user terminal 810 according to an exemplary embodiment of the present invention may include a schedule information management application as an example of the additional function processing unit 1300. The schedule information management application is configured to manage schedule information of a user. The schedule information management application provides a schedule management user interface, which allows the user to input, modify and delete his/her schedule through the schedule management user interface. The schedule information includes items such as a date and time of a schedule, a job, a place, a related person, and additional information. The schedule information is stored in the memory 1500 in the user terminal 810.

The user terminal 810 according to an exemplary embodiment of the present invention may include a memo application as an example of the additional function processing unit 1300. The memo application provides a memo user interface for creating, modifying, deleting, and viewing a simple memo, and storing the memo inputted by the user in the memory 1500 in the user terminal 810.

The user terminal 810 according to an exemplary embodiment of the present invention may include a Social Network Service (SNS) application as an example of the additional function processor 1300. An SNS application is used to share a variety of content over a data network to form social relationships, e.g., friendships, communities, etc., among multiple users.

The above-described additional function processing units 1300 may be provided in the message information integrated management unit 1400.

The message information integrated management unit 1400 is connected to the voice call management unit 1100, the text message management unit 1200 and the additional function processing unit 1300 (e.g., including a schedule information management application, a memo management unit, and an SNS application) to integrally manage voice call and text-based message information performed by the user terminal 810, and to provide additional functions related thereto.

Figure 10:
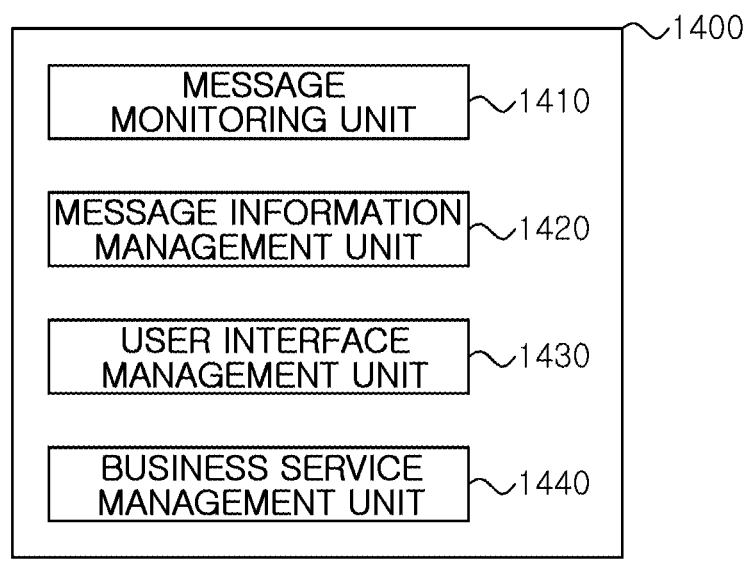
FIG. 10 is a block diagram illustrating a message information integrated management unit of a user terminal configured according to a first exemplary system configuration of the present invention.

FIG. 10 is a block diagram illustrating a message information integrated management unit of a user terminal configured according to a first exemplary system configuration of the present invention.

Referring to FIG. 10, the message information integrated management unit 1400 according to the present exemplary embodiment includes a message monitoring unit 1410, a message information management unit 1420, a user interface management unit 1430, and a business service management unit 1440.

The message monitoring unit 1410 inquires information about whether voice calls and text messages received or transmitted by the user terminal 810 are updated in association with the voice call management unit 1100 and the text message management unit 1200.

First, an operation in which the message monitoring unit 1410 inquires whether or not the information about the voice call is updated will be described.

When a voice call is received by a user's user terminal 810, the voice call management unit 1100 records information of the calling party of the received voice call, which is included in the received voice call in the memory 1500 of the user terminal 810. In addition, when the user of the user terminal 810 actually makes a call in response to the received voice call, the voice call management unit 1100 may record the time point of the call completion and/or the time of the call in the memory 1500. On the other hand, if the user of the user terminal 810 does not respond to the received voice call, that is, if the call connection fails, the voice call management unit 1100 may record the fact that the call connection has failed in the memory 1500. The message monitoring unit 1410 can access the memory 1500 to inquire recorded voice call information stored therein. The message monitoring unit 1410 can inquire whether the received voice call information is updated in some manners. First, the message monitoring unit 1410 may be configured to periodically access the memory 1500 to inquire whether the updated received voice call information is updated. Alternatively, the message monitoring unit 1410 may be configured to detect real time of update, whenever a voice call recording is updated. As yet another alternative exemplary embodiment, the message monitoring unit 1410 may be configured to inquire whether the received voice call information is updated at the time of execution of the message information integrated management unit 1400 of the user.

The performance of inquiring update of the received voice call information, which is performed by the message monitoring unit 1410 as described above, may be applied to the performance of inquiring update of the outgoing voice call information in a similar manner.

Next, an operation in which the message monitoring unit 1410 inquires whether information about the text message is updated will be described.

When a text message is received by the user's user terminal 810, the text message management unit 1200 records information of the sender, the time and the message content of the received text message (hereinafter referred to as "received text message information") in the memory 1500 of the user terminal 810. The message monitoring unit 1410 may access the memory 1500 to inquire whether the recorded received text message information is updated. The message monitoring unit 1410 may inquire whether the received text message information is updated in some manners. First, the message monitoring unit 1410 may be configured to periodically access the memory 1500 to inquire whether the received text message information is updated. Alternatively, the message monitoring unit 1410 may be configured to detect real time of update, whenever a text message recording is updated. As another alternative exemplary embodiment, the message monitoring unit 1410 may be configured to inquire whether the received message information is updated at the time of execution of the message information integrated management unit 1400 of the user.

The performance of inquiring update of the received text message information, which is performed by the message monitoring unit 1410 as described above, may be applied to the performance of inquiring update of the outgoing text message information in a similar manner.

The message information management unit 1420 is configured to inquire the updated voice call information and text message information detected by the message monitoring unit 1410 and to generate the integrated message information to be provided to a user through the message management user interface. For example, when the message monitoring unit 1410 detects a new incoming voice call, the message information management unit 1420 inquires the corresponding incoming voice call information, and generates the integrated message information to be provided to a user, based on the inquired incoming voice call information. The generated integrated message information may be recorded in the memory 1500.

Such an integrated message information management process can be processed in synchronization with the message monitoring operation of the message monitoring unit 1410.

In addition, the message information management unit 1420 may be configured to operate asynchronously with the operation of the message monitoring unit 1410. That is, even if the message monitoring unit 1410 is configured to inquire whether the voice call information and the text message information are updated periodically or in real time, the message information management unit 1420 may record the message information in a different period than the monitoring period, or may be configured to operate only at the time of execution of the message information integrated management application. At this time, due to the asynchronism of the two operations, the inquiry result whether the voice call information and the text message information of the message monitoring unit 1410 are updated is temporarily recorded in the memory 1500.

On the other hand, the message information management unit 1420 is configured to access the memory 1500 to read information about whether or not the message inquired by the message monitoring unit 1410 is updated, and to generate the integrated message information, based on the information.

The user interface management unit 1430 generates and displays a message management user interface provided to a user, receives various user inputs from the message management user interface, and performs processing corresponding to the user input. In detail, the user interface management unit 1430 generates a first message management user interface in response to the user input, and displays it on the user terminal 810. In addition, the user interface management unit 1430, generates a second message management user interface in response to the user's input, and displays it on the user terminal 810.

The message information integrated management unit 1400 may be hardware, software, or a combination thereof configured to perform the processing described above. For example, the message information integrated management unit 1400 may include software that includes the above-described message monitoring functions, message management functions, and commands necessary for processing the user interface management functions, and a processor in the user terminal 810 that performs processing according to the commands. At this time, the software constituting the message information integrated management unit 1400 may be installed in the user terminal 810 in the form of an application. Also, the message monitoring unit 1410, the message management unit, and the user interface management unit 1430 may be configured by independent software and hardware, respectively. However, the functions may be distributed by various software and hardware.

The operation of the message information integrated management unit 1400 according to an exemplary embodiment will be described in more detail.

First, the process of generating the first message management user interface by the user interface management unit 1430 will be described in detail with reference to FIGS. 11 and 12.

Figure 11:
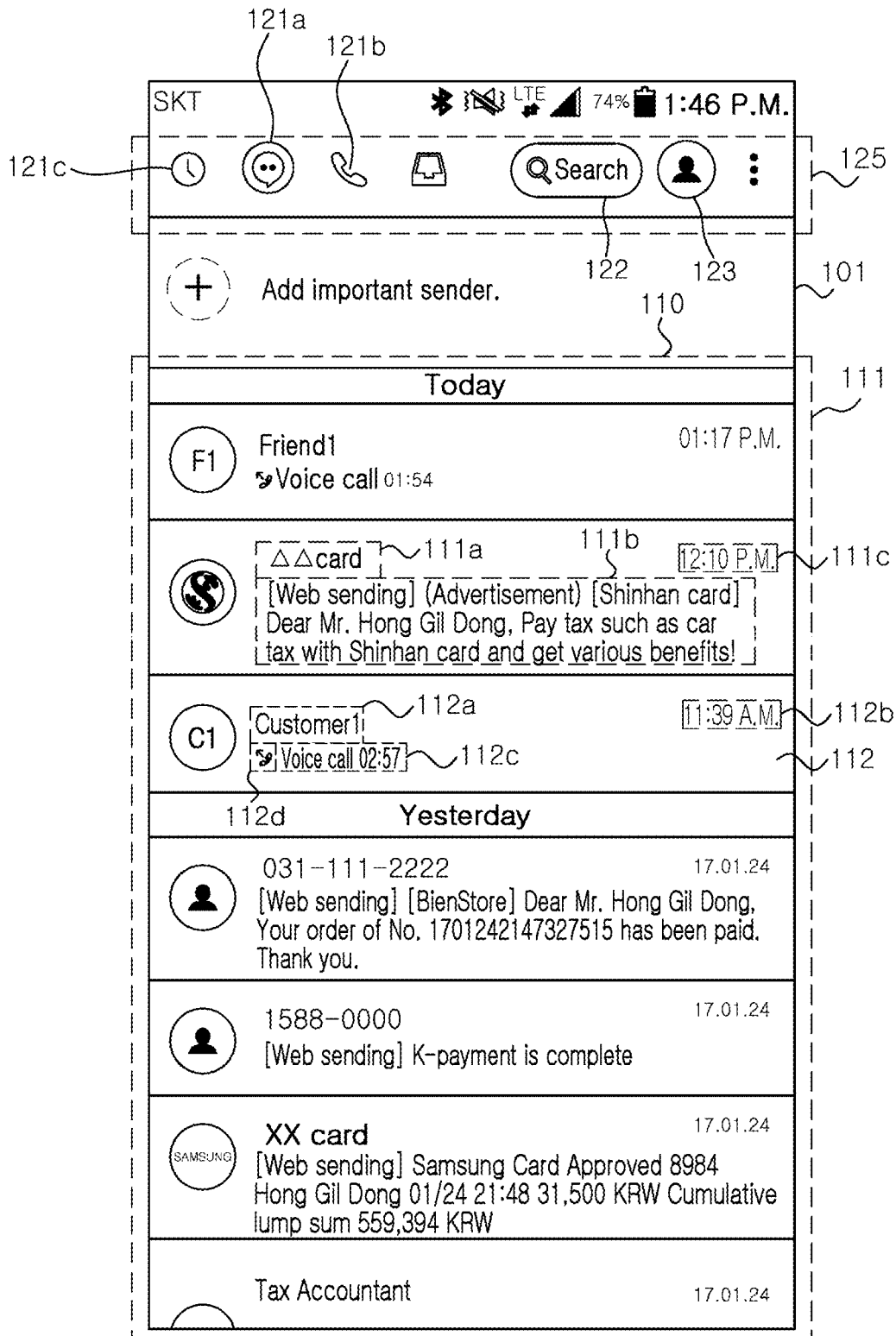
FIG. 11 is a screen shot illustrating a first exemplary message management user interface (UI) displayed on a user terminal.

FIG. 11 is a screen shot illustrating an example of a first message management user interface displayed on a user terminal.

FIG. 11 shows an example of the first message management user interface 101 displayed on the user terminal 100 in FIG. 1 or 810 in FIG. 8 and the first message management user interface 101 includes a message information display area of the interface unit 110 and a menu bar 125 for providing menus such as interface switching. The message information display area of the interface unit 110 includes a plurality of message blocks 111 and 112. Each of the message blocks 111 and 112 contains integrated message information corresponding to one voice call or text message. The integrated message information is information generated from voice call information or text message information recorded in the memory 1500, and is composed of all or a part of items included in the voice call information and the text message information.

In the exemplary embodiment disclosed in FIG. 11, the message block 111 (hereinafter referred to as a "text message block") for a text message displays a counterpart 111a of a text message, a content 111b of the text message, and the time 111c which is when the text message is received or transmitted. On the other hand, the message block 112 (hereinafter referred to as a "voice call message block") for a voice call message displays a counterpart 112a of a voice call, a content 112b of the voice call, the time 112c which is when the voice call is received or transmitted, and a reception/transmission identification information 112d. Other items may be displayed in the message blocks 111 and 112. For example, the call connection failure indicator, the date of receipt and transmission of the message, and the place where the message is received and sent may be further displayed.

The message blocks 111 and 112 are arranged in a time-series manner by the user interface management unit 1430. For example, the message blocks 111 and 112 are arranged in descending order according to the reception and transmission time. Accordingly, message blocks 111 and 112 relating to the most recently received or transmitted message are displayed at the top of the message information display area of the interface unit 110.

Hereinafter, a process (Hereinafter referred to as "first message management user interface process") performed by the message information integrated management unit 1400 for generating the first message management user interface 101, will be explained in detail referring to FIG. 12.

Figure 12:
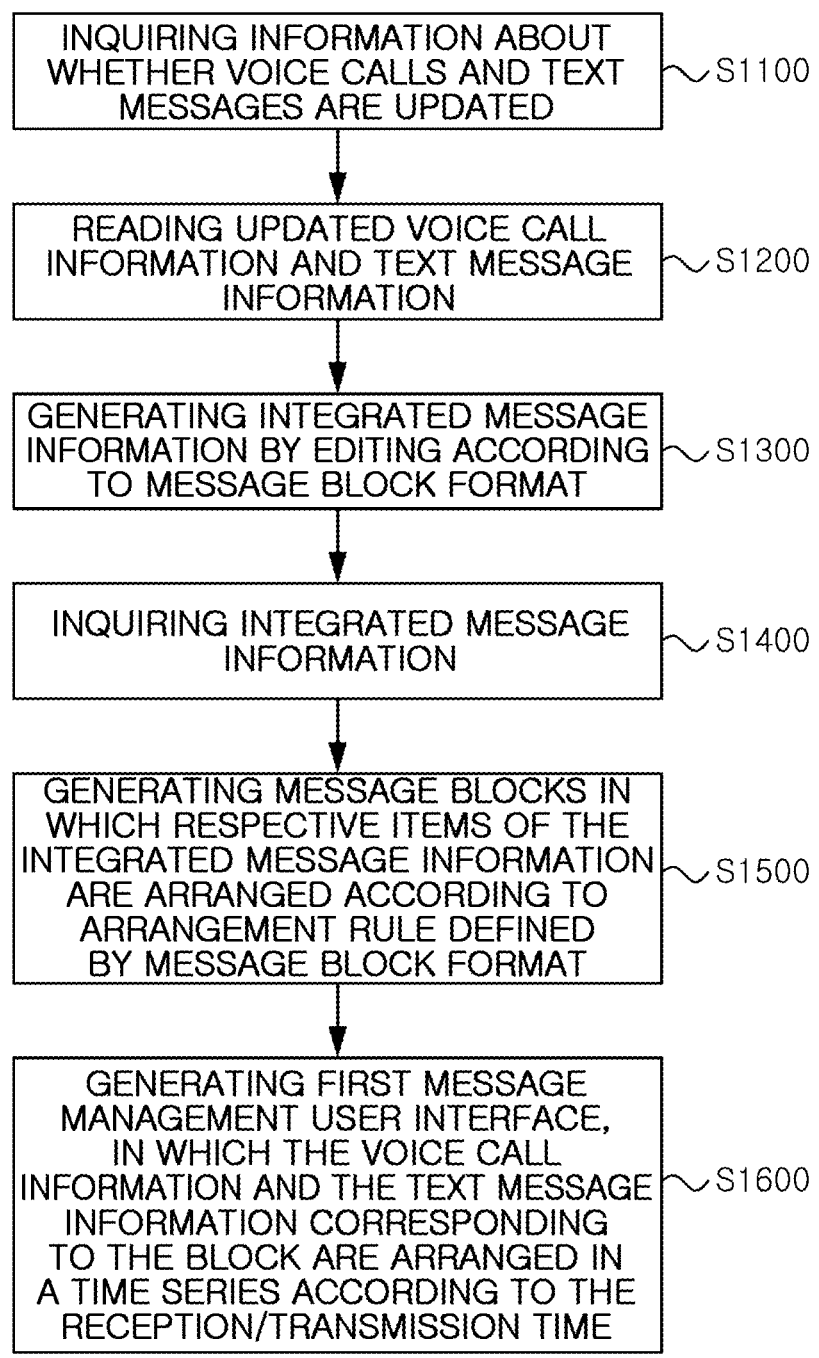
FIG. 12 is a flowchart illustrating a process for generating a first message management user interface having the configuration shown in FIG. 11.

FIG. 12 is a flowchart showing a process for generating of the first message management user interface 101 having the configuration shown in FIG. 11.

Referring to FIGS. 11 and 12, the message monitoring unit 1410 inquires whether the voice call and the text message information received or transmitted by the user terminal 810 are updated in association with the voice call management unit 1100 and the text message management unit 1200 (step S1100).

When the updated voice call information or text message information, i.e., newly received or transmitted voice call information or text message information, is detected by the message monitoring unit 1410, the message management unit reads the updated voice call information and text message information (step S1200), and generates the integrated message information by editing according to the message block format (step S1300).

The message block format is a definition of the type and format of information to be included in the message blocks 111 and 112, and may be set by the user or the message information integrated management system. For example, in the exemplary embodiment disclosed in FIG. 11, the message block 111 relating to the text message may be configured to include information on the recipient/sender contact (counterpart) 111a, a message body (content) 111b and the reception/transmission time 111c among the text message information stored in the memory 1500, and the message block 112 relating to the voice call may be configured to include a recipient/sender contact (counterpart) 112a, a reception/transmission time (content) 112b, a total talk time (or a call connection failure indication) 112c, and reception/transmission identification information 112d. The message management unit extracts only the items defined by the message block format from the voice call information and the text message information to generate the integrated message information.

When the user input for executing the message information integrated management application is received, the user interface management unit 1430 inquires the integrated message information generated by the message information management unit 1420 (step S1400).

The user interface management unit 1430 generates the message blocks 111 and 112 in which the respective items of the integrated message information are arranged according the arrangement rule defined by the message block format (step S1500). The arrangement rule is a definition related to a position where each item of the integrated message information to be displayed in the message blocks 111 and 112 is to be placed. For example, the other party identification information (counterpart) 111a, the reception/transmission time (content) 111b, and the time 111c may be defined to be disposed at specific positions of the message blocks 111 and 112 shown in FIG. 11. At this time, the user interface management unit 1430 generates the message blocks 111 and 112 in which the respective items of the integrated message information are arranged in the positions as shown in FIG. 11.

In step S1600, the user interface management unit 1430 generates the first message management user interface 101, in which the voice call information and the text message information corresponding to the block are arranged in a time series according to the reception/transmission time to display it through the first message management user interface 101.

The integrated message information generated by the message management unit or the message blocks 111 and 112 generated by the user interface management unit 1430 may be recorded in the memory 1500.

Hereinbefore, an exemplary embodiment in which editing of the voice call information and the text message information, and generating/editing of integrated message information are performed by the message management unit, is explained, but all or part of such processing may be performed by the user interface management unit 1430. For example, when the message format is displayed through an arrow image indicating reception/transmission, the user interface management unit 1430 may change the corresponding item to the arrow image in the step of generating the first message management user interface 101.

The first message management user interface 101 of FIG. 11 includes a menu bar 125. The mode selection icons 121a, 121*b* and 121*c* of the first message management user interface 101, the search tool 122 and the address book icon 123 are displayed on the menu bar.

When the input window of the search tool 122 is touched, the user interface management unit 1430 provides a text input user interface. When a user inputs a search word through a text input user interface, the user interface management unit 1430 searches the integrated message information including the inputted search word through a search engine (not shown) built into the message information integrated management unit 1400, and displays the search result on the first message management user interface 101.

When a user touches the address book icon 123 of the menu bar, the user interface management unit 1430 accesses the address book application and reads the address book information. At the same time, the user interface management unit 1430 switches the first message management user interface 101 to the address book user interface and displays it via the display device of the user terminal 810.

The first message management user interface 101 may be switched to a second message management user interface by a user input.

Hereinafter, the second message management user interface generation process will be described in detail with reference to FIGS. 13 and 14.

Figure 13:
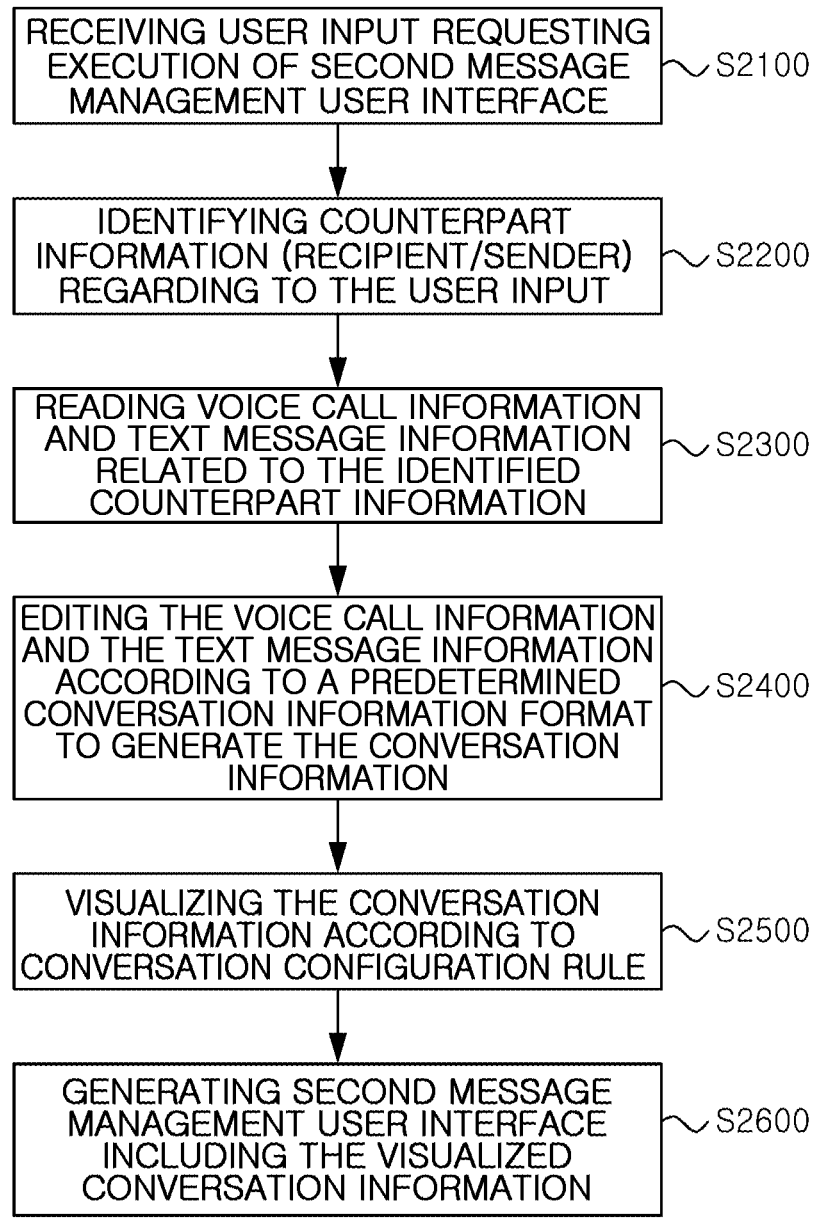
FIG. 13 is a flowchart illustrating a process of generating a second message management user interface.

FIG. 13 is a flowchart illustrating a process of generating a second message management user interface. FIG. 14 is a screen shot showing an example of a second message management user interface provided by the message information integrated management unit of the present invention.

In step S2100, the user interface management unit 1430 receives a user input requesting execution of the second message management user interface. At this time, the user input requesting execution of the second message management user interface may be, for example, a user input performed by touching the message information blocks 111, 112 displayed on the first message management user interface 101. In addition, the user input requesting execution of the second message management user interface may be a user input performed by touching the message reception notification displayed on the status bar of the user terminal 810 without the message information integrated management application being executed.

When the user input requesting execution of the second message management user interface is received, the user interface management unit 1430 identifies the counterpart information (recipient/sender) of the message block selected by the user (step S2200). In step S2300, the message management unit reads all the voice call information and the text message information related the identified counterpart information, and edits the voice call information and the text message information according to a predetermined conversation information format to generate the conversation information (step S2400). The conversation information format is a definition related to the item and the format of the message information to be displayed in the second message management user interface. For example, the conversation information format of a voice call is defined as having a format of "call XX:XX" and "afternoon (morning) OO:OO" for the call time item and the reception/transmission time point. On the other hand, the conversation format of the text message is defined as having a format of "OO:OO" for the reception/transmission time point item of the text message information and a full text format for the text message content item. In this case, the message management unit extracts only items defined by the conversation information format from the voice call information and the text message information, and edits the extracted items according to the display format defined in the conversation information format, thereby generating conversation information.

In the above description, the process of generating conversation information (step S2400) has been described by way of example with the message management unit, but all or some of such processes may be performed by the user interface management unit 1430.

In step S2500, the user interface management unit 1430 visualizes the conversation information according to a conversation configuration rule, and generates a second message management user interface including the visualized conversation information (step S2600). The conversation configuration rule is a rule concerning the arrangement and display format of the conversation information generated by the message management unit. For example, 1) the conversation information of the incoming voice call and the text message is placed on the left side of the interface, the conversation information on the outgoing voice call and the text message is placed on the right side of the interface, 2) text content item of text message information and the call time information of the voice call information are visualized by inserting them into the speech bubble image, 3) the reception/transmission time information is displayed next to the speech bubble, and 4) all conversation information is displayed in descending order according to the reception/transmission time. The user interface management unit 1430 processes and visualizes each item of conversation information according to the same configuration rule as the above example, and generates a second message management user interface of which result is displayed.

Figure 14:
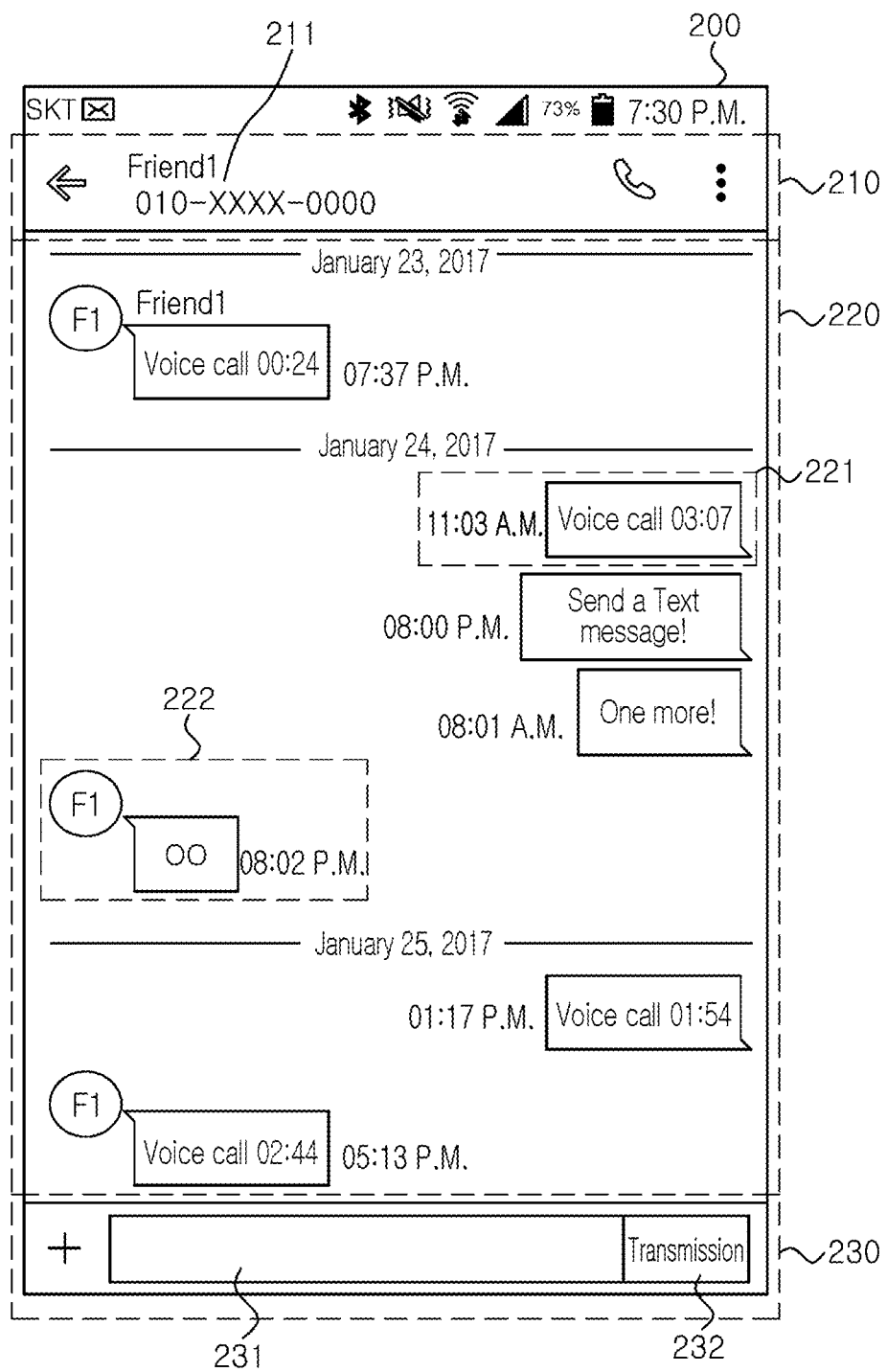
FIG. 14 is a screen shot showing an example of a second message management user interface provided by the message information integrated management unit of the present invention.

The second message management user interface generated in accordance with the conversation information format and the conversation configuration rule exemplified above is as shown in FIG. 14.

Referring to FIG. 14, the second message management user interface 200 includes a title unit 210, a conversation display unit 220, and a text input unit 230, which are provided with counterpart information and a telephone dialing icon. The conversation display unit 220 displays the conversation information visualized according to the conversation information format and the conversation configuration rule. For example, the unit conversation 221 relates to the outgoing voice call, and the call time item is inserted and visualized in the speech balloon in the form of "Voice call 03:07" and the outgoing time point item is visualized as a text string "11:03 A.M." next to the speech balloon according to the conversation information format and the conversation configuration rule. The unit conversation 222 relates to a received text message, and the text message content item is inserted and visualized in the speech balloon in the form of "OO" as a full text and the incoming time point item is visualized as a text string "08:02 P.M." next to the speech balloon according to the conversation information format and the conversation configuration rule. In addition, the unit conversation 222 regarding to the received text message is arranged on the left side of the interface, the unit conversation 221 regarding to the outgoing voice conversation is arranged on the right side of the interface, and unit conversation 221 is placed above the more recent unit conversation 222.

The second message management user interface 200 is configured to provide detailed information on a message exchange with a specific party. For example, the second message management user interface 200 may be configured to provide information on voice calls and text messages exchanged with specific users in a time series and in an interactive manner. While the first message management user interface 101 lists information on all message exchanges in a time series manner, the second message management user interface 200 displays the contents of a message exchanged for specific users more specifically.

The second message management user interface 200 may be provided in response to various user inputs. First, as described above, when the user interface management unit 1430 detects a user's input action ("message block selection input") such as touching a specific message information block displayed on the first message management user interface 101, the user interface management unit 1430 identifies the recipient or sender information ("contact information") included in the selected message block. The user interface management unit 1430 inquires the integrated message information having the identified counterpart information from the memory 1500, configures the second message management user interface 200 by listing the inquired integrated message information in a time series, and then displays it on the user terminal 810. That is, the user interface management unit 1430 converts the first message management user interface 101 into the second message management user interface 200 in which all message information about the other party included in the selected message block is listed in a time series in response to the user's message block selection input.

At this time, the second message management user interface 200 may display and provide each message information interactively. In the example of FIG. 14, the information on the message information received from the other party, that is, the information on the received voice call and the received text message, is displayed on the left reception conversation block, and the message information transmitted by a user is displayed on the right transmission conversation block. The incoming conversation block and the outgoing conversation block may be generated with different colors and fonts for easy identification.

The second message management user interface 200 may be configured to include a text input unit 230. The text input unit 230 may be disposed at the lower end of the second message management user interface 200, as shown in FIG. 14. The text input unit 230 includes a text input window 231 and a text transmission graphic user interface 232.

Referring again to FIGS. 8 and 10, the business service management unit 1440 performs processing for providing the business service registered by a business service subscriber (not a user of the user terminal) through the integrated message management application.

Business services refer to services such as promotion, advertising, and customer service provided to customers in relation to the work of a group or an individual. The business service subscriber refers to an individual or a group registered in the message information integrated management service server 1520 in order to provide the business service to the user of the integrated message management application through the integrated message management application according to the present invention. That is, the business service subscriber refers to an individual or a group registered as a business service provider in the message information integrated management service server 1520 according to the present invention. In addition, the business service subscriber may be a user of the integrated message management service. In other words, a user of the integrated message management application may subscribe to the business service. The business service subscriber can register information related to the business service (hereinafter, referred to as 'business service information') to the message information integrated management service server at the same time as the subscription of the business service or after the subscription of the service.

The business service information registered by the business service subscriber is stored in the business service database (DB) of the message information integrated management service server. The subscription processing of the business service will be described in more detail in connection with the concrete service processing.

The business service management unit inquires the business service information related to the business service subscriber and transmits the inquired business service information to the interface management unit. The interface management unit visualizes the business service information received from the business service management unit and displays it on the message integration management user interface.

Meanwhile, the business service management unit performs information management functions such as storing, updating, and deleting the business service information.

Figure 15:
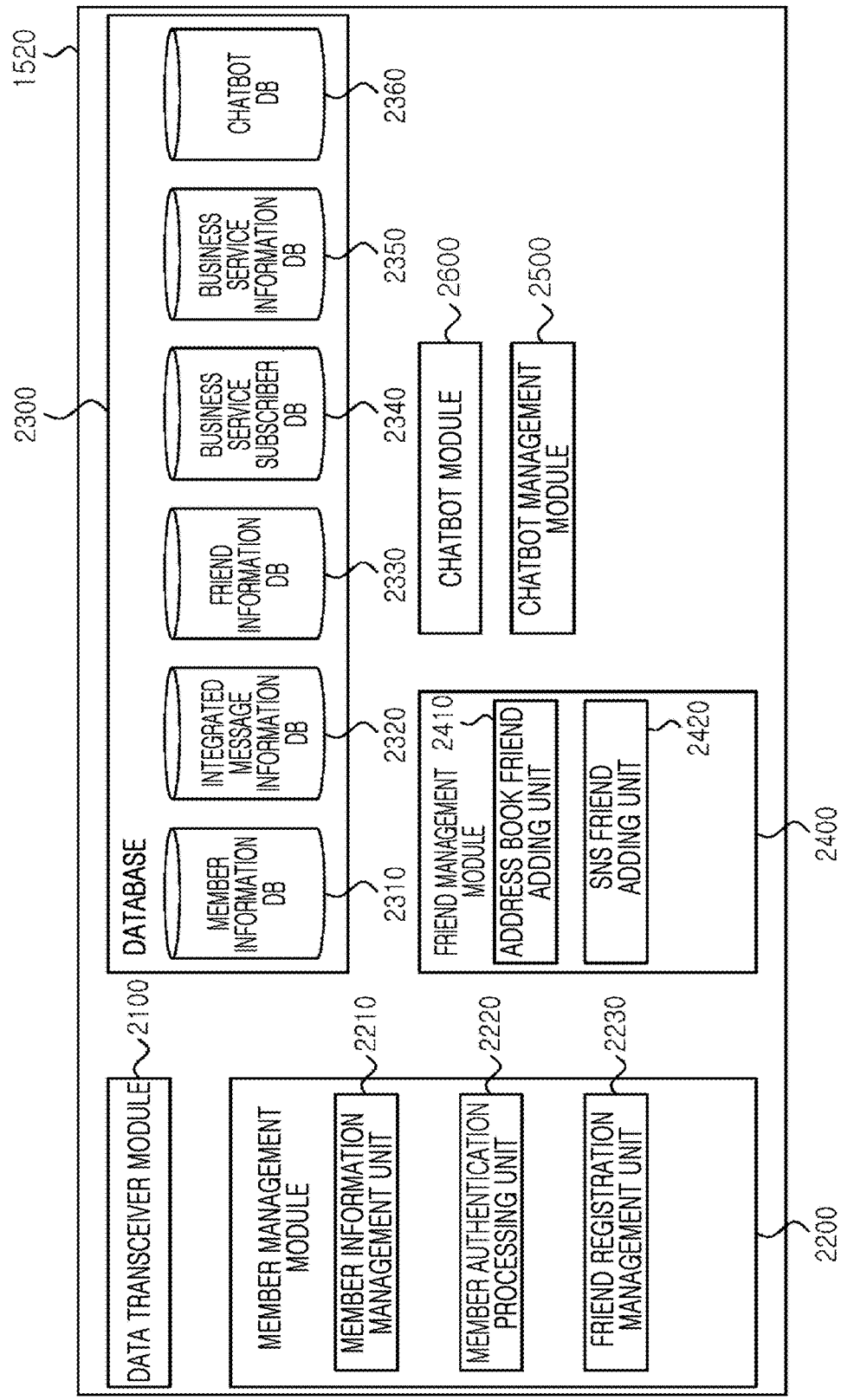
FIG. 15 is a block diagram illustrating a configuration of a message information integrated management service server according to the first exemplary system configuration of the present invention.

FIG. 15 is a block diagram illustrating a configuration of a message information integrated management service server 1520 according to the first exemplary system configuration of the present invention.

Referring to FIG. 15, the message information integrated management service server 1520 according to an exemplary embodiment of the present invention may include a data transceiver module 2100, a member management module 2200, a database 2300, a friend management module 2400, a chatbot management module 2500 and a chatbot module 2600.

The data transceiver module 2100 receives information (integrated message information, schedule information, memo information, etc.) generated in association with the message information integrated management application from the user's user terminal, and transmits information managed by the message information integrated management service server 1520 to the user terminal. In addition, the data transceiver module 2100 exchanges signals and data with the business service subscriber terminal 40. In other words, the data transceiver module 2100 connects the user terminal 810 and the business service subscriber terminal 40 to the server 20 through a data network, and transmits and receives the signals and data.

The member management module 2200 manages various personal information registered by a user as a member of the message information integrated management service.

The member management module 2200 may include a member information management unit 2210, a member authentication processing unit 2220, a friend registration management unit 2230, etc. The member information management unit 2210 stores various member-related information inputted when each user accesses the message information integrated management service server 1520 to join the service, in the database 2300, and updates the various member-related information modified through the message information integrated management application of a user terminal.

The member authentication processing unit 2220 performs authentication in cooperation with an authentication server (not shown) when each of the registered users accesses the message information integrated management service server 1520. In addition, when a user who does not subscribe to the message information integrated management service accesses the message information integrated management service server 1520, the member authentication processing unit 2220 may provide the above-described message information integrated management application to the user terminal of the corresponding user. That is, the member authentication processing unit 2220 may guide the installation so that the user can download and install the message information integrated management application, or may automatically provide the application.

The friend registration management unit 2230 manages friends of a message information integrated management platform service user registered by various methods.

The friend management module 2400 may include an address book friend adding unit 2410 and an SNS friend adding unit 2420 to perform functions according to the exemplary embodiments of the present invention. The address book friend adding unit 2410 searches the address book stored in the user terminal 810 and automatically registers the searched friends as a message information integrated management service friend. The SNS friend adding unit 2420 searches a SNS friend registered in the SNS service (e.g., 'Facebook' or 'Kakao Talk' service) subscribed by the user of the user terminal 810 and automatically registers the searched friends as the message information integrated management service friend. In this way, each functional unit of the friend management module 2400 provides a function of registering an acquaintance as the message information integrated management service friend in various ways according to an exemplary embodiment of the present invention. For example, when a message information integrated management service client application installed in a user terminal 810 is executed, the client application directly reads the address book data stored in the user terminal 810, and transmits each data of the address book to the message information integrated management service server 1520. Then, the message information integrated management service server 1520 inquires the member information stored in the member information database for each acquaintance included in the address book data to determine whether or not to join the membership, and transmits the result to the user terminal 810 so that automatic friend registration can be performed.

The database 2300 storing and transmitting various data includes a member information database 2310, an integrated message information database 2320, a friend information database 2330, a business service subscriber database 2340, a business service information database 2350, a chatbot database 2360, etc. The database 2300 may further include other databases for providing a message information integrated management service according to the present invention.

The member information database 2310 stores various information of members who have joined the message information integrated management service. For example, the member information database 2310 may include, a personal information of the member, a photograph necessary for the profile information, a nickname, a latest access time, SNS subscription information, personal information exposure setting information, automatic login setting information, as the member information.

The integrated message information database 2320 stores an integrated message information generated through the message information integrated management application.

The friend information database 2330 stores various kinds of information related to a message information integrated management service, which is automatically registered according to a user according to an exemplary embodiment of the present invention. For example, friend information database 2330 may store ID and nickname information of registered friends, registration path information, friend blocking information, and the like.

The business service subscriber database 2340 stores various kinds of information of members who subscribe to the business service. For example, the business service subscriber database 2340 may store personal information of a business service subscriber, profile information, an identifier (ID) assigned by message information integrated management service server 1520, contact information, financial information for billing, and the like.

The business service information database 2350 stores information about services that the business service subscribers want to provide the message information integrated management application user. For example, the business service information database 2350 may store promotional contents and advertisement contents of the business service subscribers. In addition, the business service information database 2350 may store an element for visualizing a customized message to be described later, that is, a message visualization component.

The chatbot database 2360 stores information necessary for a business service subscriber to operate a consulting chatbot. The chatbot database 2360 may store data relating to the conversation analysis model for analyzing the message of the user of the message information integrated management application (corpus data, analysis rule data, morpheme data, etc.), and data for responding to the analyzed user message (response data indexed according to the question, corpus data for generating a response, morphological data, etc.).

The chatbot management module 2500 manages functions and operations of the chatbot module 2600.

Figure 16:
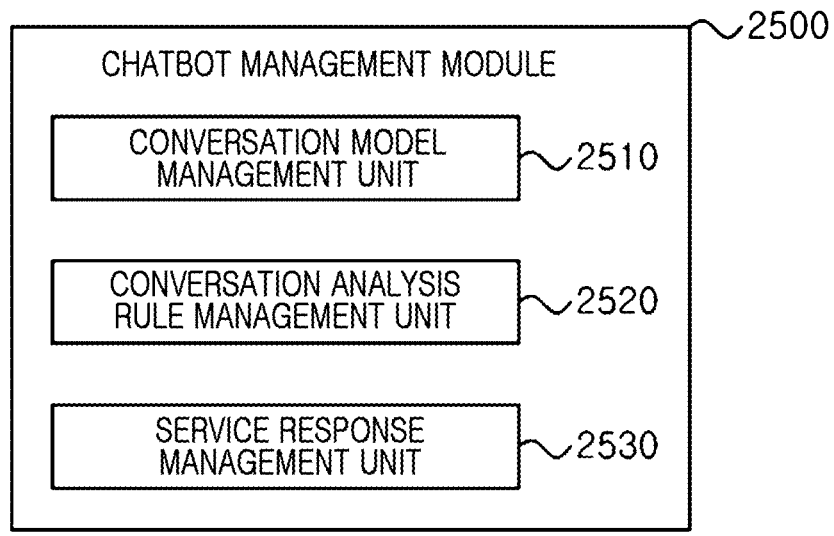
FIG. 16 is a block diagram showing the configuration of the chatbot management module.

FIG. 16 is a block diagram showing the configuration of the chatbot management module.

Referring to FIG. 16, the chatbot management module 2500 includes a conversation model management unit 2510, a conversation analysis rule management unit 2520, and a service response management unit 2530 and the like.

The conversation model management unit 2510 manages the chat model used in the chat service response generation rule and analysis rule. In addition, the conversation model management unit 2510 collects conversation data through the integrated message management platform according to the present invention, analyzes the collected data, and reflects the collected data to the generated conversation model.

The conversation analysis rule management unit 2520 performs the function of updating or creating the conversation analysis rule based on the conversation model generated or updated by the conversation model management unit 2510. The conversation analysis rule management unit 2520 also performs a function of transmitting the updated or added analysis rule to the user's user terminal 10. That is, the analysis rule 1444 of the business service management unit 1440, which is installed in the user terminal 10 is updated by the conversation analysis rule management unit 2520 of the server 1520.

The service response management unit 2530 manages the chat service response performed by the chatbot module 2600. Specially, the service response management unit 2530 performs a function of creating and changing the service response rules of the chatbot module 2600.

The chatbot module 2600 analyzes the contents of the received and outgoing text messages, searches for one or more services corresponding to the analyzed message contents, and provides the retrieved services to the user.

Figure 17:
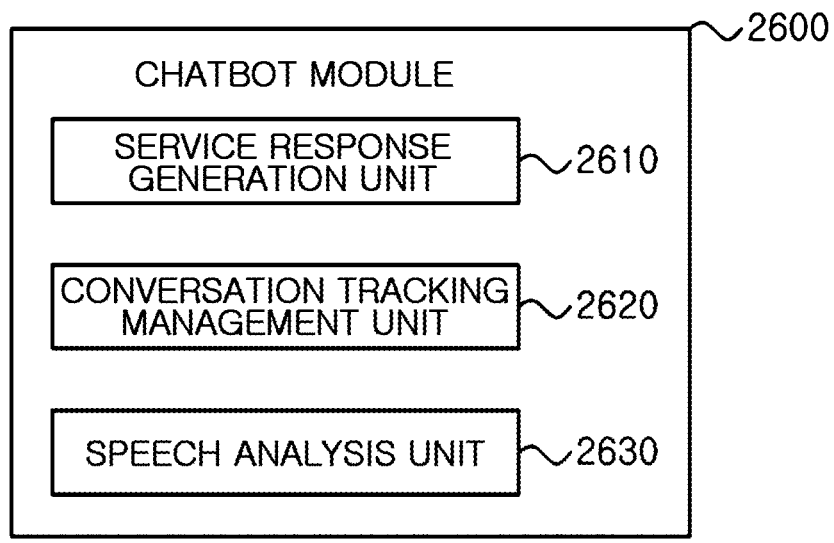
FIG. 17 is a block diagram showing the configuration of a chatbot module according to an exemplary embodiment of the present invention.

FIG. 17 is a block diagram showing the configuration of a chatbot module 2600 according to an exemplary embodiment of the present invention.

Referring to FIG. 17, the chatbot module 2600 includes a speech analysis unit 2630, a conversation tracking management unit 2620, and a service response generation unit 2610.

The speech analysis unit 2630 performs morpheme analysis and speech analysis on the messages of the user and the conversation partner. The morpheme analysis is a process of separating the text of the message into morpheme units, that is, dictionary headwords, restoring the original form of the deformed morpheme, and obtaining consecutive morphemes matching the word formation rules from the separated unit morphemes. The speech analysis is performed for each speech unit, which is a process of deducing the purpose of a message from the format of the text that makes up the speech unit. The speech unit may be a corpus ending with a termination ending and ending signs such as a period, a question mark, an exclamation point, and the like. The speech unit is analyzed by the primary speech act which is the intent of the intended communication through the message, the semantic action which is the intention of the speaker to be conveyed by the message, and the related element corresponding to the specific entity related to the semantic action. Each speech unit may be analyzed by the speech analysis module 1441 and tagged in the form of a 'coinage_method behavior_relation element'. The speech analysis process of the present invention will be described as follows by using an exemplary sentence of "I want to cancel my reservation, but what do I do?". First, this sentence is divided into morpheme units through morpheme analysis, and grasp the meaning of each morpheme. Next, the format and intent of this message is analyzed through the analysis of the speech. This message includes a corpus "How do I (?)" asking how, which is composed of the (adjective) adverbial "how" about the mode, and the questionable form of the verb "do". Therefore, the purpose of this sentence, the coinage, is 'How question'. Also, the act that the speaker intends, that is, the semantic act is 'cancel', and the related element which is a concrete object related to the semantic action becomes 'reservation'. As another example, the speech analysis process by using an exemplary sentence of "at 6:00 pm, the reservation is full and cannot be done." is as follows. Through morpheme analysis and analysis of sentences, this sentence is terminated by a period and contains specific information, so the coinage line for the purpose of the sentence can be seen as 'information transfer'. The action of the speaker intended by the sentence, that is, the semantic action is 'rejection', and the related element (object of rejection) related to rejection is '6 o'clock reservation'. The speech analysis unit 2630 of the present invention grasps the purpose of the message which is a speech unit, the intention of the speaker, and the related elements through the speech analysis.

The service response generation unit 2610 generates a response that matches the intention and purpose of the message analyzed by the speech analysis unit 2630 and provides it to the user. The response generated by the service response generation unit 2610 of the chatbot module 2600 is transmitted to the user terminal through the data transceiver module. More specifically, the service response generation unit 2610 searches the chatbot database for answers that match the user's query intent analyzed by the speech analysis unit 2630, and transmits the retrieved answers to the user terminal through the data transceiver module. The process of generating a service response to the user message "How do I cancel my reservation?" is as follows. First, the speech analysis unit 2630 analyzes the corresponding user message to determine that the user's message is intended to "cancel the reservation". The service response generation unit 2610 inquires the chatbot database 2360 and searches for the indexed response in response to the 'cancel reservation inquiry' which is the analysis result of the speech analysis unit 2630. For example, a reservation canceling message containing information such as a reservation cancellation procedure, a cancel notice, a link to the reservation cancellation reception page may be indexed and stored in in the chatbot database 2360 with the query word 'reservation cancellation'. The service response generation unit 2610 reads out the reservation canceling guidance message retrieved from the chatbot database 2360 and transmits it to the user terminal 810 through the data transceiver module 2100.

The operations related to the message integrated management service of the message information integrated management service server 1520 shown in FIG. 15 configured as described above are as follows.

First, the data communication module receives the integrated message information from the user terminal. The reception of the integrated message information may be initiated in various manners. For example, the user terminal can be configured to immediately transmit the integrated message information to the message information integrated management service server 1520 whenever the integrated message information is generated or changed. Alternatively, the user terminal may be configured to transmit the integrated message information to the message information integrated management service server 1520 according to a predetermined period. In this case, if there is no integrated message information added or changed after the previous period, the transmission operation may be omitted. As another example, the user terminal may be configured to transmit updated integrated message information to the message information unified management service server 20 only upon execution of the message information unified management application. Unlike the above-mentioned transmission by the user terminal, the service server 1520 may be configured such that the message information integrated management service server 1520 accesses the user terminal to inquire the updated integrated message information and directly read the updated integrated message information.

The message information integrated management service server 1520 stores the received integrated message information in a database. The database stores each integrated message information received from the user terminal in association with the user of the user terminal.

Next, when the data communication module receives a request for searching the integrated message information stored in the database from the user's user terminal, the message information integrated management service server 1520 reads the integrated message information of the corresponding user from the database to transmit it to the user terminal.

The user terminal having received the integrated message information displays the received integrated message information on the first message management user interface 101 and the second message management user interface 200 through the processing as described above.

Hereinbefore, although the message information exchange and processing of the message information integrated management service server 1520 and the user terminal has been described above, the same method can be applied to the additional function information generated/changed by the user terminal.

The message integration management system according to the present invention can provide various business services. Hereinafter, the functions and operations of the business service management unit of a user terminal will be described separately for each business service with reference to FIGS. 18 to 31.

(1) Management and Distribution of Promotional and Advertising Information

According to an exemplary embodiment of the present invention, the business service subscriber can transmit the advertisement information and the advertisement information to the user of the message information integration management service through the message information integrated management service server 1520. The publicity information and the advertisement information are provided in a format other than the conventional SMS or MMS, but are displayed in the first message management user interface or the second message management user interface which are managing SMS or MMS.

Figure 18:
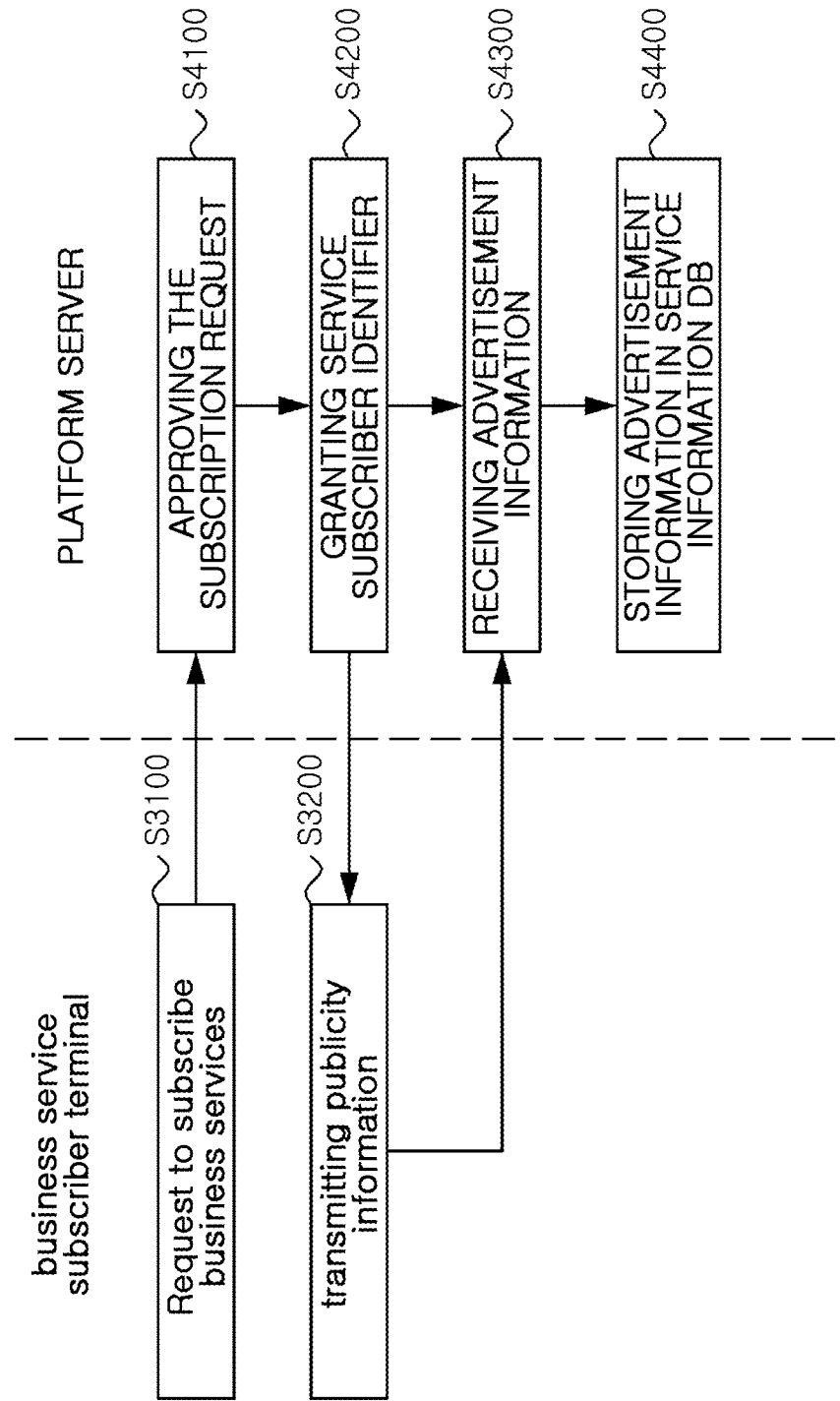
FIG. 18 is a flowchart illustrating a business service subscription procedure to be processed by the business service subscriber terminal and the message information integrated management service server.

FIG. 18 is a flowchart illustrating a business service subscription procedure to be processed by the business service subscriber terminal and the message information integrated management service server.

Referring to FIG. 18, a group or an individual who wants to provide a business service through the integrated message management platform of the present invention accesses the message information integrated management service server 1520 through a terminal connected to a data network, to subscribe business service (step S3100). The service subscription application may include information on the applicant's personal information, the type of service desired to be subscribed, the limit on the scope of the service provision, and the payment of the service fee. Business service subscribers can limit the range of business services offered. For example, the business service subscribers can register their own address book to limit the transmission destination of the advertisement and advertisement contents to the users registered in the address book, or to restrict the number of promotional and advertising contents transmission.

The message information integrated management service server 1520 approves the subscription if the business service subscription request received from the business service subscriber terminal meets the requirement (step S4100).

When service subscription is approved, the message information integrated management service server 1520 grants a service subscriber identifier (step S4200). The service subscriber identifier may be an ID applied by the business service subscriber or an identification number automatically assigned by the message information integrated management service server 1520.

Subsequently, the business service subscriber terminal transmits the publicity information required for the business service to the message information integrated management service server 1520 (step S3200). The publicity information is information that the business service subscriber wants to provide to the user of the integrated message management platform, and may include various elements. For example, the publicity information may include text information such as a contact of a business service subscriber, an advertisement text, a promotional text, a product description, a notice, and the like, and may include non-text information such as an image, sound, etc. In addition, the publicity information may include rules (hereinafter referred to as "visualization rules") as to how to visualize the text information and the non-text information. In the example shown in FIG. 18, the registration of the business service information is performed after the service registration, but the registration of the business service information may be performed simultaneously with the service registration.

According to an exemplary embodiment of the present invention, the publicity information is classified into first type publicity information provided when the first message management user interface is executed, and second type publicity information provided when the second message management user interface is executed. The second type publicity information is provided only in the second message management user interface which is a communication partner of the business service subscriber, while the first type publicity information is provided in the first message management user interface that does not specify the communication partner.

The message information integrated management service server 1520 receives the advertisement information from the business service subscriber terminal (step S4300), and associates the received advertisement information with the registration service subscriber (for example, attaches the identifier of the service subscriber who registered the advertisement information) to store it in the service information database (step S4400).

Figure 19:
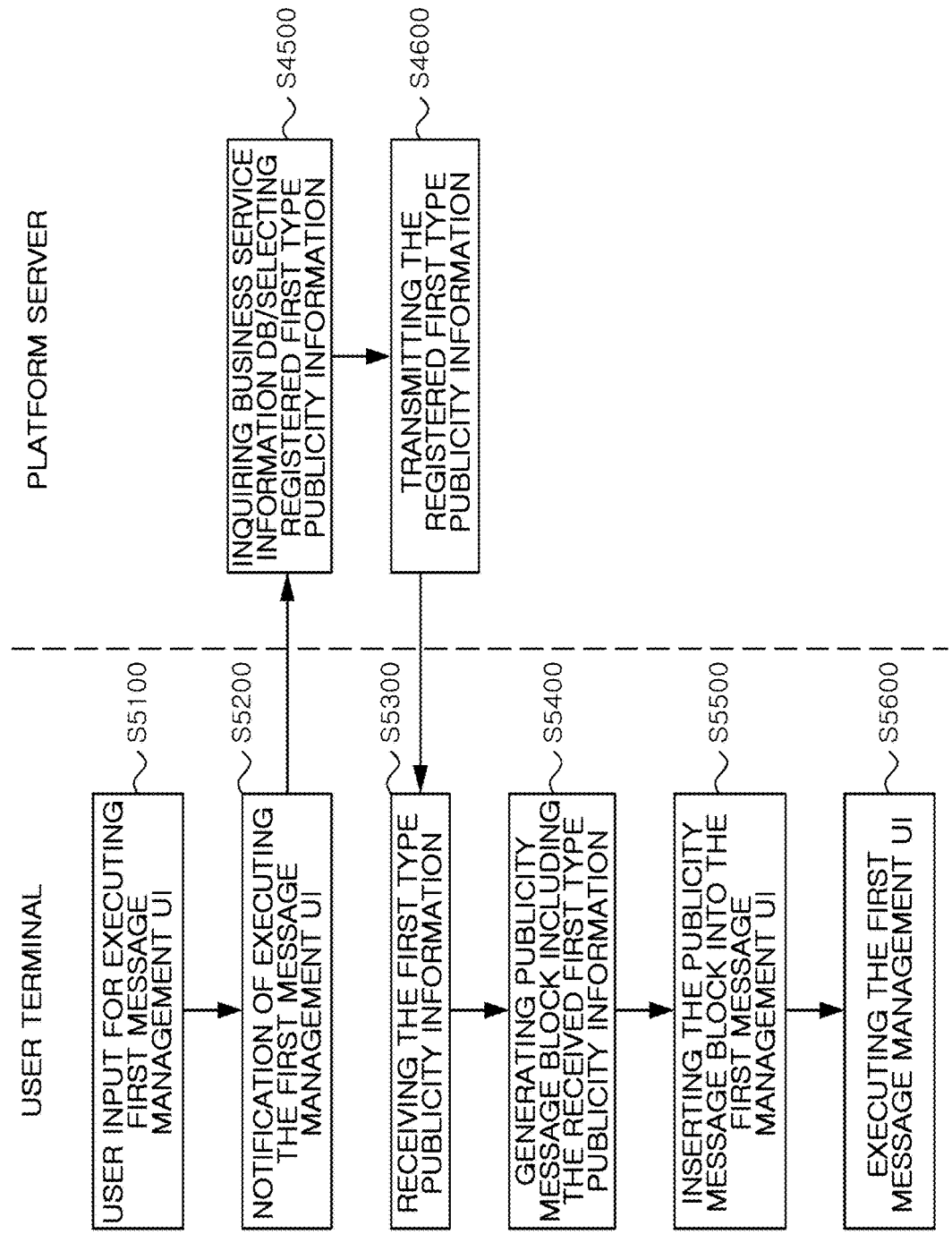
FIG. 19 is a flowchart showing an exemplary embodiment of visualization processing of the first type publicity information performed by the user terminal of the integrated message management platform and the message information integrated management service server.

FIG. 19 is a flowchart showing an exemplary embodiment of visualization processing of the first type publicity information performed by the user terminal of the integrated message management platform and the message information integrated management service server.

When a user of the integrated message management platform executes the integrated message management application installed in the user terminal (step S5100), the business service management unit generates a message indicating that the first message management user interface is executed and transmits the message to the message information integrated management service server 1520 (step S5200).

In response to the execution notification of the first message management user interface, the message information integrated management service server 1520 inquires the business service information database to search for the registered first type publicity information and to select at least one of the registered first type publicity information (step S4500). The first type publicity information may be provided regardless of the sender of the received text message. For example, in the business information database, a plurality of first type publicity information registered by a plurality of business service subscribers is stored, and the message information integrated management service server 1520 may randomly select one of the first type publicity information.

The message information integrated management service server 1520 transmits the selected first type publicity information to the user terminal (step S4600).

The business service management unit of the user terminal receives the first type publicity information from the message information integrated management service server 1520 (step S5300), and generates a publicity message block using the received first type publicity information (step S5400). As described above, the publicity information includes various display items and rules for visualizing these items (visualization information). The business service management unit arranges the display items included in the publicity information based on the visualization information to generate a publicity message block. The interface management unit inserts the generated publicity message block into the first message management user interface (step S5500). At this time, the interface management unit may be configured to insert the publicity message block into a specific location on the first message management user interface. For example, the publicity message block may be inserted at the boundary where the message reception date is changed. The first message management user interface lists incoming and outgoing text messages in a chronological order, and the interface management unit may insert the publicity message block at a boundary where the date of receipt and transmission of the message are divided into today and yesterday.

Hereinafter, a process of generating the publicity message block by visualizing the first type publicity information and inserting it in the first message management user interface will be described in more detail with reference to FIG. 20.

Figure 20:
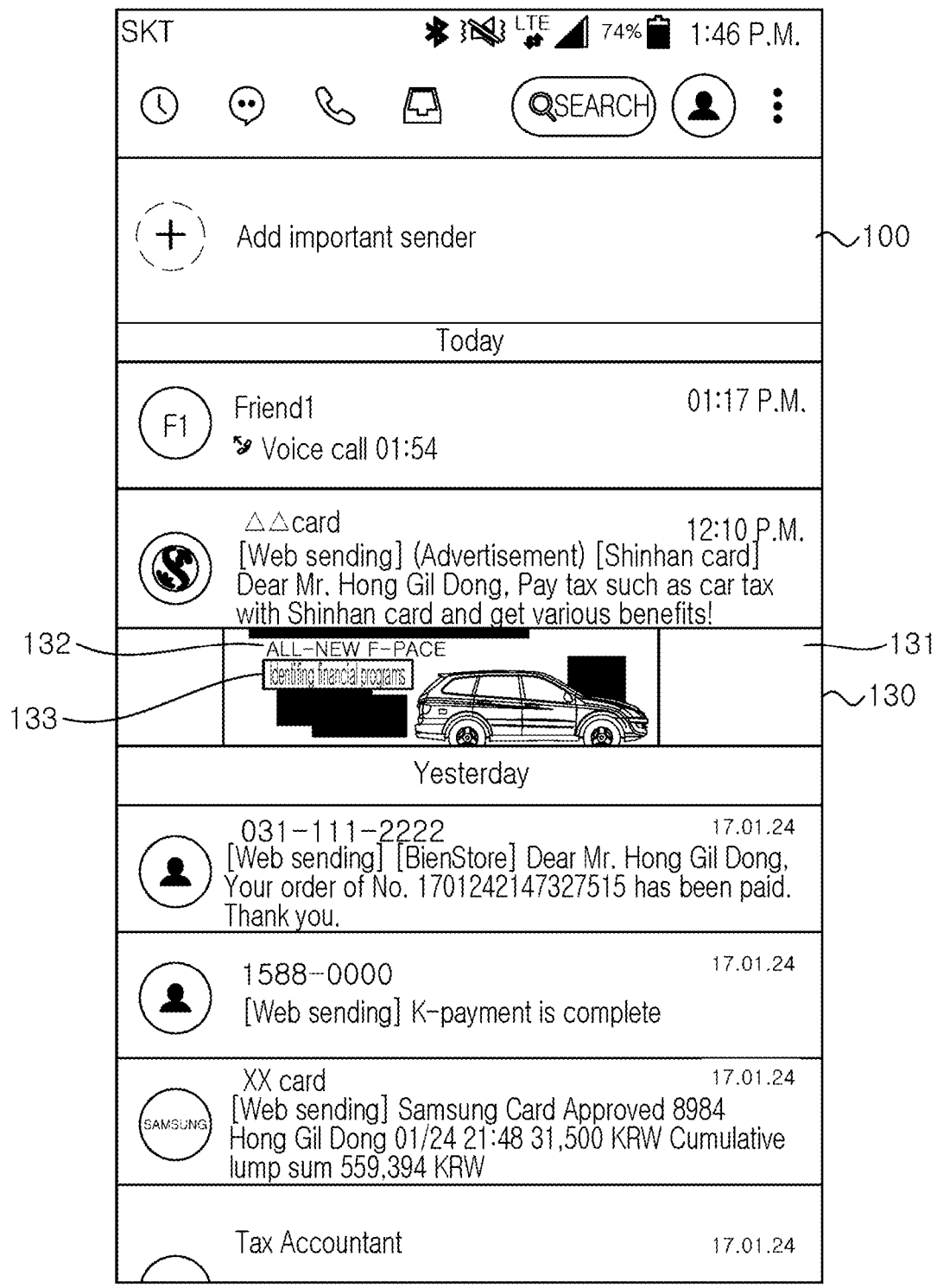
FIG. 20 is a screen shot showing a first exemplary message management user interface in which a publicity message block in which first type publicity information is visualized is inserted.

FIG. 20 is a screen shot showing an example of a first message management user interface in which a publicity message block in which first type publicity information is visualized is inserted.

The publicity information includes a text information item 132 of "ALL-NEW F-PACE", a related information providing hyperlink item 131 displayed in a text information item of "Selecting a financial program", and a background image item 133. On the other hand, the publicity information may further include rules for arranging and visualizing each item. For example, in the example of FIG. 20, the image item is set as the background, the text information item is set as a specific font and size in a specific coordinate on the background image, and the hyperlink item is arranged just below the text information item as a button according to the rules. Each business service subscriber may define a visualization rule for each publicity message block. The business service management unit receives the first type publicity information including the above display items and the visualization rule, and generates the publicity message block in which the display items are arranged according to the visualization rule. Subsequently, the generated publicity message block is transmitted to the user interface management unit, and the user interface management unit inserts the generated publicity message block into the designated position. In the example of FIG. 20, the publicity message block is inserted at the boundary between today and yesterday.

Referring again to FIG. 19, the user interface management unit executes the first message management user interface in which a publicity message block is inserted. That is, the user interface displays the first message management user interface shown in FIG. 20 on the display unit of the user terminal.

In the exemplary embodiment of FIG. 19, when the user executes the first message management user interface, the user terminal is configured to be connected to the server, to receive the first type publicity information and to generate a message block to display it on the display unit. However, according to this configuration, since the first type publicity information is randomly transmitted, the user consumes the data network resources for receiving the unrequested information, thereby paying the communication fee.

Figure 21:
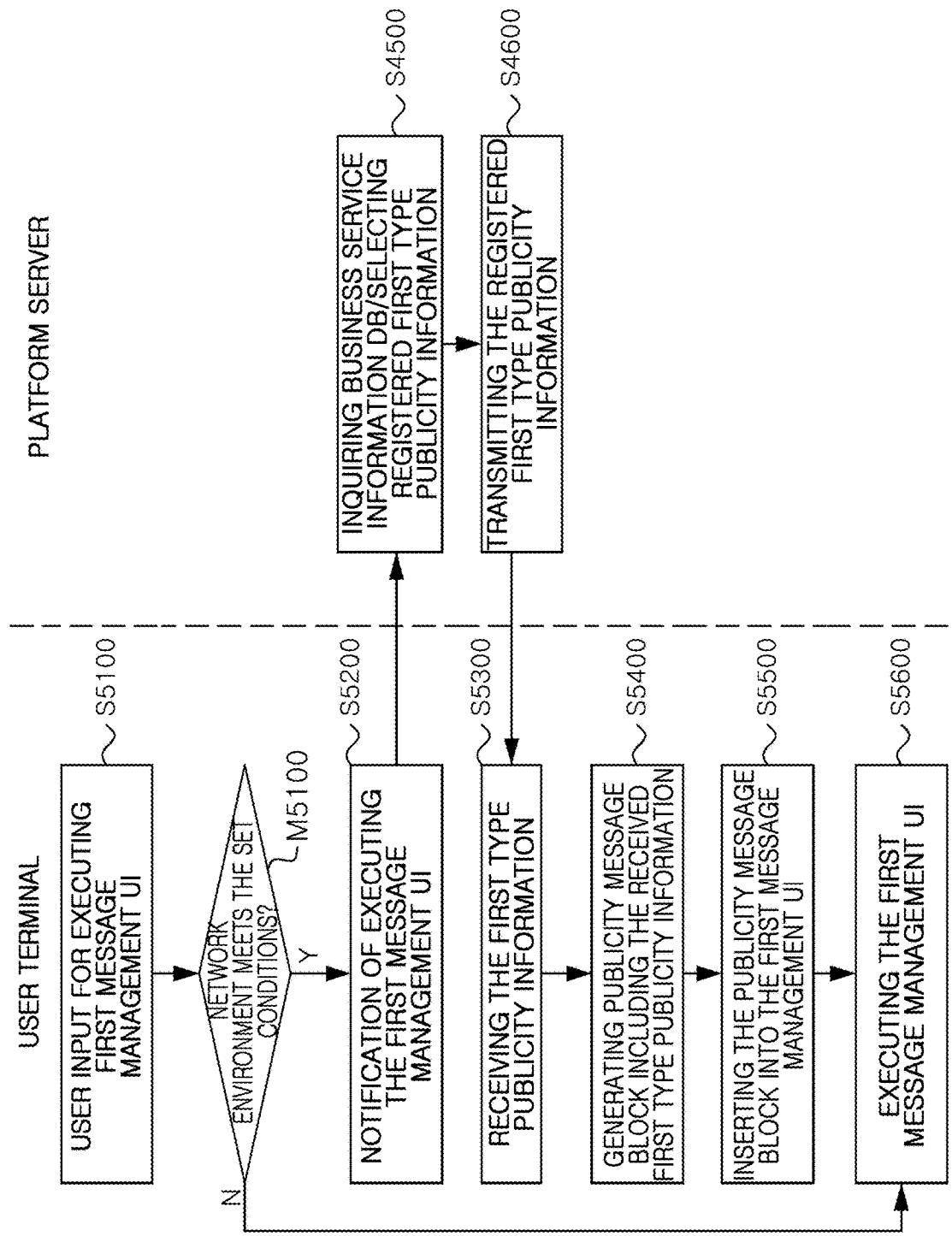
FIG. 21 is a flowchart showing another exemplary embodiment of visualization processing of the first type publicity information performed by the user terminal of the integrated message management platform and the message information integrated management service server.

FIG. 21 is a flowchart showing another exemplary embodiment of visualization processing of the first type publicity information performed by the user terminal of the integrated message management platform and the message information integrated management service server. The method steps are similar to the steps of FIG. 19 except step M5100.

Referring to FIG. 21, when the integrated message management platform user executes the integrated message management application installed in the user terminal (step S5100), the business service management unit determines whether the network environment meets the set conditions (step M5100). For example, a user can set the user terminal to receive the first type publicity information only in a communication environment such as Wi-Fi environment where the data communication environment is free. In this case, the business service management unit determines whether the data network to which the terminal is currently connected is the communication environment set by the user. If it is determined that the connection data network of the current user terminal is the communication environment set by the user, the processing of S5200 to S5600 described above regarding FIG. 19 is performed.

If it is determined that the connection data network of the current user terminal is a communication environment blocked by the user (for example, a mobile communication data network), the business service management unit blocks connection to the message information integrated management service server 1520, and immediately executes the first message management user interface. That is, when the communication network environment is not one which is set by the user, the user terminal does not receive the first type publicity information from the server, and thus generates and displays the first message management user interface without the publicity message block.

Meanwhile, the message information integrated management unit 1400 according to the present invention may be configured to receive the second type publicity information, generate a publicity card, and insert it into the second message management user interface. The second type of publicity information is provided to the user terminal in cooperation with the execution of the second message management user interface, and is publicity information registered by the communication partner of the second message management user interface that is executed.

Figure 22:
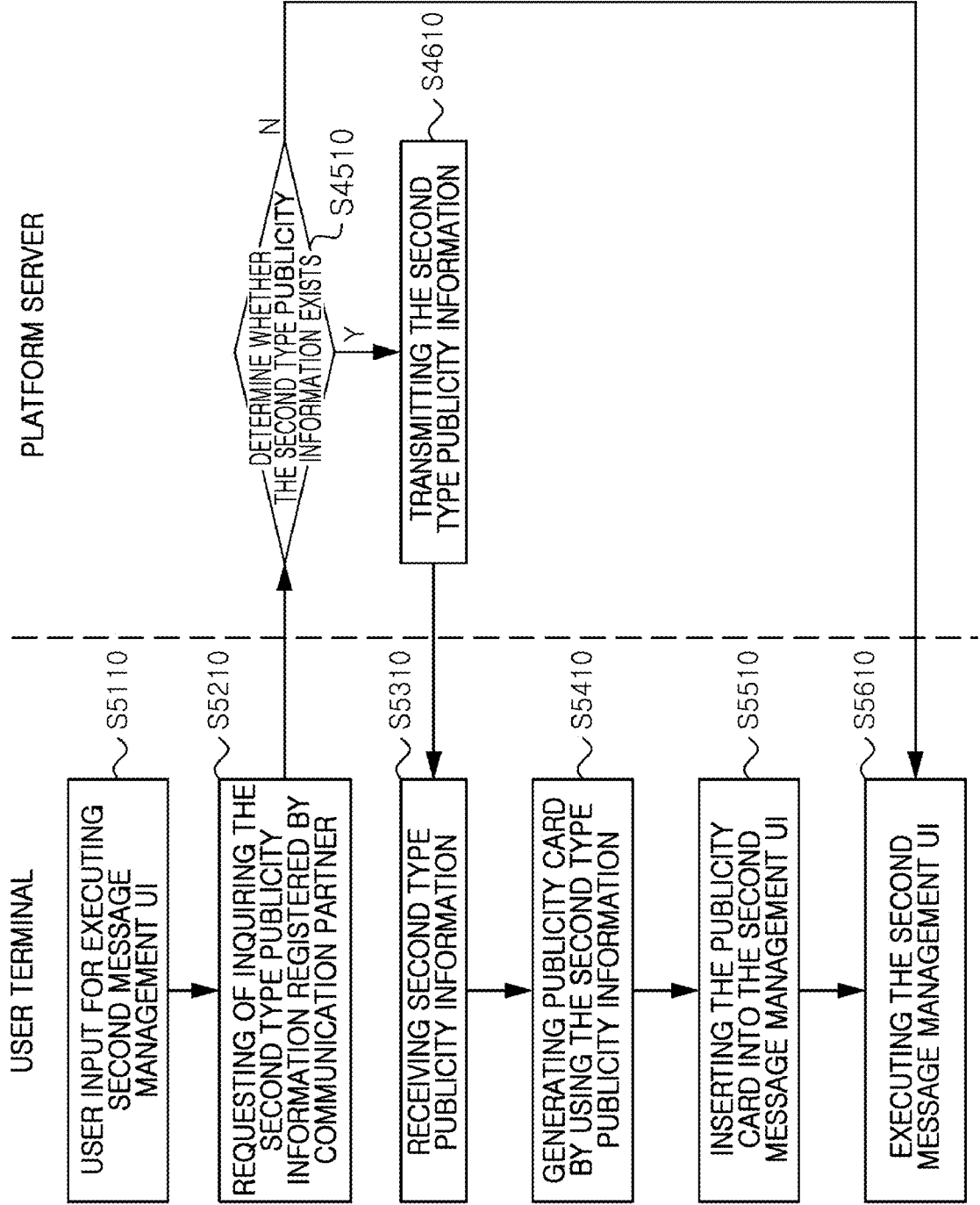
FIG. 22 is a flowchart showing a first exemplary embodiment of visualization processing of second type publicity information performed by the user terminal of the integrated message management platform and the message information integrated management service server.

FIG. 22 is a flowchart showing a first exemplary embodiment of visualization processing of the second type publicity information performed by a user terminal of the integrated message management platform and the message information integrated management service server.

When a user of the integrated message management platform executes the second message management user interface (step S5110), the business service management unit generates a message requesting to inquire the second type publicity information registered by the conversation partner of the second message management user interface, and transmits it to the integrated management service server 1520 (step S5210). The second type publicity information inquiry request transmitted to the message information integrated management service server 1520 includes an identifier of the conversation partner of the executed second message management user interface.

In response to the second type publicity information inquiry request, the message information integrated management service server 1520 inquires the business service information database based on the identifier of the conversation partner included in the second type publicity information inquiry request, to determine whether or not the second advertisement information exists (step S4510). As a result of the inquiry of the business service information database, if the second type publicity information registered by the conversation partner who is the object of the inquiry request is registered, the second type publicity information is read and transmitted to the user terminal (step S4610).

The business service management unit of the user terminal receives the second type publicity information from the message information integrated management service server 1520 (step S5310), and generates a publicity card by using the received second publicity information (step S5410). As described above, the second type publicity information includes various display items and rules for visualizing these items (visualization rules). The business service management unit arranges display items included in the publicity information based on the visualization information to generate a publicity card. The interface management unit inserts the generated publicity card into the second message management user interface (step S5510). At this time, the interface management unit may be configured to insert the publicity card at a specific position on the second message management user interface.

Hereinafter, referring to FIG. 23, a process of visualizing the second type publicity information to generate a publicity card and inserting it into the second message management user interface will be described in more detail.

Figure 23:
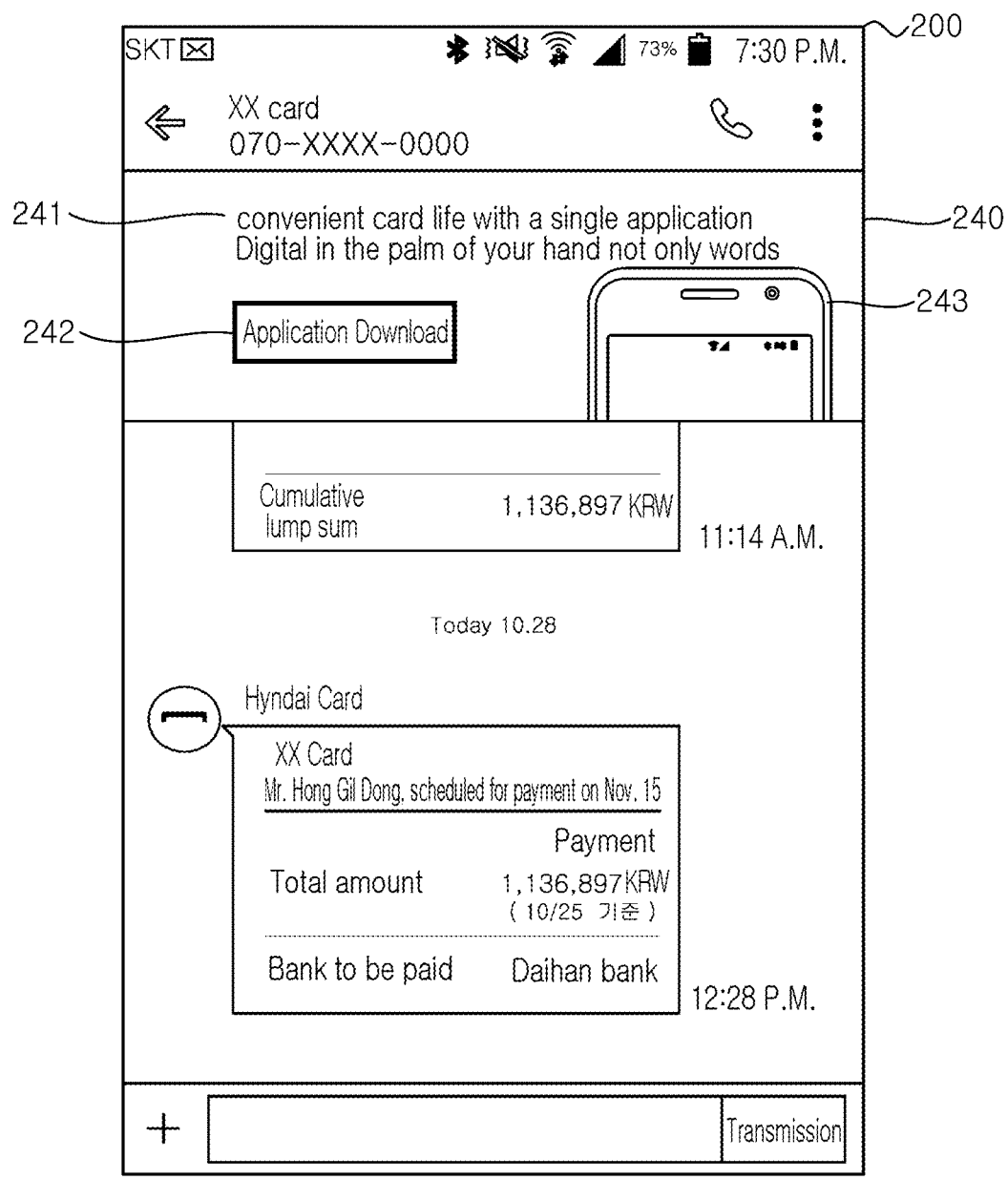
FIG. 23 is a screen shot showing a second exemplary message management user interface in which a publicity card visualizing the second type publicity information is inserted.

FIG. 23 is a screen shot showing an example of the second message management user interface in which a publicity card visualizing the second type publicity information is inserted.

The publicity information includes not only a text information item 241 of "convenient card life with a single application, Digital in the palm of your hand not only words", a related information providing hyperlink item 242 displayed in a text information item of "Application Download", and a background image item 243. On the other hand, the publicity information may further include rules for arranging and visualizing each item. For example, in the example of FIG. 23, according to the rules, the image item is set as a background, the text information item is arranged in specific coordinates on a background image in a specific font and size, the hyperlink item is arranged in the form of a button just below the text information item. Each business service subscriber can define a visualization rule for each publicity card. The business service management unit receives the second type publicity information including the display item and the visualization rule as described above, and generates the publicity card in which the display items are arranged according to the visualization rule. Subsequently, the generated publicity card is transmitted to the user interface management unit, and the user interface management unit inserts the generated publicity card into the specified position. In the example of FIG. 23, the publicity card is inserted at the top of the message display area of the second message management user interface.

Referring again to FIG. 22, the user interface management unit executes the second message management user interface in which a publicity card is inserted (step S5610). That is, the user interface displays the second message management user interface shown in FIG. 23 on the display unit of the user terminal.

In the exemplary embodiment of FIG. 22, when the user executes the second message management user interface, the user terminal is configured to be connected to the server and receive the second type publicity information to generate a message card and display it on the display unit. However, according to this configuration, the user consumes data network resources for receiving information that is not directly requested by the user, thereby paying the communication fee.

Figure 24:
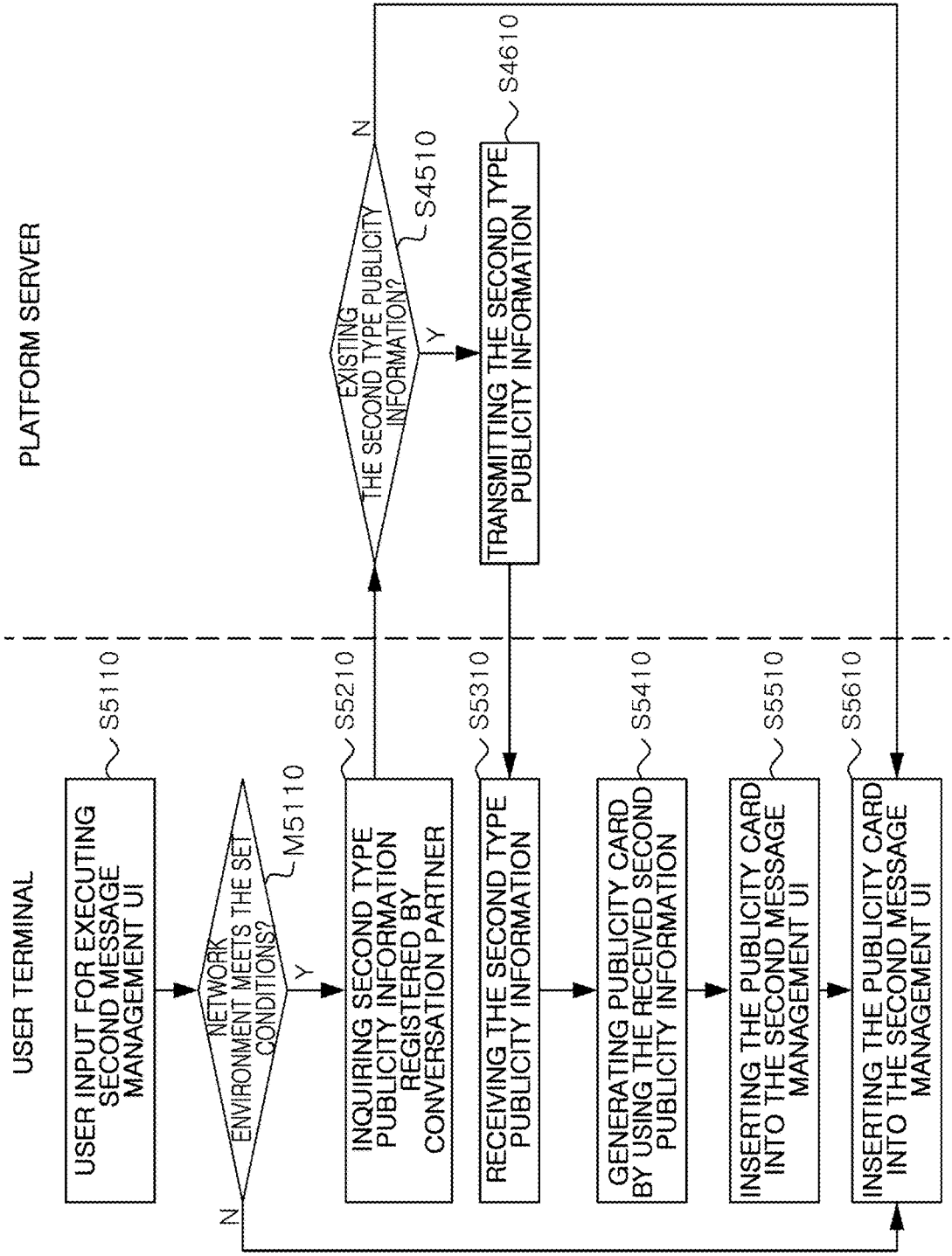
FIG. 24 is a flowchart showing another exemplary embodiment of visualization processing of the second type publicity information performed by the user terminal of the integrated message management platform and the message information integrated management service server.

FIG. 24 is a flowchart showing another exemplary embodiment of visualization processing of the second type publicity information performed by the user terminal of the integrated message management platform and the message information integrated management service server.

Referring to FIG. 24, when an integrated message management platform user executes the second message management user interface, the business service management unit determines whether the network environment meets the established conditions (step M5110). For example, the user can set the user terminal to receive the first type publicity information only in a communication environment such as Wi-Fi environment where the data communication environment is free. In this case, the business service management unit determines whether the data network to which the terminal is currently connected is the communication environment set by the user. If it is determined that the connection data network of the current user terminal is the communication environment set by the user, the steps of S5210 to S5610 described above is performed.

If it is determined that the connection data network of the current user terminal is a communication environment blocked by the user (for example, a mobile communication data network), the business service management unit blocks connection to the message information integrated management service server 1520, to immediately execute the message management user interface. That is, when the communication network environment is not one that is set by the user, the user terminal does not receive the second type publicity information from the server, and thus generates and displays the second message management user interface without the publicity card.

In the exemplary embodiment of FIGS. 22 and 24, each time the user terminal executes the second message management user interface, the user terminal transmits a second type publicity information inquiry request of the conversation partner of the second message management user interface to the server, and receives information from the server according to the inquiry request. According to this exemplary embodiment, since the second type publicity information having the same content is received every time the second message management user interface is executed, the use of network resources increases.

Figure 25:
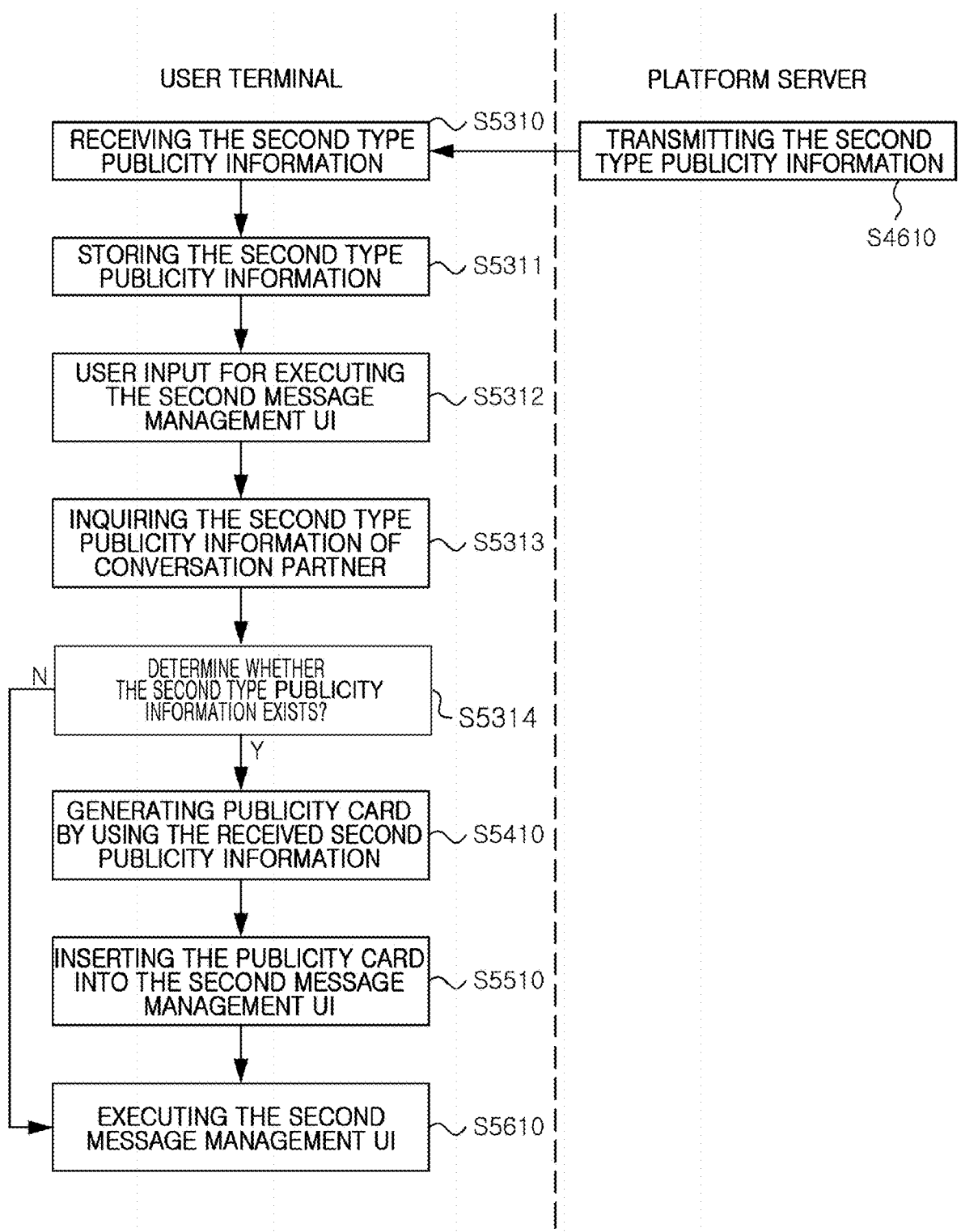
FIG. 25 is a flowchart showing another exemplary embodiment of visualization processing of second type publicity information performed by the user terminal of the integrated message management platform and the message information integrated management service server.

FIG. 25 is a flowchart showing another exemplary embodiment of visualization processing of second type publicity information performed by the user terminal of the integrated message management platform and the message information integrated management service server.

Referring to FIG. 25, when the second type publicity information is registered by the business service subscriber, the message information integrated management service server 1520 transmits the second type publicity information registered to a user who registered the business service subscriber as a friend (step S4610).

The business service management unit of the user terminal stores the second type publicity information received from the server (step S5311). At this time, the business service management unit may be configured to store the received second type publicity information in association with the identifier of the registered business service subscriber in the memory.

Subsequently, when the user of the integrated message management platform executes the second message management user interface (step S5312), the business service management unit inquires the memory and searches for the second type publicity information stored in association with the conversation partner of the second message management user interface (step S5313).

As a result of the inquiry, if the second type publicity information stored in association with the communication partner exists (step S5314), the business service management unit reads the second publicity information to generate a publicity card (step S5410). At this time, the process of generating the publicity card is performed in the same manner as the exemplary embodiment of FIG. 22 described above. That is, the business service management unit generates the publicity card in which the display items are arranged in accordance with the visualization rule by using the display items and the visualization rules included in the second type publicity information. Subsequently, the generated publicity card is transmitted to the user interface management unit, and the user interface management unit inserts the generated publicity card into the designated position (step S5510). In the example of FIG. 23, the publicity card is inserted at the top of the message display area of the second message management user interface.

If it is determined that the second type publicity information associated with the conversation partner is not stored in the memory, the second message management user interface is executed immediately without the generation and insertion of the publicity card (step S5610).

Hereinbefore, although the second type publicity information for introducing the service application of the business subscriber is described as an example, the second type publicity information may include various information. For example, the business subscriber can register his/her contact information (telephone number, e-mail address, business address) as the second type publicity information, and the business service management unit can generate publicity card including a graphic user interface (which may be provided in the form of a "save" button, etc.) for storing the contact information of the business subscriber in the user terminal.

(2) Customized Visualization of Text Messages

According to an exemplary embodiment of the present invention, a service for customizing and visualizing a text message transmitted from a business service subscriber to an integrated message management platform service user may be provided.

Figure 26:
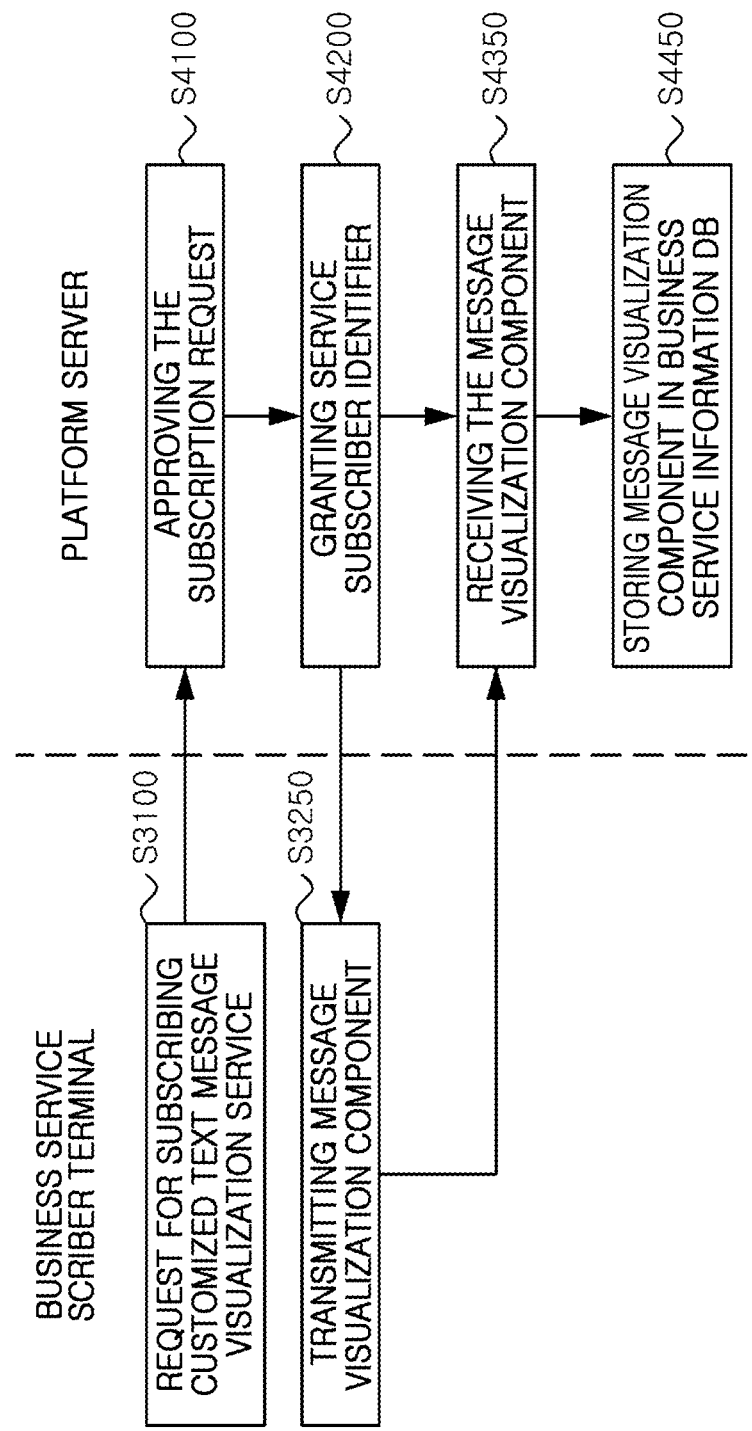
FIG. 26 is a flowchart illustrating a process of registering a customized text message visualization service according to an exemplary embodiment of the present invention.

FIG. 26 is a flowchart illustrating a process of registering a customized text message visualization service according to an exemplary embodiment of the present invention.

Referring to FIG. 26, a group or an individual who wants to provide a customized text message visualization service through the integrated message management platform of the present invention accesses the message information integrated management service server 1520 through a terminal connected to the data network, and subscribes for subscription to the message visualization service (step S3100). The service subscription application may include information on the applicant's personal information, a type of service desired to be subscribed, a limit on the scope of the service provision, and a payment of the service fee, etc.

The message information integrated management service server 1520 approves the subscription if the subscription request of the customized message visualization service received from the business service subscriber terminal satisfies the requirement (step S4100).

When service subscription is approved, the message information integrated management service server 1520 grants a service subscriber identifier (step S4200). The service subscriber identifier may be an ID applied by the business service subscriber or an identification code (identification number) automatically assigned by the message information integrated management service server 1520.

Subsequently, the business service subscriber terminal transmits a message visualization component required for the customized text message visualization service to the message information integrated management service server 1520 (step S3250). The message visualization component is information for customizing and visualizing a text message, and may include various elements. For example, the visualization component may include graphic elements for visualizing a text message transmitted by a business service subscriber, i.e., an image, a form according to which information items included in a text message are listed, and the like. In the example shown in FIG. 26, the registration of the message visualization component is performed after the service subscription, but the registration of the message visualization component may be performed simultaneously with the service subscription.

The message information integrated management service server 1520 receives the message visualization component from the business service subscriber terminal (step S4350), and stores the received publicity information in the business service information database (step S4450).

Figure 27:
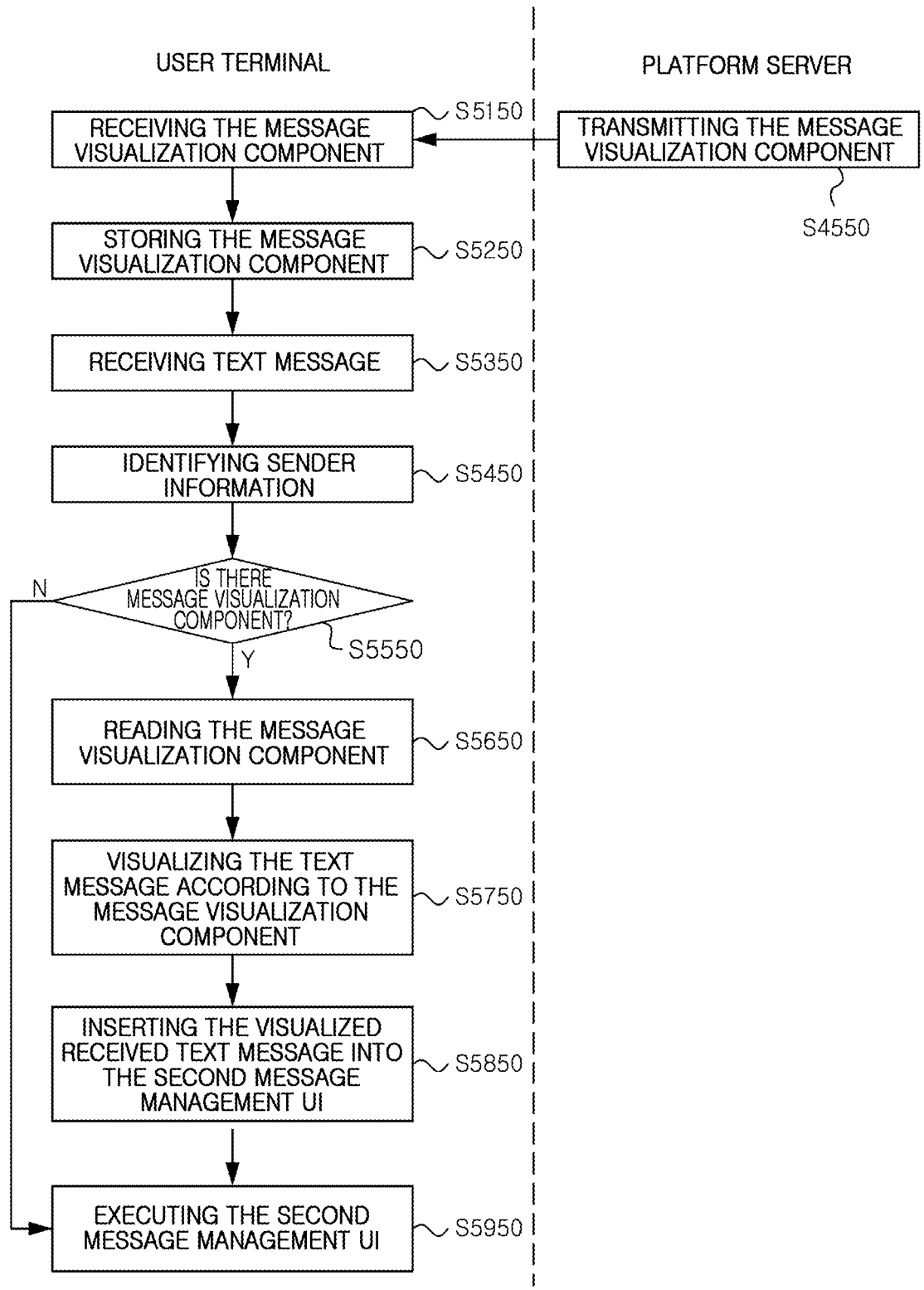
FIG. 27 is a flowchart illustrating a customized visualization process of a text message performed by a user terminal of the integrated message management platform and a message information integrated management service server.

FIG. 27 is a flowchart illustrating a customized visualization process of a text message performed by a user terminal of the integrated message management platform and a message information integrated management service server.

Referring to FIG. 27, when the message visualization component is registered by the business service subscriber, the message information integrated management service server 1520 transmits the message visualization component registered to a user who registered the business service subscriber as a friend (step S4550).

The business service management unit of the user terminal receives the message visualization component from the server (step S5150) and stores the received message visualization component (step S5250). At this time, the business service management unit may be configured to store the received message visualization component in association with the identifier of the business service subscriber who registered the message visualization component.

When the user terminal receives a text message from another user (step S5350), the business service management unit identifies the sender information included in the received text message (step S5450), inquires of the memory to determine whether there is a message visualization component stored in association with the sender of the received text message (step S5550).

As a result of the inquiry, if there is a message visualization component stored in association with the sender of the text message, the business service management unit reads the message visualization component (step S5650) and visualizes the received text message (step S5750). The visualized received text message is transmitted to the user interface management unit, and the user interface management unit inserts the visualized received text message into the second message management user interface (step S5850), and executes the second message management user interface (step S5950).

If it is determined that the message visualization component associated with the sender of the received text message is not stored in the memory, the text message visualization and insertion process are skipped and the second message management user interface is immediately executed. In other words, the received text message is not visualized and processed like a normal text message.

Hereinafter, the process of visualizing the received text message and inserting it into the second message management user interface will be described in more detail with reference to FIGS. 28 and 29.

Figure 28:
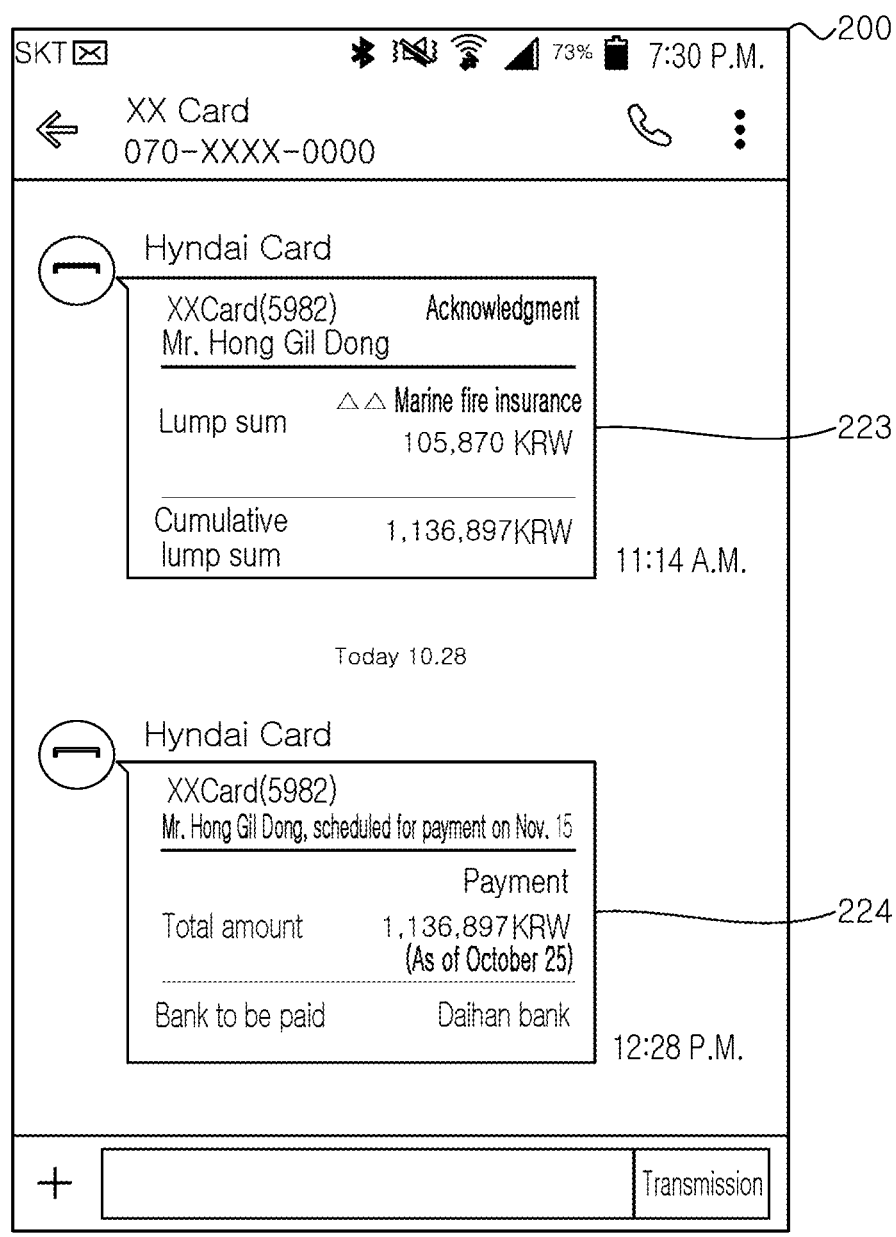
FIG. 28 is a screen shot showing an example of a second message management user interface including a visualized received text message.
Figure 29:
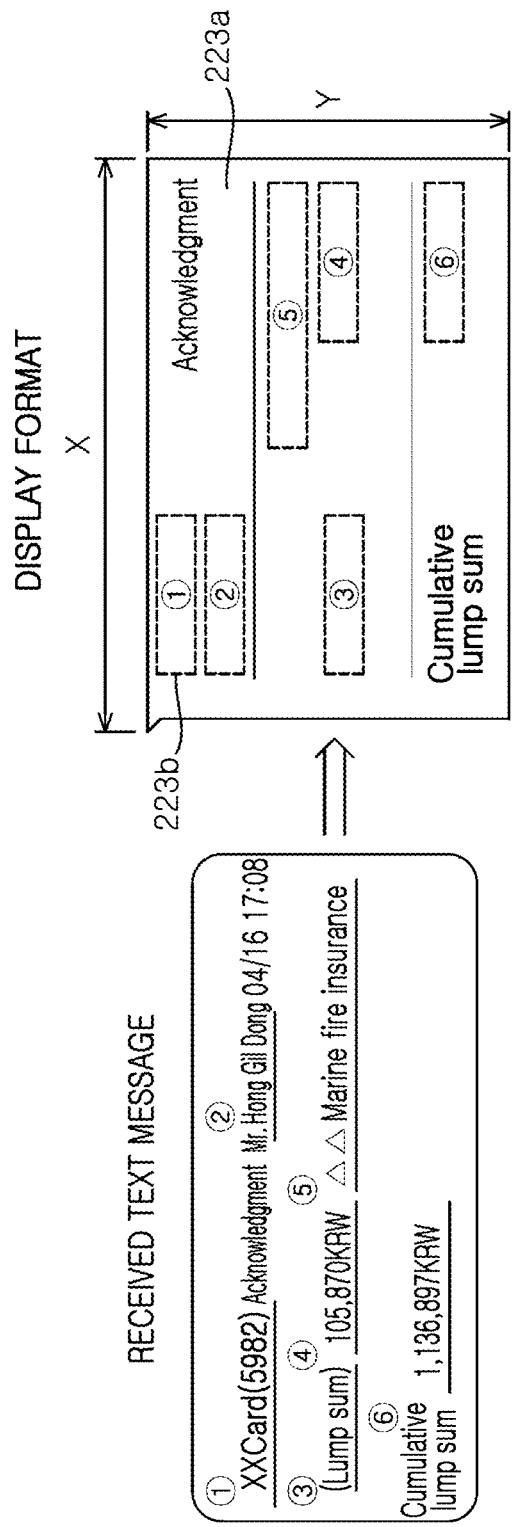
FIG. 29 is a view showing a display form for visualizing the approval history notification text message shown in FIG. 21 and a processing result obtained by visualizing the received text message by the display form.

FIG. 28 is a screen shot showing an example of a second message management user interface including a visualized received text message, and FIG. 29 is a view showing a display form for visualizing the approval history notification text message shown in FIG. 21 and a processing result obtained by visualizing the received text message by the display form.

In the example of FIG. 28, the sender of the text message is a business service subscriber according to the present invention, and is an XX card company who has applied for a text message customized visualization service.

The first text message shown in FIG. 28 is a notification text message of the card usage approval history received from the XX card company, and the second text message is a billing details notification text message received from the XX card company.

Generally, a credit card company's approval notification text message and billing details notification text message are generated with predetermined items and formalized phrases. The user terminal can visualize the approval history notification and the billing details notification text message sent from the credit card company, which is a business service subscriber, in a display form by using the visualization component. For such a process, the card company may register the display form in the server as the visualization component for visualizing the text message to be sent by the card company.

Referring to FIG. 29, the display format is an image in the form of a rectangular card having a size of a horizontal X and a vertical Y, and includes a card information display field, a cardholder information display field, a card merchant information display field, an installment information display field, an approved amount display field, an accumulated usage display field. Each information display field is arranged at a fixed position in the background image. On the other hand, it is necessary to extract an item to be displayed in each information display field of the display form from the credit card approval notice text message received at the user terminal. Accordingly, the card company as a business service subscriber must define a rule for extracting items included in an approval notification text message to be sent by the card company, and such rule is composed of a visualization component together with a display form. In the example of FIG. 29, the text message actually sent by the card company is composed of three paragraphs, and the first paragraph includes information on the card information (the last four digits of the card number), the card holder information, and the use date and time information. The second paragraph includes the installment information, the approved amount, and the information on the card holder. The last paragraph contains cumulative usage information. Each paragraph is separated by a paragraph break (Enter) input. The card company which is a business service subscriber defines an item included in a text message, and registers an item extraction rule, according to which display field of the display form should be inserted, on a server. The display form and the item extraction rule described above constitute a message visualization component. The server stores the visualization component (including display form and item extraction rules) registered by a card company that is a business service subscriber in the business server database. Meanwhile, the server transmits the registered visualization component to the user terminal. At this time, the visualization component is stored in the user terminal in association with the identifier of the registered business subscriber. Thereafter, when the user terminal receives the card approval message from the card company, the business service management unit of the user terminal inquires the visualization component registered by the card company by using the sender information of the received approval history message. The business service management unit reads the display form and the item extraction rule from the visualization component stored in the memory, and applies the item extraction rule to the received text message to generate the visualized text message. The visualized text message has a card form in which card information, cardholder information, installment information, card merchant information, approved amount information, and accumulated usage amount information are inserted in respective display fields.

In the above, a text message for notifying the credit card company about the approval details and the payment billing guide is taken as an example, but various text messages can be visualized in various forms. For example, it is possible to provide only the background image while maintaining the text of the text message, or to change the font of the text to the unique font of the business subscriber.

In order to extract and arrange items, a speech analysis may be used to classify the morphemes constituting the text message and analyze the intent of the message from the association of the morphemes.

(3) Chatbot Service

A text message for various notices and notifications according to electronic commerce or financial transactions is transmitted by a text message dispatch system, and a calling contact included in the text message is usually consultation-oriented landline telephones that are unable to receive text messages. Therefore, there is a problem that a user who receives a text cannot transmit an inquiry or an answer as a text. In addition, recently introduced artificial intelligence question-and-answer system, a so-called chatbot, is problematic in that it may not be used by a small company or an individual business operator due to a problem of development cost and operation cost. The integrated messaging platform system according to the present invention can be configured to provide a dedicated chatbot to a business service subscriber.

Figure 30:
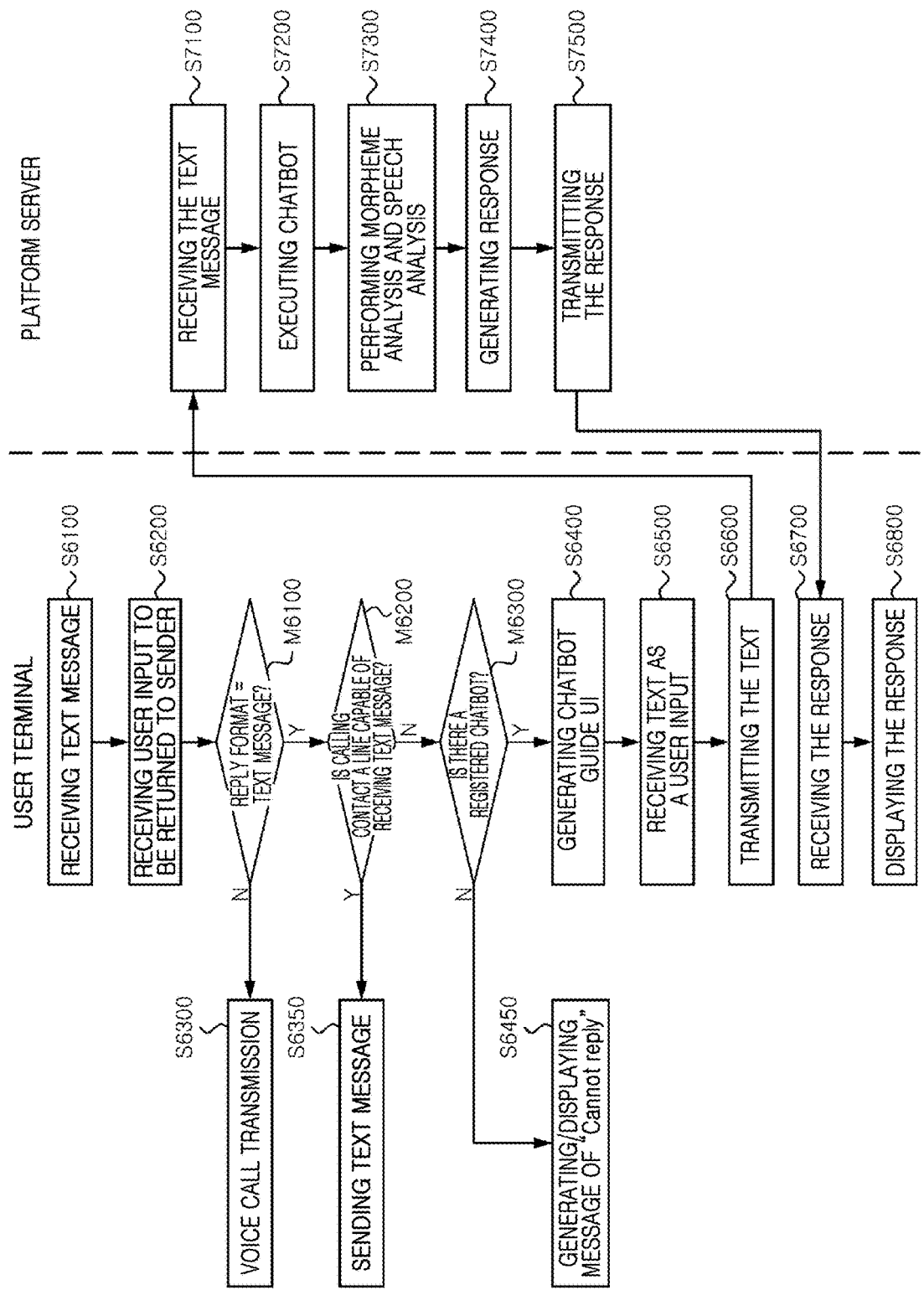
FIG. 30 is a flowchart illustrating an exemplary process of providing a chatbot providing service performed by a user terminal and a service server.

FIG. 30 is a flowchart illustrating a process of providing a chatbot providing service performed by a user terminal and a service server.

Referring to FIG. 30, a user terminal receives a text message (step S6100). The received text message includes the sender information including the reply contact. When the user creates a user input (a voice call or a user input for composing a text message) to be returned to the sender by using the sender information included in the received text message (step S6200), the business service management unit determines whether the reply format selected by the user is a voice call or a text message (step M6100). When the reply format selected by the user is a voice call, a voice call is transmitted through the voice call management unit (step S6300). When the reply format selected by the user is a text message, the business service management unit determines whether the calling contact used by the user in reply is a line capable of receiving a text message (step M6200). If the calling contact is a wire telephone or a mobile communication telephone capable of receiving a text message, a user interface for inputting a text message is provided and a text message generated through the text message management unit is transmitted (step S6350). If the calling contact is a line that cannot receive a text message, the business service management unit inquires the chatbot database and determines whether there is a registered chatbot in association with the calling contact selected by the user (step M6300). The business service according to the present invention includes a chat service. In order to provide a chat service, a service registration of a business service subscriber is required. The business service subscriber may register information on the service server with information about the anticipated query related to the response and response to be provided by the chatbot. Information such as registered responses and anticipated queries is stored in the chatbot database.

Figure 31:
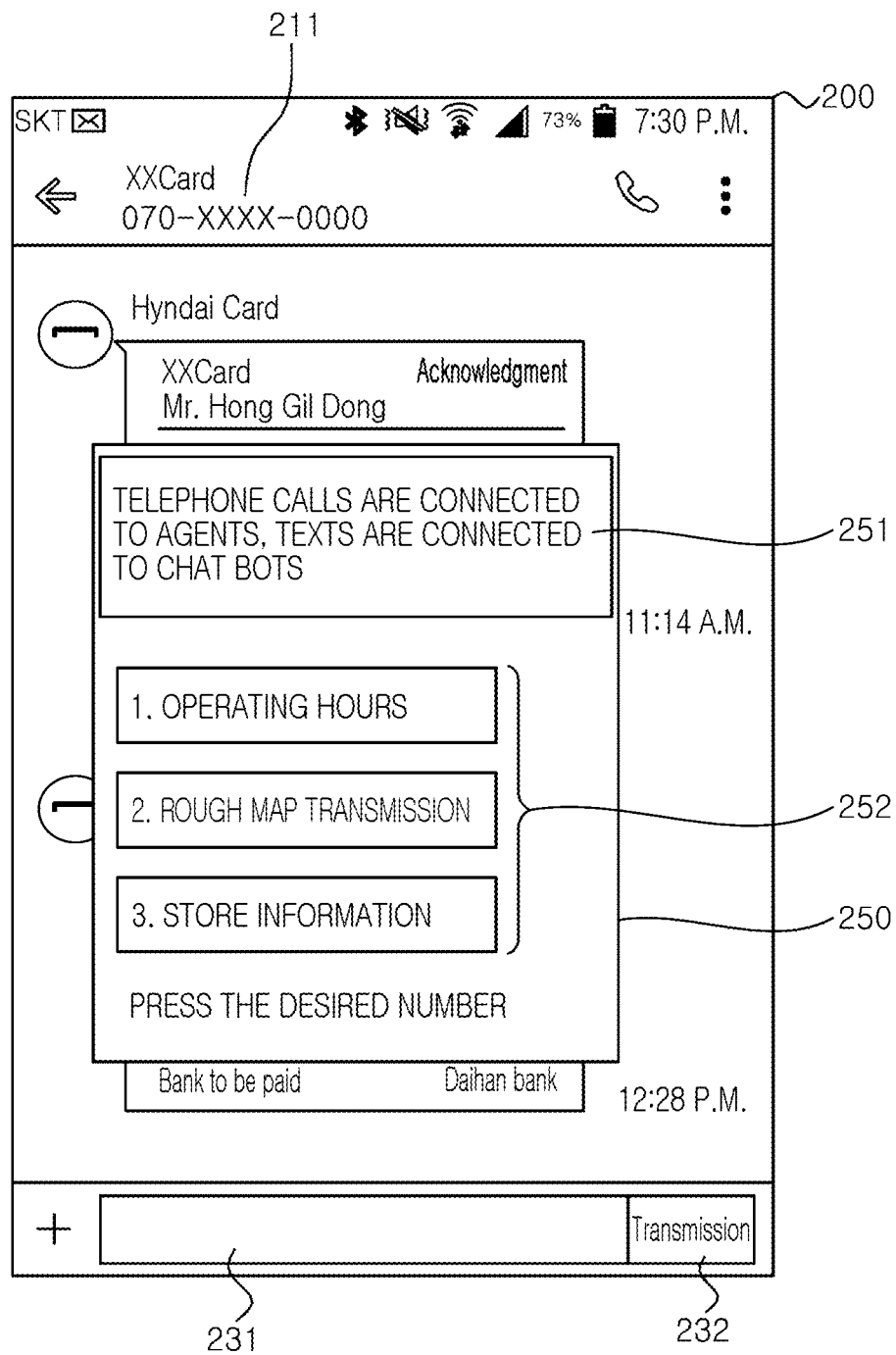
FIG. 31 is a screen shot showing an example of the chatbot guide user interface.

Subsequently, if it is determined that there is a registered chatbot associated with the calling contact, the user interface management unit generates a chatbot guide user interface and displays it on the user terminal (step S6400). FIG. 31 is a screen shot showing an example of the chatbot guide user interface. Referring to FIG. 31, the chatbot guide user interface 250 includes a chatbot guide message 251 and a graphic user interface 252 for providing basic information about a business subscriber. The chatbot guide message 251 is a message that notifies the fact that if a user sends a text message to a reply contact which the user selected, the user will be connected to the chatbot. The graphic user interface 252 is a graphic user interface for providing basic information on the business subscriber of the reply contact. When the user selects the graphic user interface 252 for providing basic information, contents (image, moving picture, voice, etc.) associated with the user interface may be provided to the user terminal or a web page providing the corresponding information may be provided.

Referring again to FIG. 30, after providing the chatbot guide user interface, if the user inputs a text through the text input user interface (step S6500), the business service management unit receives the input text and transmits a message generated along with the chatbot service request to the service server (step S6600). At this time, the generated text message is not transmitted according to the SMS transmission protocol of the mobile communication network but is transmitted to the service server in the form of a data packet. On the other hand, the chatbot service request includes the sender identification information of the text message received by the user.

The service server receives the chatbot service request and the text message from the user terminal (step S7100), identifies the sender information included in the chat service request, and executes the chatbot registered by the sender (step S7200). The chatbot performs morpheme analysis and speech analysis on the received text message (step S7300), generates a response based on the speech analysis result (step S7400), and transmits the response to the user terminal (step S7500).

The user terminal receives the response generated from the chatbot of the service server (step S6700), and displays the response through the first message management user interface or the second message management user interface (step S6800).

(4) Text Message Visualization by Inserting Command in Message

According to an exemplary embodiment of the present invention, the message information integrated management unit 1400 may be configured to provide a visualization processing in accordance with a text type command inserted in a text message body. Accordingly, among the users of the message information integration service of the present invention, a simple command can be generated as a part of the text message body, thereby visualizing the text message according to the purpose. The visualization processing according to the command included in the text message is performed by the user interface unit. That is, the user interface unit recognizes the command included in the text message body and performs processing corresponding thereto.

Figure 32:
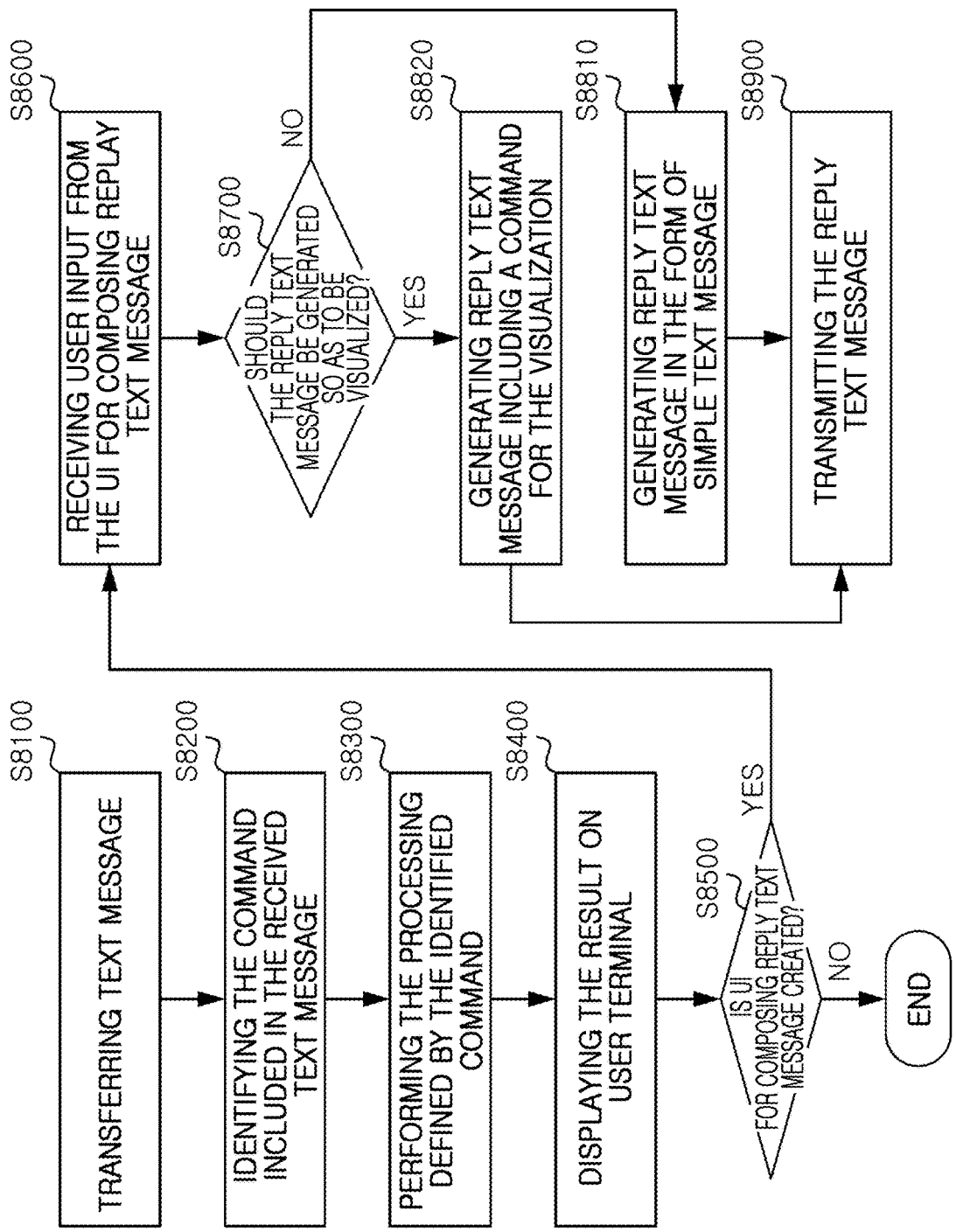
FIG. 32 is a flowchart illustrating a process of processing a visualization command included in a text message according to an exemplary embodiment of the present invention.

FIG. 32 is a flowchart illustrating a process of processing a visualization command included in a text message according to an exemplary embodiment of the present invention.

Referring to FIG. 32, the text message management unit 1200 of the user terminal 810 transfers the received message to the user interface management unit 1130 through the message monitoring unit 1110 (step S8100).

The user interface management unit 1130 identifies the command included in the received text message (step S8200). The commands provided in accordance with an exemplary embodiment of the present invention may follow the format of a Markdown language, where all commands begin with a "#". Therefore, the command can be identified by the presence or absence of a text string starting with the special text "#".

The user interface management unit 1130 performs the processing defined by the identified command (step S8300) and displays the result on the user terminal 810 (step S8400). At this time, the display of the command execution result may be performed through the first and second message management user interfaces.

In accordance with whether the processing defined in the command creates a user interface for composing a reply text message (step S8500), the end processing and return processing are performed.

If the processing defined in the command does not include a user interface for composing a reply text message, it is terminated without further processing.

If the processing defined in the command includes a user interface for composing a reply text message, the recipient can perform a return user input via the return user interface displayed on the user terminal 810. The user interface management unit 1130 receives the return user input (step S8600) and performs a reply message creating process corresponding to the return user input. The reply text message creation process is performed in a different manner depending on whether the reply text message should be generated so as to be visualized at the terminal that received the reply text message (step S8700). First, if the reply text message is not generated to be visualized at the terminal receiving the reply text message, the user interface management unit 1130 generates a reply text message in the form of a simple text message (step S8810).

On the other hand, when the reply text message creation process is to be made such that the reply text message is visualized at the terminal receiving the reply text message, the user interface management unit 1130 generates a text message including a command for the visualization (step S8820).

The reply text message generated by the steps of S8810 or S8820 is transmitted to the sender via the mobile telephone switching network through the text message management unit 1200 (step S8900).

In one exemplary embodiment of the present invention, the commands provided for visualization of text messages and examples of processing performed thereby are listed in the table below.

TABLE 1

| Function | Format of Command | Processing to be Performed | Reply Type |
| --- | --- | --- | --- |
| Generating Optional Response UI | #{A/B/C} | Generating User-inputalbe UI for Selection Items A, B, C | Replying to Selection Result through Text |
| Visual Emphasis | #EN | Highlighting Text Message | No Reply |
| Generating Completive Response UI | #[A/B/C] | Generating User-inputalbe UI for Items A, B, C | Generating Table-generation Command to Reply |
| Generating Table | #[A = a/B = b/C = c] | Generating a table with items A, B, C of a, b, c, respectively. | No Reply |

In order to process such a command, a message information integrated management application having a user interface management unit 1130 including a text visualization processing function must be installed in at least the user terminal 810 on the receiving side. In the user terminal 810 in which the message information integrated management application is not installed, even if such a command is included in the received text message, the command cannot be executed, and the command is displayed as the inputted text string. The process of visualizing the text message will be described in more detail as follows.

First, a user of the originating user terminal 810 inputs a text message including a command through a text message generation application provided in the message information integrated management unit 1400 or the text message management unit 1300. The user interface management unit 1130 transfers the inputted text message to the text message management unit 1200 and the text message management unit 1200 transmits the text message to the receiving-side user terminal 810 through the transceiver unit. The transceiver unit of the receiving-side user terminal 810 receives the text message sent from the calling-side user terminal 810. The text message management unit 1200 of the receiving-side user terminal 810 transfers the received message to the user interface management unit 1130 through the message monitoring unit 1110. The user interface management unit 1130 identifies the command included in the received text message. The command can be identified by the presence or absence of a text string starting with the special text "#". Then, the user interface management unit 1130 performs the processing defined by the identified command and displays the result through the user interface.

Hereinafter, a text message customizing method according to an exemplary embodiment of the present invention will be described in detail with reference to FIGS. 33 and 34.

Figure 33:
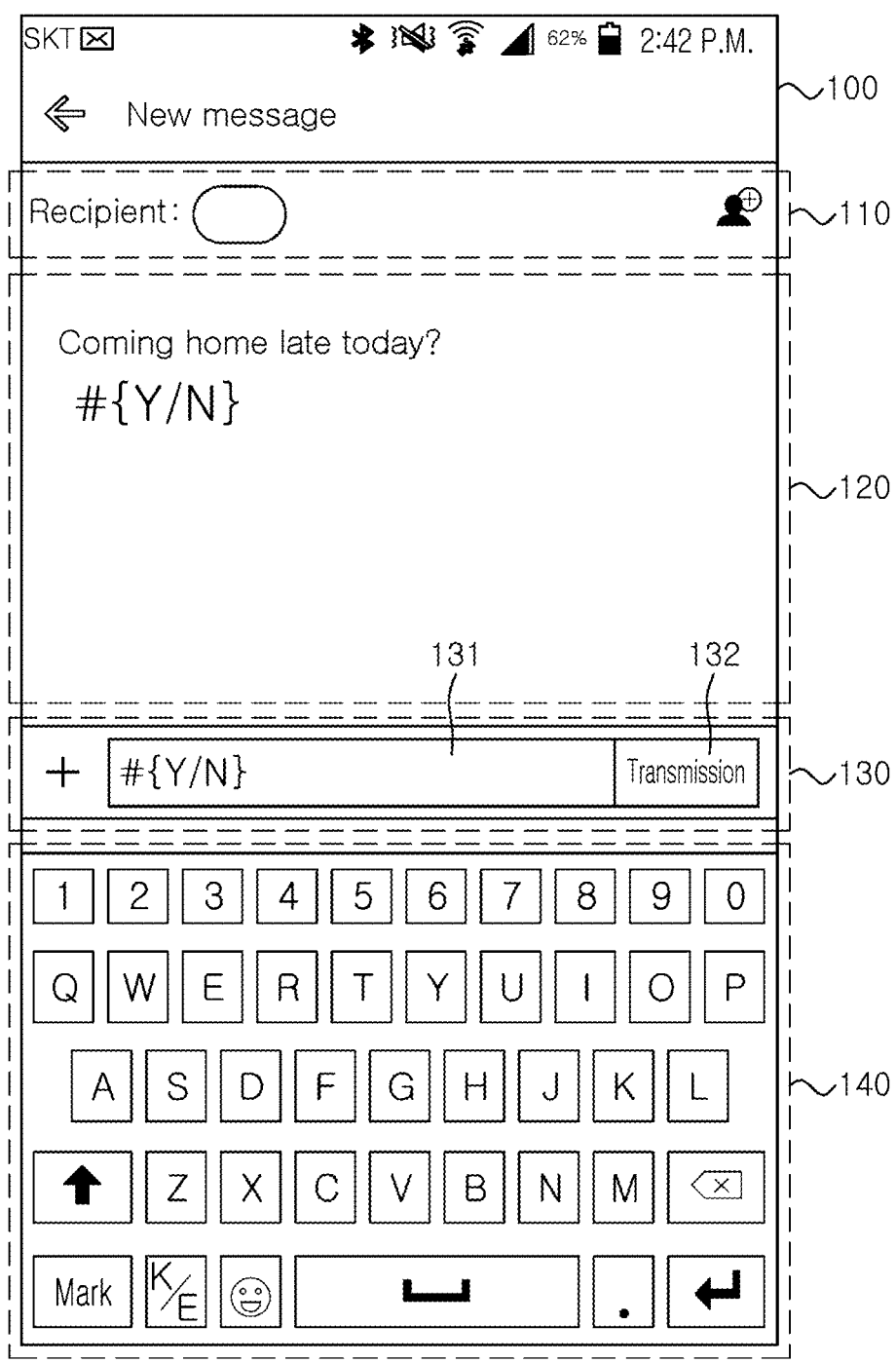
FIG. 33 is a screen shot showing an example in which a text message including a selectable response user interface creation command of Table 1 is generated in a calling user terminal.
Figure 34:
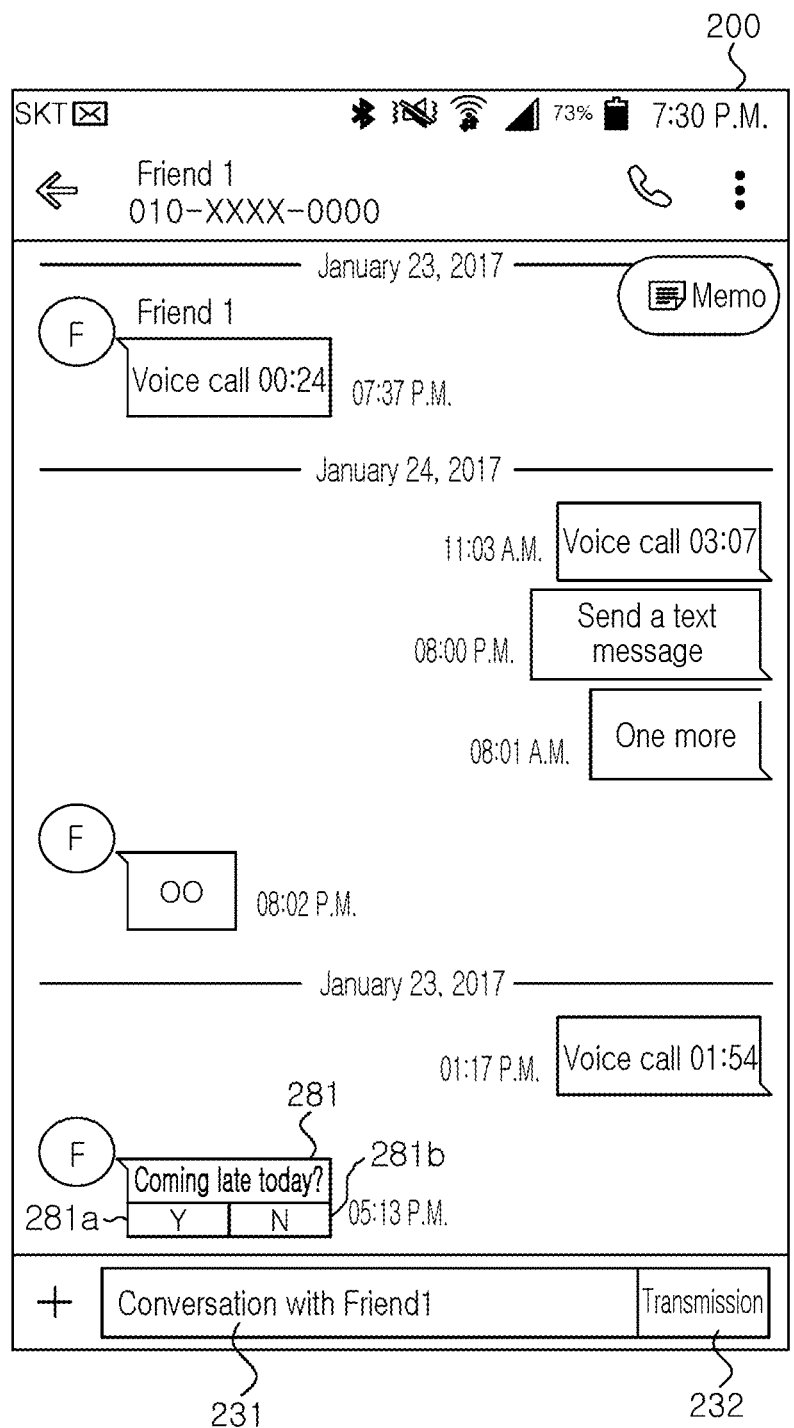
FIG. 34 is a screen shot showing a result of performing processing according to a selectable response user interface creation command in the receiving-side user terminal.

FIG. 33 is a screen shot showing an example in which a text message including a selectable response user interface creation command of Table 1 is generated in a calling user terminal, and FIG. 34 is a screen shot showing a result of performing processing according to a selectable response user interface creation command in the receiving-side user terminal.

Referring to FIG. 33, a calling-side terminal 810 creates a text message "Coming home late today? #{Yes/No}" including the command "#{Yes/No}", and sends it to the receiving-side user terminal 810. The user interface management unit 1130 of the receiving-side user terminal 810, which has received the text message "Coming home late today? #{Yes/No}" identifies the command #{Yes/No} from the text message, and responds to this command. At this time, the processing corresponding to the command #{Yes/No} is to generate a selection button marked with "Yes" and a selection button marked with "No" as defined in Table 1. Therefore, the receiving-side user terminal 10 performs this processing and displays the result on the second message management user terminal 810 as shown in FIG. 34. In other words, the user interface management unit 1130 generates a "Yes" selection button 281a and a "No" selection button 281b, and displays them on the speech balloon of the second message management user interface 200 together with the received message "Coming home late today?".

As shown in Table 1, "#{Yes/No}" has a reply format for returning the recipient's selection as text. Accordingly, when the user of the receiving terminal 810 touches the "Yes" button, the user interface management unit 1130 generates a text string "Yes" to generate a text message, and sends it to the terminal 810. The returning text message including the text string "Yes" is received on the calling terminal 810.

Figure 35:
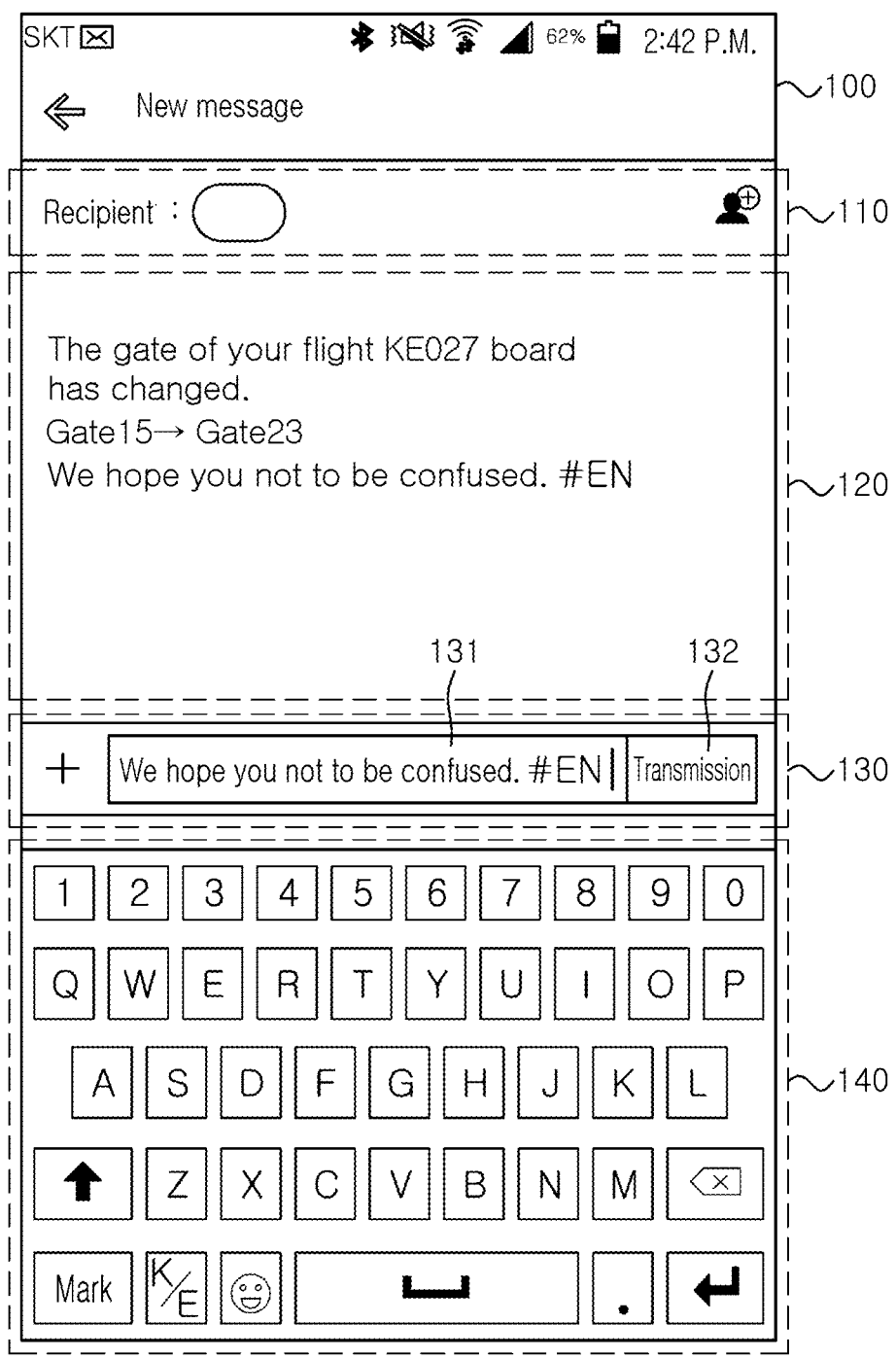
FIG. 35 is a screen shot showing an example in which a text message including the visual emphasis function command of Table 1 is generated in the calling user terminal.
Figure 36:
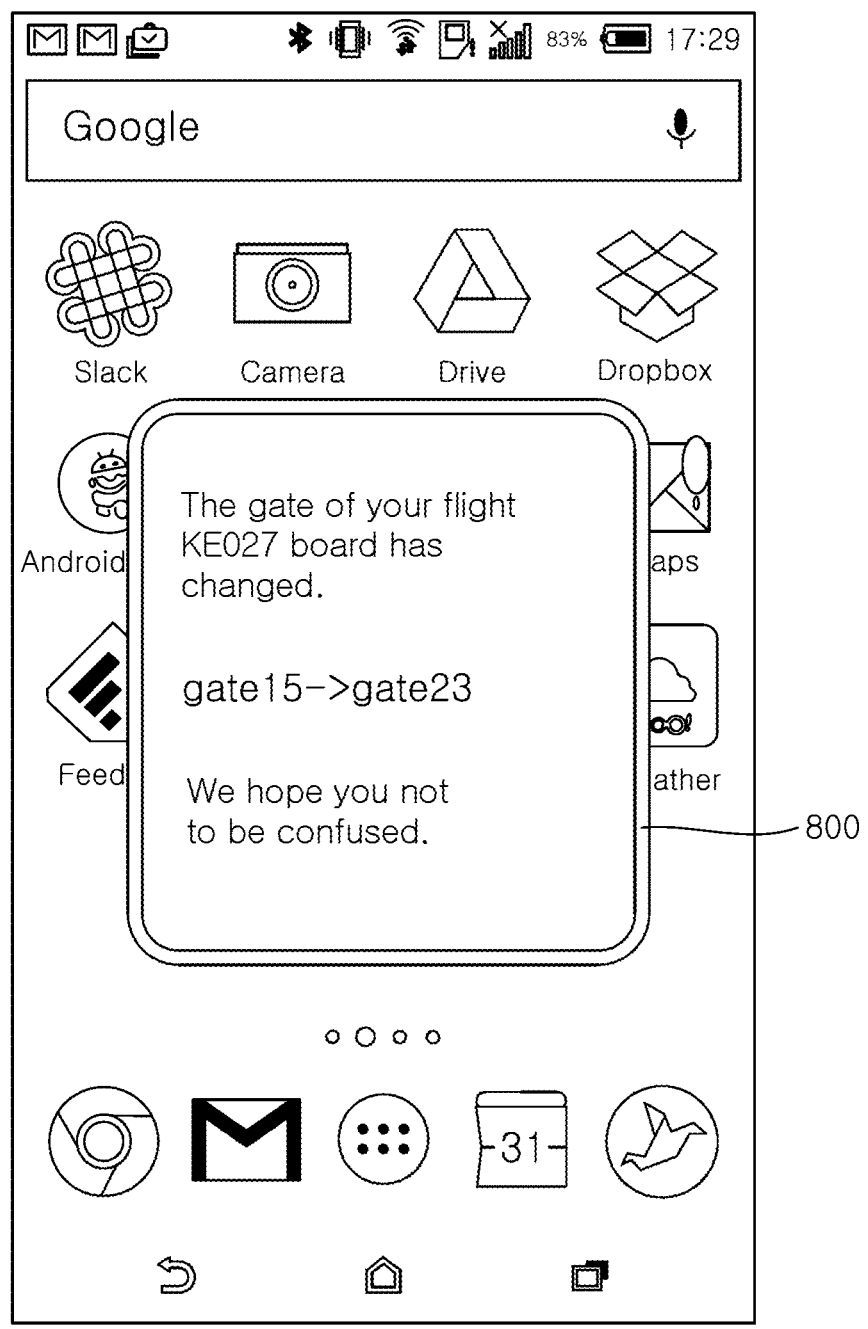
FIG. 36 is a screen shot showing a result of performing an exemplary process according to a visual emphasis function command at the receiving-side user terminal.

FIG. 35 is a screen shot showing an example in which a text message including the visual emphasis function command of Table 1 is generated in the calling user terminal, and FIG. 36 is a screen shot showing a result of performing processing according to a visual emphasis function command at the receiving-side user terminal.

As shown in FIG. 35, when the calling user enters a text message including the command "#EN" and sends it, the receiving terminal 810 that has received the text message identifies the command included in the text message, and performs corresponding processing. The command "#EN" corresponds to processing for visually emphasizing a text message as defined in Table 1. For example, as shown in FIG. 36, the message content included in the text message may be inserted into the graphic panel 800 and displayed on the initial screen of the user terminal 810. The text message processing according to the emphasis type command can be performed in various forms aside from the example of FIG. 36. For example, changing the font of a text message (use of boldface, use of color, use of underline, enlargement of font size, etc.), changing of text message alarm means (intensity of alarm vibration, increase of alarm volume, increase of alarm time, etc.) may be included. The highlighting process to be performed can be changed and added by a user or the message information integrated management service server 1520.

Figure 37:
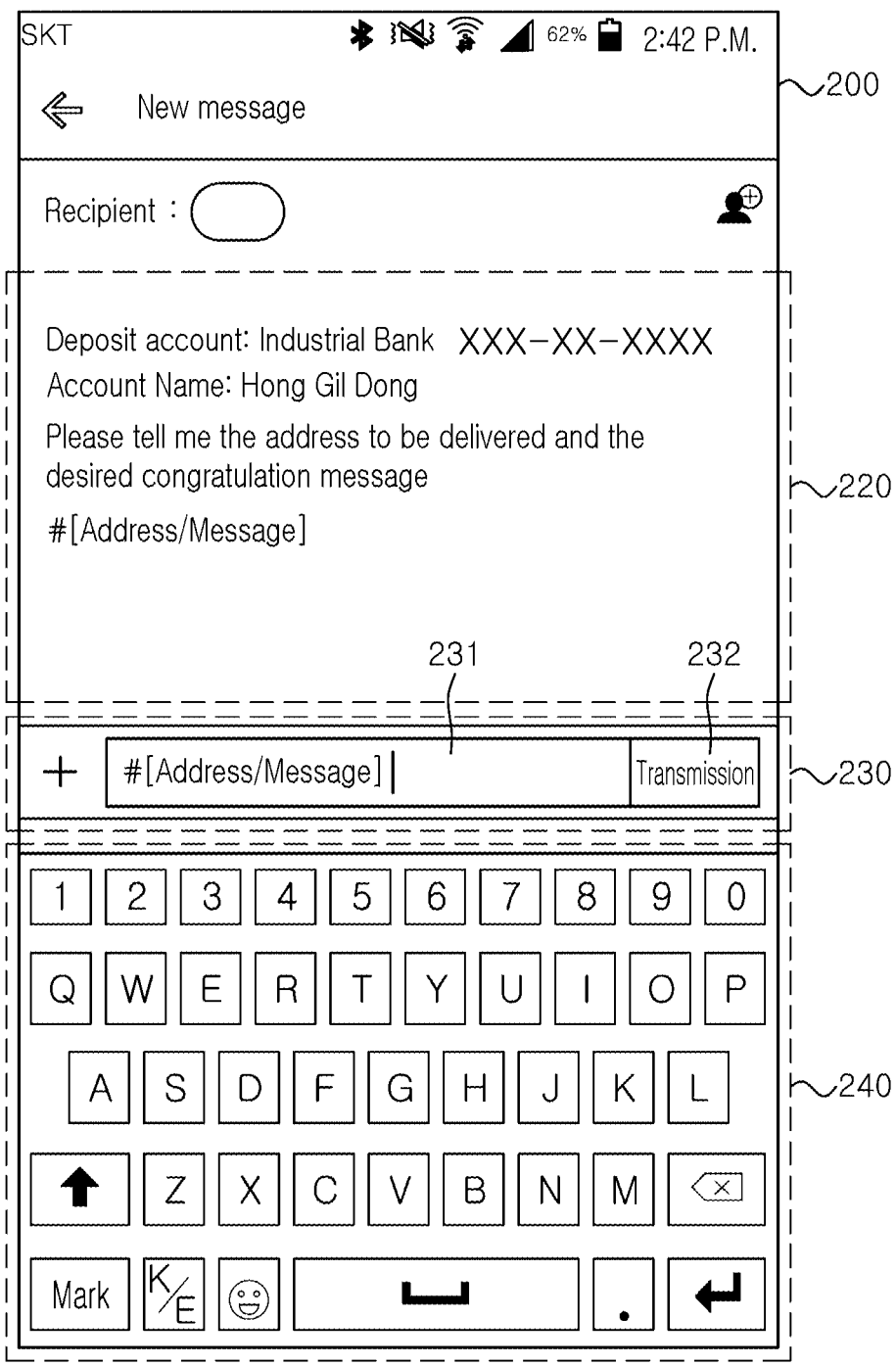
FIG. 37 is a screen shot showing an example in which a text message including a completion type response user interface creation command of Table 1 is generated in a calling user terminal.
Figure 38:
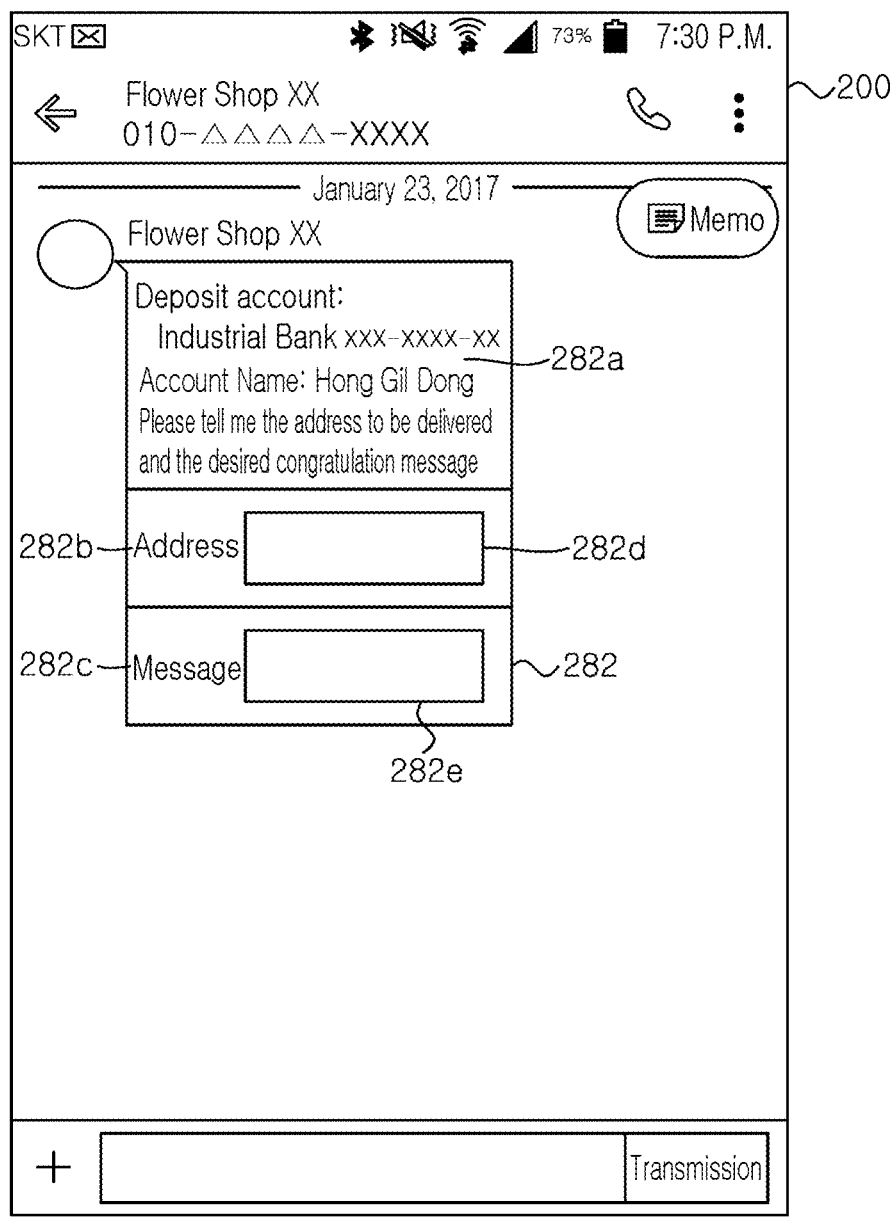
FIG. 38 is a screen shot showing a result of performing processing according to a completion type response user interface creation command in a receiving-side user terminal.

FIG. 37 is a screen shot showing an example in which a text message including a completion type response user interface creation command of Table 1 is generated in a calling user terminal, and FIG. 38 is a screen shot showing a result of performing processing according to a completion type response user interface creation command in a receiving-side user terminal.

As shown in FIG. 37, a calling-side terminal 810 generates a text message with the content "Deposit Account: Industrial Bank XXX-XX-XXXX, Account Name: Hong Gil Dong, Please tell me the address to be delivered and the desired congratulation message" and a command "#[Address/Congratulation message]", and transmit the message to the receiving-side user terminal 810. The user interface management unit (not shown) of the receiving-side terminal 810 that has received the text message with the content "Deposit Account: Industrial Bank XXX-XX-XXXX, Account Name: Hong Gil Dong, Please tell me the address to be delivered and the desired congratulation message" and a command "#[Address/Congratulation message]" identifies the command "#Address/Congratulation message]" from the text message, and performs processing corresponding to this command. At this time, the processing corresponding to the command #[Address/Congratulation message] is to generate a table capable of user input for item "Address" and "Congratulation message" as defined in Table 1. Thus, the receiving-side user terminal 810 performs this processing and displays the result on the second message management user interface 200 as shown in FIG. 38. That is, the user interface management unit 1130 displays two items "address" 282*b* and "message" 282*c* and generates an input window 282*d*, 282*e* for the input of the receiving user for each item, and displays it on the speech bubble line 282 of the second message management user interface 200 together with the contents 282*a* of the received text message.

As shown in Table 1, the command "#[Address/Congratulation message]" has a reply format in which the recipient's selection is returned as a text message visualized in a table form. Accordingly, when the user of the receiving-side user terminal 810 inputs the address and the congratulation message through the input windows 282*d* and 282*e*, the user interface management unit 1130 generates a visualization command of table type, which includes a text message including the inputted address and the congratulation message. The process of processing the response message to the completion type question will be described with reference to FIGS. 39 and 33.

Figure 39:
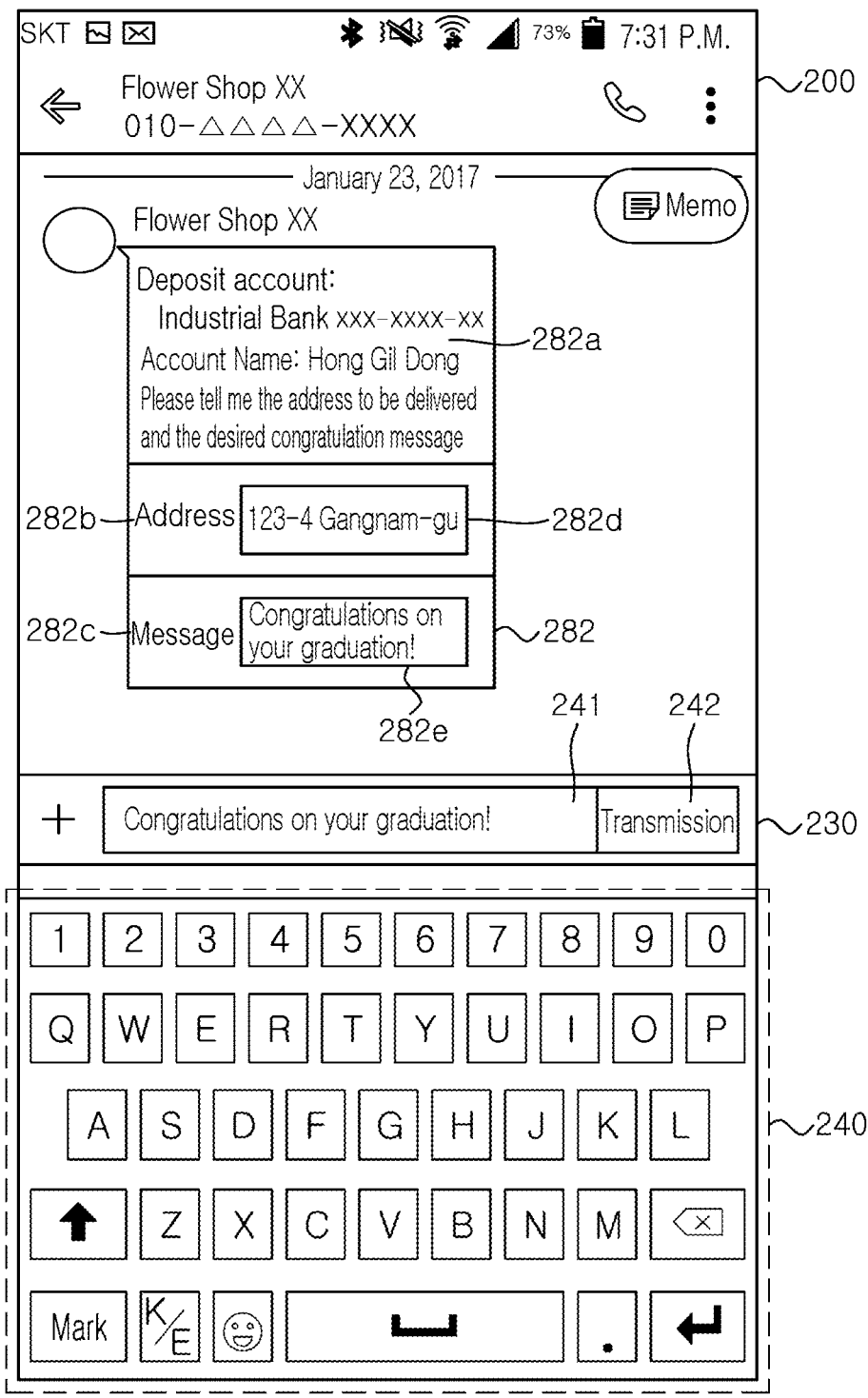
FIG. 39 is a screen shot showing an example in which a reply SMS is generated using a completion type response user interface in the receiving-side user terminal.
Figure 40:
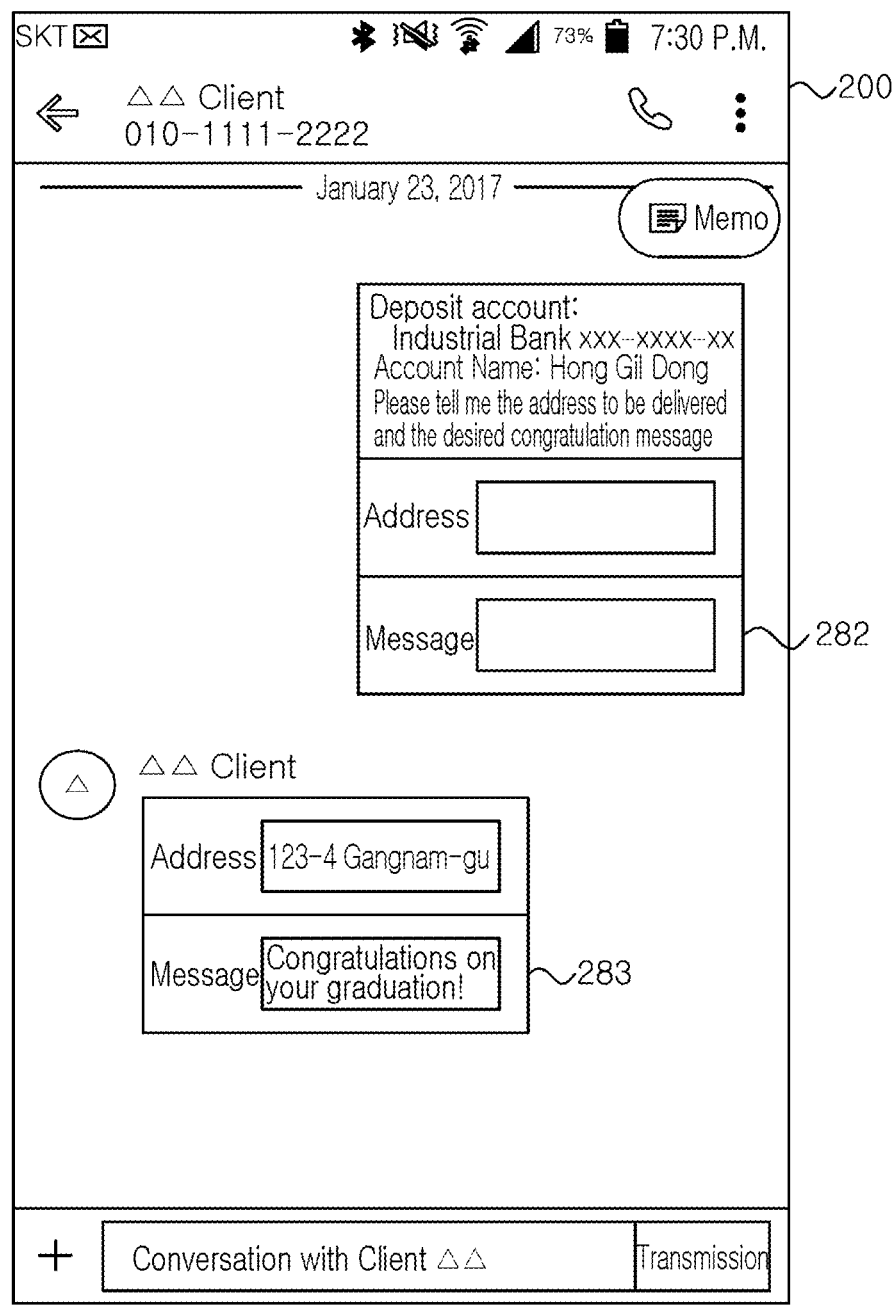
FIG. 40 is a screen shot showing an example in which the reply text message generated by FIG. 39 is displayed on the calling user terminal.

FIG. 39 is a screen shot showing an example in which a reply SMS is generated using a completion type response user interface in the receiving-side user terminal, and FIG. 40 is a screen shot showing an example in which the reply text message generated by FIG. 39 is displayed on the calling user terminal.

As shown in FIG. 39, the user of the receiving-side user terminal 810 receiving the completion type query inputs the address and the telephone number into the input boxes, respectively. The user's input is automatically encoded by the user interface into a table-forming command format. That is, the user interface management unit 1130 encodes the address value "123-4 Gangnam-gu, Seoul" and the message "Congratulations on your graduation!" entered by the user to the table generating command "# [address=123-4 Gangnam-gu, Seoul/message=Congratulations on your graduation!"] to generate a text message, and sends it to the calling-side user terminal 810 that sent the completion type query text message.

The calling-side user terminal 810 receiving the reply text message including the table-forming command performs the process corresponding to the table-forming command, that is generates a table in which the address and telephone number shown in FIG. 39 and displays it.

In other words, as shown in FIG. 40, the user interface management unit 1130 generates a table in which "123-4 Gangnam-gu, Seoul" and "Congratulations on your graduation!" are inserted in the "address" and "message", respectively, and displays it in the speech bubble of the second message management user interface 200.

When the message information integrated management application according to the present invention is not installed in the receiving-side user terminal 810, the processing according to the command is not performed. Since all of the commands are written in text and transmitted in a text message, the commands are displayed in simple text on the receiving-side user terminal 810 in which the message information integrated management application according to the present invention is not installed.

In addition, a user can transmit a schedule card, a memo card, and an event card displayed in the event panel described above to other service subscribers. At this time, the user can generate a text message by using the above-described visualization command and can transmit the text message. More specifically, when the user selects a schedule card displayed on the event panel to receive a user input to transmit to a specific counterpart, the user interface management unit 1130 reads schedule information corresponding to the selected schedule card. Then, the user interface management unit 1130 (or the message management unit 1200) sets the information that is read out as a main text, and adds a command for performing displaying the main text on the event panel to the main text to generate the text message. This command may be, for example, instructing the receiving-side user terminal 810 to perform the steps of S5300 to S5500 (or steps S5320 to S5520) described above on the schedule information included in the text message. The user interface management unit 1130 transmits the generated text message to the receiving-side terminal. The message information integrated management unit of the receiving-side terminal that has received the text message identifies the command coded in the text message and performs steps of S5300 to S5500 (or steps S5320 to S5520), that is, generates a message card and displays it on the receiving-side terminal.

As described above, various types of text messages can be exchanged by processing of a visualization command.

(2) Message Information Integrated Management Service Server

FIG. 15 is a block diagram illustrating a configuration of a message information integrated management service server 1520 according to the first system configuration example of the present invention.

Referring to FIG. 15, the message information integrated management service server 1520 according to an exemplary embodiment of the present invention may include a data transceiver module 2100, a member management module 2200, a database 2300, a friend management module 2400, a chatbot management module 2500 and a chatbot module 2600.

The data transceiver module 2100 receives information (integrated message information, schedule information, memo information, etc.) generated in association with the message information integrated management application from the user's user terminal, and transmits information managed by the message information integrated management service server 1520 to the user terminal, and in particular, manages information of friends registered by each member according to an embodiment of the present invention. The friend management module 2400 provides the message information integrated management service friend add function of the present invention.

Hereinafter, detailed functions of the modules will be described in detail.

First, the data transceiver module 2100 controls the exchange of signals and data with the user's user terminal.

The member management module 2200 may include a member information management unit 2210, a member authentication processing unit 2220, a friend registration management unit 2230, etc. The member information management unit 2210 stores various member-related information inputted when each user accesses the message information integrated management service server 1520 to join the service, in the database 2300, and updates the various member-related information modified through the message information integrated management application of a user terminal.

The member authentication processing unit 2220 performs authentication in cooperation with an authentication server (not shown) when each of the registered users accesses the message information integrated management service server 1520. In addition, when a user who does not subscribe to the message information integrated management service accesses the message information integrated management service server 1520, the member authentication processing unit 2220 may provide the above-described message information integrated management application to the user terminal of the corresponding user. That is, the member authentication processing unit 2220 may guide the installation so that the user can download and install the message information integrated management application, or may automatically provide the application.

The friend registration management unit 2230 manages friends of a message information integrated management platform service user registered by various methods.

The friend management module 2400 may include an address book friend adding unit 2410 and an SNS friend adding unit 2420 to perform functions according to the embodiments of the present invention. The address book friend adding unit 2410 searches the address book stored in the user terminal 810 and automatically registers the searched friends as a message information integrated management service friend. The SNS friend adding unit 2420 searches a SNS friend registered in the SNS service (e.g., 'Facebook' or 'Kakao Talk' service) subscribed by the user of the user terminal 810 and automatically registers the searched friends as the message information integrated management service friend. In this way, each functional unit of the friend management module 2400 provides a function of registering an acquaintance as the message information integrated management service friend in various ways according to an embodiment of the present invention. For example, when a message information integrated management service client application installed in a user terminal 810 is executed, the client application directly reads the address book data stored in the user terminal 810, and transmits each data of the address book to the message information integrated management service server 1520. Then, the message information integrated management service server 1520 inquires the member information stored in the member information database for each acquaintance included in the address book data to determine whether or not to join the membership, and transmits the result to the user terminal 810 so that automatic friend registration can be performed.

The database 2300 storing and transmitting various data includes a member information database 2310, an integrated message information database 2320, a friend information database 2330, a business subscriber information database 2340, a business service information database 2350, a chatbot database 2360, etc. The database 2300 may further include other databases for providing a message information integrated management service according to the present invention.

The member information database 2310 stores various information of members who have joined the message information integrated management service. For example, the member information database 2310 may include, a personal information of the member, a photograph necessary for the profile information, a nickname, a latest access time, SNS subscription information, personal information exposure setting information, automatic login setting information, as the member information.

The integrated message information database 2320 stores an integrated message information generated through the message information integrated management application.

The friend information database 2330 stores various kinds of information related to a message information integrated management service, which is automatically registered according to a user according to an embodiment of the present invention. For example, friend information database 2330 may store ID and nickname information of registered friends, registration path information, friend blocking information, and the like.

The business service subscriber database 2340 stores various kinds of information of members who subscribe to the business service.

The business service management unit 1440 management module 2500 may include a conversation model management unit 2510, a conversation analysis rule management unit 2520, a service response management unit 2530, and the like.

The conversation model management unit 2510 manages the conversation model used in the service response generation rule and the analysis rule of the business service management unit 1440. The conversation model management unit 2510 collects conversation data through the integrated message management platform according to the present invention, analyzes the collected data, and reflects the collected data to the generated conversation model.

The conversation analysis rule management unit 2520 performs the function of updating or generating the conversation analysis rule, based on the conversation model generated or updated by the conversation model management unit 2510. The conversation analysis rule management unit 2520 also performs a function of transmitting the updated or added analysis rule to the user's user terminal 810. That is, the analysis rule 1444 of the business service management unit 1440, which is installed in the user terminal 810 is updated by the conversation analysis rule management unit 2520 of the server 1520.

The service response management unit 2530 manages the service response performed by the business service management unit 1440 of the user terminal 810. In detail, the service response management unit 2530 performs a function of generating and changing the service response rule, and transmitting the changed/generated service response rule to the user terminal 810.

The chatbot module 2600 analyzes the contents of the received and outgoing text messages, searches for one or more services corresponding to the analyzed message contents, and provides the retrieved services to the user.

Hereinafter, the configuration and operation of the chatbot module 2600 will be described in detail with reference to FIG. 17.

FIG. 17 is a block diagram illustrating the configuration of a chatbot module 2600 according to an embodiment of the present invention.

The chatbot module 2600 includes a speech analysis unit 2630, a conversation tracking management unit 2620, and a service response generation unit 2610.

The speech analysis unit 2630 performs morpheme analysis and speech analysis on the messages of the user and the conversation partner. The morpheme analysis is a process of separating the text of the message into morpheme units, that is, dictionary headwords, restoring the original form of the deformed morpheme, and obtaining consecutive morphemes matching the word formation rules from the separated unit morphemes. The speech analysis is performed for each speech unit, which is a process of deducing the purpose of a message from the format of the text that makes up the speech unit. The speech unit may be a corpus ending with a termination ending and ending signs such as a period, a question mark, an exclamation point, and the like. The speech unit is analyzed by the primary speech act which is the intent of the intended communication through the message, the semantic action which is the intention of the speaker to be conveyed by the message, and the related element corresponding to the specific entity related to the semantic action. Each speech unit may be analyzed by the speech analysis module 1441 and tagged in the form of a 'coinage_method behavior_relation element'. The speech analysis process of the present invention will be described as follows by using an exemplary sentence of "When do you want to decide next meeting?". First, this sentence is divided into morpheme units through morpheme analysis, and grasp the meaning of each morpheme. Next, the format and intent of this message is analyzed through the analysis of the speech. Since the sentence composing this message begins with the adverbial adverbial "when" and ends with the question mark "?", the purpose of this sentence, the coinage, is 'When question'. In addition, through this message, the meaning intended by the speaker, that is, the meaning action is a 'meeting decision', and the association element which is a concrete object related to the meaning action is 'next meeting'. As another example, the speech analysis process by using an exemplary sentence of "at 6:00 pm, the reservation is full and cannot be done." is as follows. Through morpheme analysis and analysis of sentences, this sentence is terminated by a period and contains specific information, so the coinage line for the purpose of the sentence can be seen as 'information transfer'. The action of the speaker intended by the sentence, that is, the semantic action is 'rejection', and the related element (object of rejection) related to rejection is '6 o'clock reservation'. The speech analysis module 2610 of the present invention grasps the purpose of the message which is a speech unit, the intention of the speaker, and the related elements through the speech analysis.

The conversation tracking management unit 2620 performs a function of continuously tracking a message included in conversation between two or more speakers. Such conversation tracking is for analyzing each message based on the conversation context between two or more speakers. For example, the conversation tracking management unit 2620 may be configured to track the results of speech analysis of each unit conversation (message) included in the conversation list displayed on the second message management user interface according to an embodiment of the present invention.

The service response generation unit 2610 generates and provides a response to the user, which is consistent with the intention and purpose of the message analyzed by the speech analysis unit 2630 and/or the conversation tracking management unit 2620. The response generated by the service response generation unit 2610 of the chatbot module 2600 may be provided in association with the additional function processing unit 1300.

The operation of the integrated message service server 1520 according to the above-described configuration will now be described.

First, the data communication module receives the integrated message information from the user terminal (step S9100). The reception of the integrated message information may be initiated in various manners. For example, the user terminal can be configured to immediately transmit the integrated message information to the message information integrated management service server 1520 whenever the integrated message information is generated or changed. Alternatively, the user terminal may be configured to transmit the integrated message information to the message information integrated management service server 1520 according to a predetermined period. In this case, if there is no integrated message information added or changed after the previous period, the transmission operation may be omitted. As another example, the user terminal may be configured to transmit updated integrated message information to the message information unified management service server 1520 only upon execution of the message information unified management application. Unlike the above-mentioned transmission by the user terminal, the service server 1520 may be configured such that the message information integrated management service server 1520 accesses the user terminal to inquire the updated integrated message information and directly read the updated integrated message information.

The message information integrated management service server 1520 stores the received integrated message information in a database. The database stores each integrated message information received from the user terminal in association with the user of the user terminal.

Next, when the data communication module receives a request for searching the integrated message information stored in the database from the user's user terminal, the message information integrated management service server 1520 reads the integrated message information of the corresponding user from the database to transmit it to the user terminal.

The user terminal having received the integrated message information displays the received integrated message information on the first message management user interface 100 and the second message management user interface 200 through the processing as described above.

Hereinbefore, although the message information exchange and processing of the message information integrated management service server 1520 and the user terminal has been described above, it is needless to say that the same method can be applied to the additional function information generated/changed by the user terminal.

As described above, most functions related to the integrated message information management service such as generation and management of integrated message information, processing of additional functions, management of user interfaces, etc. are performed in the user terminal, and the server stores the resultant data and transmits the archived data in response to a request from the user.

Meanwhile, a part of various functions related to the present invention included in the message information integrated management unit 1400 of the user terminal described above may be configured to be provided by the message information integrated management service server. That is, some of the components of the message information integrated management unit 1400 of the user terminal of the first system configuration may be included in the message information unified management service server, and the corresponding functions may be performed by the message information unified management service server without the intervention of the user terminal.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

Some of the advantages that may be achieved by exemplary embodiments of the invention and exemplary methods of the invention include providing a method of exposing a received message, which is able to enhance a user's acceptance of the received message.

Another advantage of the present invention is to provide a message application program for performing the method of exposing a received message.

Another advantage of the present invention is to provide a user terminal for performing the method of exposing a received message.

Another advantage of the present invention is to provide a message information integrated management service system that integrates and manages voice call and text message information exchanged by a mobile telephone switching network and provides various services.

Another advantage of the present invention is to provide a message information integrated management service providing method using the message information integrated management service system.

Another advantage of the present invention is to provide a system for integrally managing a voice call information and a text message information exchanged through a mobile telephone switching network and for transmitting publicity contents for a business service subscriber and a customized message visualization service, and a service providing method by using the system.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A user terminal processing a message integrated management platform service that integrally manages messages exchanged over a mobile telephone network, comprising:
   a voice call management unit configured to manage a voice call;
   a text message management unit configured to manage text messages;
   a display unit; and
   a message information integrated management unit comprising a message monitoring unit configured to inquire information of a voice call and information of a text message received or transmitted by the user terminal, a message information management unit configured to generate integrated message information to be provided to a user based on the information of the voice call and the information of the text message, a user interface management unit configured to generate an integrated message management user interface comprising the integrated message information and to display the integrated message management user interface on the display unit, and a business service management unit configured to process business services provided by business service subscribers and to provide the processed business services to the integrated message management user interface, in association with the voice call management unit and the text message management unit.

2. The user terminal of claim 1, wherein the user interface unit is configured to:
   receive a user input relating to execution of a first message management user interface, generates a message block comprising the integrated message information, and generate a first message management user interface in which message blocks are listed in a time series in accordance with reception and transmission time information included in the information of the voice call and the information of the text message corresponding to the listed message blocks to display the first message management user interface on the display of the user terminal; and
   identify a counterpart of a voice call or text message corresponding to a selected message block in response to a user input selecting one of the message blocks displayed in the first message management user interface, inquires an information of the voice call and an information of the text message of which calling party or receiving party is the identified counterpart, generate conversation information by editing the inquired information of the voice call and the information of the text message according to a predetermined conversation information format, and generate a second message management user interface arranged in a time series and interactively according to a reception time and a transmission time of the voice call and the text message corresponding to the conversation information to display second message management user interface on a display device of the user terminal.

3. The user terminal of claim 2, wherein the business service management unit is configured to identify a sender information included in a received text message, inquire a message visualization component associated with the identified sender information, and visualize the received text message using the inquired message visualization component to display the text message that is the visualized on the second message management user interface.

4. The user terminal of claim 3, wherein the message visualization component comprises:
   a display form for visualizing a received text message; and
   a rule for extracting an information item included in the received text message and to configure the display form.

5. The user terminal of claim 2, wherein the business service management unit is configured to receive publicity information registered by a business service subscriber from a message information integrated management service server to generate a publicity card comprising the received information, and to display the publicity card in a specific location on the second message management user interface that is a counterpart of the business service subscriber.

6. The user terminal of claim 2, wherein the business service management unit is configured to receive publicity information registered by a business service subscriber from a message information integrated management service server, and to generate a publicity message block comprising the received information, and displays the publicity message block in a specific location on the first message management user interface.

7. The user terminal of claim 5, wherein the business service management unit is configured to store the received publicity information in a memory.

8. The user terminal of claim 5, wherein the business service management unit is configured to identify an access network environment of the user terminal and to receive the publicity information only in an allowed network environment.

9. A method of visualizing and providing publicity information registered by a business service subscriber, the method being performed by an integrated message management unit installed in a user terminal, the method comprising:
- receiving a user input for executing a first message management user interface in which message blocks displaying a voice call information and a text message information received by the user terminal are listed in a time series;
- identifying an access network environment of the user terminal;
- notifying a message information integrated management service server of execution of the first message management user interface;
- receiving publicity information from the message information integrated management service server;
- generating a publicity message block using the received publicity information;
- inserting the publicity message block at a specific location on the first message management user interface; and
- executing the first message management user interface in which the publicity message block is inserted,
- wherein the receiving publicity information is performed only in an allowed network environment.

10. The method of claim 9, wherein the message information integrated management service server is configured to store a plurality of publicity information registered by a plurality of business subscribers, and to randomly select one of the plurality of publicity information to transmit to the user terminal.

11. The method of claim 9, wherein the publicity message block is inserted between a first message block of today and a last message block of yesterday.

12. A method of visualizing and providing publicity information registered by a business service subscriber, the method being performed by an integrated message management unit installed in a user terminal, the method comprising:
- receiving a user input for executing a second message management user interface in which conversation information is formed by editing a voice call information and a text message information according to a conversation format, wherein the voice call information and the text message information are received from or transmitted to a conversation partner selected by a user, and are listed in a time series depending on a reception time and a transmission time and interactively;
- generating an inquiry request message of a publicity information registered by the conversation partner to transmit the inquiry request message to a message information integrated management service server;
- receiving the publicity information registered by the conversation partner from the message information integrated management service server;
- generating a publicity card using the received publicity information;
- inserting the publicity card at a specific location on the second message management user interface; and
- executing the second message management user interface in which a publicity message block is inserted.

13. The method of claim 12, further comprising:
- identifying an access network environment of the user terminal before generating the inquiry request message of the publicity information, and receiving the publicity information only in an allowed network environment.

14. A method of visualizing and providing publicity information registered by a business service subscriber, the method being performed by an integrated message management unit installed in a user terminal, the method comprising:
- receiving publicity information registered by a business subscriber from a message information integrated management service server;
- storing the received publicity information in a memory in association with a business subscriber identification information;
- receiving a user input for executing a second message management user interface in which a conversation information is formed by editing a voice call information and a text message information according to a conversation format, wherein the voice call information and the text message information are received from or transmitted to a conversation partner selected by a user, and are listed in a time series depending on a reception time and a transmission time and interactively;
- inquiring the memory to search for a publicity information stored in association with the selected conversation partner;
- generating a publicity card by using the publicity information stored in association with the selected conversation partner;
- inserting the publicity card at a specific location on the second message management user interface; and
- executing the second message management user interface in which a publicity message block is inserted.

* * * * *